(12) United States Patent
Kamikido et al.

(10) Patent No.: US 7,480,871 B2
(45) Date of Patent: Jan. 20, 2009

(54) CLERICAL PROCEDURES PROCESSING APPARATUS AND CLERICAL PROCEDURES PROCESSING SYSTEM

(75) Inventors: Yoshinobu Kamikido, Osaka (JP); Masaru Shikida, Kyoto (JP); Yasuhisa Noborio, Osaka (JP); Hitoshi Okuni, Osaka (JP); Kumi Toyofuku, Nara (JP)

(73) Assignee: Panasonic Corporation, Osaka (JP)

( * ) Notice: Subject to any disclaimer, the term of this patent is extended or adjusted under 35 U.S.C. 154(b) by 767 days.

(21) Appl. No.: 10/434,107

(22) Filed: May 9, 2003

(65) Prior Publication Data

US 2003/0210263 A1    Nov. 13, 2003

(30) Foreign Application Priority Data

May 10, 2002    (JP)    .............................. 2002-135255

(51) Int. Cl.
    *G06F 3/048*    (2006.01)
(52) U.S. Cl. ........................ 715/789; 715/779; 715/764; 715/700
(58) Field of Classification Search .................. 715/828, 715/829, 779, 789, 764–768, 717, 700, 709, 715/711, 712
    See application file for complete search history.

(56) References Cited

U.S. PATENT DOCUMENTS

| 5,727,950 | A | * | 3/1998 | Cook et al. | .................. | 434/350 |
| 5,884,035 | A | * | 3/1999 | Butman et al. | .............. | 709/218 |
| 6,671,693 | B1 | * | 12/2003 | Marpe et al. | ................. | 707/102 |
| 6,727,927 | B1 | * | 4/2004 | Dempski et al. | ............ | 715/853 |

FOREIGN PATENT DOCUMENTS

| JP | 2001-357292 | 12/2001 |
| JP | 2002-32522 | 1/2002 |
| JP | 2002-109450 | 4/2002 |

OTHER PUBLICATIONS

Japanese Office Action issued in corresponding Japanese Patent Application No. JP 2003-130945, dated Sep. 6, 2006.
Japanese Office Action issued in corresponding Japanese Patent Application No. JP 2003-130945, dated Nov. 21, 2006.
"Cosminexus Portal Framework—User's Guidebook (Operation Manual)", Mar. 31, 2002, 2nd Edition, Hitachi, Ltd., Japan.

* cited by examiner

*Primary Examiner*—Simon Ke
(74) *Attorney, Agent, or Firm*—McDermott Will & Emery LLP

(57) ABSTRACT

Up until now, when an employee had a personal change, it was possible that that employee did not know all of the items (events) that needed to registered with the company. This invention comprises a combination-storage means for storing a combination of one or a plurality of registration events that are associated with a procedure subject, and the procedure subject relating to clerical procedures, and a plurality of guidance means corresponding to a plurality of registration events and performing guidance for the user to result in input of data about said registration event. Also, based on the combination stored in the combination-storage means, a registration-event-extraction means extracts one or a plurality of registration events relating to a procedure subject selected by the user. Next, an execution means activates one or a plurality of guidance means corresponding to the registration events extracted by the registration-event-extraction means, and a registered-contents-storage means stores the contents of the registration events input by the user.

6 Claims, 39 Drawing Sheets

Fig. 18

Procedure edit > Marriage, childbirth, family support, address change, commute reimbursement > Own marriage

50-01 Own Marriage

| Own Procedure | Supervisor's role | Flow of procedure | Close this screen |
| --- | --- | --- | --- |
| | | | Confirmation table of submitted documents |

Company policy

1. Marriage gift
   Gift amount    3,000 yen

○ Support supplement
     ○ Paid amount

| Dependent only | 3,000 yen |
| --- | --- |
| Family support other than dependent | 4,000 yen |
| Dependent + other family member | 7,000 yen |

Fig. 28

SDAC Registration

Deadline 2002/01/10　Change will take effect from January's salary

* The salary deposit account must be in an account in the employee's own name

First account　[　⦿ No change　○ Change　]

● Post office　　　● Bank, Credit Bank, Etc

Passbook code　[　　]　　Financial institution code　[　　] [Search financial institutions]
Passbook number [　　]　　Institution name　[　　]
　　　　　　　　　　　　　Branch code　[　　] [Search branch codes]
　　　　　　　　　　　　　Branch name　[　　]
　　　　　　　　　　　　　Type of account　Normal ▽
　　　　　　　　　　　　　Account number　[　　]

Second account　[　⦿ No change　○ Start, change　○ Cancel　]
Enter the amount to deposit in second account
[　　],000 yen (in unit of 1,000 yen)

Menu | Registration | Postpone | Manual Navi

Fig. 31

Menu | Registration | Postpone | Manual Navi

Marriage (Congratulations Notice Registration)

Marriage date [2001/12/20] [Thurs.] [−][+] (Example: 1975/03/15, or 19750305)

Dependent name

Name: (Furigana )
(Maiden name): ( Kanji )

[ ⦿ Wedding    ○ Not wedding ]

Hold a wedding ceremony, Do not hold a wedding ceremony  Enter 'ceremony date and time, wedding hall name, address' or 'reception date and time, reception hall name, address' (Input is not required if neither a wedding ceremony or reception are held.)

Wedding ceremony (reception)

Date and time: [2001/12/20] [Thurs.] [−][+] □□ : □□ ~ □□ : □□
(Example) 14:00

Ceremony hall (reception hall):

Fig. 32

| Menu | Registration | Postpone | Manual Navi |

(Furigana) ☐ ☐ Husband
( Kanji ) ☐ ☐

Date of Birth: ☐ (Example: 2000/05/05 or 20000505)
Age: ☐ Years old   Age at end of December: ☐ Years old

[ ⦿ Live together  ○ Live apart ] (If living apart enter the address.)

Prefecture ☐▼   Copy address
Address (Kanji) ☐
Telephone number ☐ (Example: 06-0123-4567)
Occupation, name of company/school ☐   Year in school ☐▼
Handicap ☐ [全角20文字]
Type of notebook ☐ [全角12文字]
Class ☐▼
Date of issue ☐▼ Year ☐ Month ☐ Date

Fig. 33

| Menu | Registration | Postpone | Manual Navi |

Name Change Registration

Date of change [2001/12/20] Thurs. [—][+] (Example: 1975/03/15 or 19750305)

Enter the name as on certificate of residency

Name:
        Last name    First name (Furigana)  [ヤマモト] [ハナコ]  Enter the last name and first name in 14 characters or less (Kanji)    [山本]  [花子]   Enter the last name and first name in 7 characters or less (Alphabet characters) [Yamamoto  hanako]

Reason for application [            ] [»]

Fig. 34

| Menu | Registration | Postpone | Manual Navi |

Dependent/Family Change, Support Application, Cancellation, Registration

Date of event  2001/12/20  [-][+]

Reason for application  [▽]

(Furigana)  [        ]  [        ]

(Kanji)  [        ]  [   Son   ]

Date of Birth  [        ]   (Example: 2000/05/05 or 20000505)

Age: [   ] Years old   Age at end of December: [   ] Years old

[ ● Live together   ○ Live apart ]  (If living apart enter the address.)

Prefecture [▽]   Copy address

Fig. 37

User Procedures

- Address related procedures
- SDAC
- Employee savings amount change
- Holdings procedure
- Congratulations/condolence notice
- Name change
- Assets procedure

Address related procedures

- Address change
- Commute reimbursement change

Fig. 38

CLERICAL PROCEDURES PROCESSING APPARATUS AND CLERICAL PROCEDURES PROCESSING SYSTEM

BACKGROUND OF THE INVENTION

1. Field of the Invention

This invention relates to a clerical procedures processing apparatus and clerical procedures processing system for guiding a user when registering the contents of prescribed registration items such as registering address changes or the like in clerical procedures.

2. Description of the Related Art

In the past, when employees of a company had personal changes occur in their lives such as marriage or changing addresses, benefits received from the company differed before and after the occurrence of the change, so the employee had to register with the company registration items (registration events) related to the personal changes. For example, in the case of marriage, in accordance to personal changes that occur due to the marriage, the employ must register with the company information related to the new dependent, and if there was a change in address, the changed address, or in the case of a change in name, the new name.

In order to perform this registration, the employee has to obtain documents from the personnel director for the items to be registered depending on the kind of change that occurred, and then fill out the necessary information on those documents and send the documents back to the personnel director. The personnel director checks the received documents and makes sure no information is missing, then registers the changes by entering the prescribed registration items, such as the employee's address, in a computer or the like and save the changes in a storage apparatus.

Also, a personnel-procedures-processing system has been proposed for managing registered items in a personnel-procedures-processing apparatus, in which the employee could enter the personal changes to be registered using a personnel-procedures terminal and register the input changes in the personnel-procedures-processing apparatus that is connected to the personnel-procedures terminal via a network.

Here, FIG. 35 will be used to explain a conventional personnel-procedures-processing system. In this specification, a personnel procedure processing system is an example of clerical procedures processing system. A personnel procedure processing apparatus is corresponding to a clerical procedure processing apparatus, and a personnel procedures terminal is corresponding to a clerical procedures terminal. As shown in FIG. 35, this personnel-procedures-processing system comprises a personnel-procedures terminal 101, network 102, verification/authorization apparatus 103 and personnel-procedures-processing apparatus 104.

To register items in the personnel-procedures-processing apparatus (hereafter called PPP apparatus) 104 according to personal changes that have occurred, first the employee uses an input-selection means 111 such as a mouse and keyboard and enters a personal ID number and password into the personnel-procedures terminal (hereafter called PP terminal) 101. The ID number and password that were entered are received by an identification-receiving means 113, and then sent to the verification/authorization apparatus 103 by a communication means 110 via the network 102.

In the verification/authorization apparatus 103, a communication means 130 receives the ID number and password that were input by the employee and a verification/authorization means 131 checks whether or not the combination of ID number and password received by the communication means 130 exists in the identification-storage means 132. The combinations of ID numbers and passwords of people that can use the personnel-procedures-processing system (hereafter called PPP system) are registered beforehand in the identification-storage means 132.

When the combination of ID number and password received by the communication means 130 exists in the identification-storage means 132, the verification/authorization means 131 determines that it is possible for the employee to use the PPP system. According to this judgment, the verification/authorization apparatus 103 sends the ID number to the PPP apparatus 104 to store it in the memory means 145 of the PPP apparatus 104.

On the other hand, when the combination of the ID number and password received by the communication means 130 does not exist in the identification-storage means 132, the verification/authorization means 131 determines that the employee cannot use the PPP system. The verification/authorization apparatus 103 send disapproval information indicating that to the PP terminal 101, and by displaying a message on the display 112 of the PP terminal 101, the employee is prompted to enter the personal ID number and password again.

When the verification/authorization means 131 determines that it is possible for the employee to use the PPP system, an execution means 144 sends a first guidance screen to the PP terminal 101 via a communication means 140, communication means 130 and network 102. As shown in FIG. 36, the first guidance screen gives guidance to the user of the PPP system on how to select whether to perform 'User Procedures', or 'Family Procedures'. This first guidance screen is received by the PP terminal 101 via the communication means 110 and displayed on the display 112.

When the user or employee is going to perform 'User Procedures', the employee selects the item 'User Procedures' in the first guidance screen displayed on the display 112 as shown in FIG. 36 using the input-selection means 111. On the other hand, when the employee is going to perform 'Family Procedures', the employee selects the item 'Family Procedures' in the first guidance screen displayed on the display 112 as shown in FIG. 36 using the input-selection means 111. After the employee selects either 'User Procedures' or 'Family Procedures' in this way, a selection-judgment means 114 determines which item was selected, and sends the judgment result to the PPP apparatus 104 via the communication means 110, network 2 and communication means 130.

In the PPP apparatus, the communication means 140 receives the judgment result indicating which item, 'User Procedures' or 'Family Procedures', was selected, and based on that judgment result, the execution means 144 activates either the user-procedures means 146 or family-procedures means 147. For example, when the first guidance screen was displayed on the display 112 and the employee selected 'User Procedures', the execution means 144 activates the user-procedures means 146, however, on the other hand, when the employee selected 'Family Procedures', the execution means 144 activates the family-procedures means 147.

The case of when the employee selected 'User Procedures' will be explained below. In this case, the execution means 144 activates the user-procedures means 146, and the user-procedures means 146 sends a second guidance screen to the PP terminal 101 via the communication means 140, communication means 130 and network 102 to prompt the user or employee to make a selection. For example, as shown in FIG. 37, this second guidance screen prompts the user to select from among the 'User Procedures' items whether to perform (A) 'Address Procedures', (3) 'Salary Bank Account Change', (4) 'Congratulations/Condolence Notice', (5) 'Employee Savings Amount Change', (6) 'Name Change', (7) 'Holdings Procedures', or (8) 'Benefits/Assets Change'. This second guidance screen is received by the communication means 110 of the PP terminal 101 and displayed on the display 112.

Also, when the user or employee is going to perform (A) 'Address Procedures', the employee selects the item 'Address Procedures' in the second guidance screen that is displayed on the display 112 as shown in FIG. 37 using the input-selection means 111. On the other hand, when the employee is going to register changes in one of the items (3) 'Salary Bank Account Change' to (8) 'Benefits/Assets Change', the employee uses the input-selection means 111 and selects the item for which changes are to be registered from among the items of the second guidance screen that is displayed on the display 112. After the employee selects 'Address Procedures' or one of the registration items in this way, the selection-judgment means 114 determines which item was selected and sends the judgment result to the PPP apparatus 104 via communication means 110, network 102 and communication means 130.

Suppose that when the second guidance screen was displayed on the display 112 the employee selected (A) 'Address Procedures', the execution means 144 activates the address-procedures means 148 via the user-procedures means 146. The activated address-procedures means 148 sends a third guidance screen (see FIG. 38) to the PP terminal 101 to prompt the user or employee to further select a registration item from among the items (1) 'Address Change' or (2) 'Commute Reimbursement Change'. This third guidance screen is received by the communication means 110 in the PP terminal 101 and displayed on the display 112.

When the employee is going to register a change in address, the employee uses the input-selection means 111 and selects (1) 'Address Change', and when the employee is going to register a change in the commute reimbursement after a change in address, the employee selects (2) 'Commute Reimbursement Change'. After the employee has selected the registration item in this way, the selection-judgment means 114 determines which registration item was selected and sends that judgment result to the PPP apparatus 104.

In the PPP apparatus 104, the communication means 140 receives the judgment result indicating which registration item, (1) 'Address Change' or (2) 'Commute Reimbursement Change', was selected, and the execution means 144 activates the guidance means 149 related to the registration item selected by the employee via the user-procedures means 146 and address-procedures means 148. For example, when the employee selects registration item (1) 'Address Change', the execution means 144 activates the address-change-guidance means 149a, and when the employee selects registration item (2) 'Commute Reimbursement Change', the execution means 144 activates the commute-reimbursement-change-guidance means 149b.

The activated address-change-guidance means 149a or commute-reimbursement-guidance means 149b sends guidance data corresponding to the registration item selected by the employee to the PP terminal 101.

The guidance data that are sent to the PP terminal 101 are displayed on the display 112, and the employee enters contents in the prescribed fields of the guidance screen as described above. After entering the contents, the entered contents are sent as described above to the PPP apparatus 104, where it is attached to the pre-stored ID number and then stored by the storage means 145.

In other words, the user makes successive selections from a multi-layered menu to finally select a certain item, and then guidance data for prompting input of the contents is sent to the PP terminal for the first time.

Similarly, when the employee selected 'Family Procedures' when the first guidance screen (see FIG. 36) was displayed, the execution means 144 activates the family-procedures means 147, and sends a fourth guidance screen to the PP terminal 101 to prompt the user or employee to select a registration item from among the 'Family Procedures' to perform. As shown in FIG. 39, this fourth guidance prompts the user of the PPP system to select a registration item, (9) 'Wife Gives Birth', (10) 'Dependent Registration' or (11) 'Family Registration', from among the 'Family Procedures' items. Similarly, the employee selects a menu from this fourth guidance screen and performs input, and the input contents are attached to the pre-stored ID number and stored by the storage means 145.

In the past, the employee selected registration items that had to be registered in the PPP apparatus according to personal changes that occurred, and registered the contents of those selected items in the PPP apparatus.

As mentioned above, when personal changes occur in the life of an employee of a company, the employee must register the contents of those personal changes in a PPP system for example. However, it is often unclear what contents must be registered for the personal changes that have occurred. For example, in the case of a marriage, the employee must perform registration for the dependent, change of address, change of name, etc., however, the employee may register the dependent or change of name and forget about registering a change of address, and some of the items that should be registered may not be. Naturally, by constructing a multi-layer menu, input by the employee is made somewhat easier to understand, however, and particularly, in the work related to personnel procedures, the contents that must be registered by the employee are very complex and diverse, so there is never an end to trouble such as input omissions.

In other words, in the past, when an employee had personal changes, the employee did not know all of the items that needed to be registered and so had to inquire with the personnel director.

Also, in a convention PPP system as shown in FIG. 35, for example, when an employee, who checked which items needed to be registered according to personal changes, tried to change 'Commute Reimbursement', as described above, that employee had to activate the user-procedures means 146 and then activate the address-procedures means 148, and finally activate the commute-reimbursement-change-guidance means 149b that corresponded to the registration item (2) 'Commute Reimbursement Change'. However, some users or employees may not know that when changing the 'Commute Reimbursement', after activating the user-procedures means 146 and then the address-procedures means 148, that it is necessary to activate the commute-reimbursement-change-guidance means 149b. Supposing that the employee does know that fact, the employee trying to make changes to the 'Commute Reimbursement' may have problems with the time required for activating the user-procedures means 146 and address-procedures means 148.

SUMMARY OF THE INVENTION

Taking the problems mentioned above into consideration, it is the object of this invention to provide a clerical-procedures-processing apparatus, clerical-procedures-processing system and clerical-procedures-processing method for registering the contents of all necessary registration items according to personal changes to the user, without taking up too much of the user's time.

In order to accomplish the aforementioned objective, this invention employs the following means. In other words, the clerical-procedures-processing apparatus of this invention comprises: a combination-storage means for storing a combination of one or a plurality of registration events that are associated with a procedure subject, and the procedure subject relating to clerical procedures; and a plurality of guidance means for a plurality of registration events that guide or prompt the user to input the data about the registration events. Furthermore, a registration-event-extraction means extracts one or a plurality of registration events relating to certain procedures selected by a certain user based on the combination that is stored in the combination-storage means. Next, an execution means activates one or a plurality of the guidance means that correspond to the registration events extracted by the registration-event-extraction means, and a registered-contents-storage means stores the data input by the user about the registration events in response to the guidance means.

By means of the invention, storage means are accessed and the user is presented with a particular, relevant range of choices of events from which to select so that the actual information required can eventually be requested and input. In this way, the apparatus operates much more efficiently for the user. The user can enter the required data in less time. Also, the user is asked fewer questions and is not distracted by irrelevant choices. The data in the system is thus more reliable, because data entry is more effective, reliable and complete. The apparatus can thus be relied upon by the company which needs the information from the user. The apparatus is also easier for the user to use, as well as being faster for the user to use. And, it is possible to register all of the registration items for personal changes to the user that are necessary for clerical procedures.

Moreover, the registration-event-extraction means, which comprises an attribute-confirmation means that checks the user attributes based on identifiers that are input by the user for identifying the user, is constructed such that it extracts one or a plurality of registration events based on procedures selected by the user and on the attributes checked by the attribute-confirmation means.

With this construction, it is possible to display different registration events for each user according the department that the user belongs to, and thus it is possible to display a unique menu for each user that takes into consideration the different departments or the like within the company. In doing so, registration events that are not relating to the user are not extracted, so it is possible to prevent the user from entering contents for unnecessary registration events.

Furthermore, the registration-event-extraction means extracts one or a plurality of registration events based on personal information.

With this construction, only registration events that correspond to individual conditions, as well as personal attributes, are extracted, so it is even more possible to prevent the user from entering contents for unnecessary registration events.

Furthermore, the apparatus may comprise a manual-call-up means for proving the user with a manual corresponding to the selected procedure subject, based on the procedure subject selected by the user, attributes checked by the attribute-confirmation means and personal information.

With this construction, the complex clerical procedures process is explained in an easy-to-understand format for each individual user, making it possible to prevent the user from omitting to enter all of the contents for the registration events described later.

Moreover, the apparatus may be constructed such that when the registered-contents-storage means stores an instruction from the user to postpone registration of the contents for the registration events, the execution means will activate the guidance means corresponding to the postponed registration events when there is an instruction from the user, after registering the postponement instruction, to restart registration of the contents of the registration events corresponding to the postponement instruction.

With this construction, a user that does not have the necessary information to be entered can enter that information immediately at a later date.

It is also possible to construct a clerical-procedures-processing system comprising: a clerical procedures terminal, having a procedure-subject-selection means for prompting the user to select certain procedure subject for the clerical procedures, a display means for displaying guidance for guiding or prompting the user to register contents for registration events relating to the procedure subject selected by the user, and a registered-contents-receiving means for receiving contents of the registered events from the user; and a clerical-procedures-processing apparatus.

By using the clerical-procedures-processing apparatus and clerical-procedures-processing system of this invention, the user can perform registration of the contents of all registration events of procedures that correspond to personal changes to the user.

BRIEF DESCRIPTION OF THE DRAWINGS

FIG. 18 is a first drawing of an example of the manual of an embodiment of the invention.

FIG. 28 is a drawing showing the 'Salary Deposit Account' guidance screen of an embodiment of the invention.

FIG. 31 is a drawing showing the 'Congratulations/Condolence Notice' guidance screen of an embodiment of the invention.

FIG. 32 is a drawing showing the 'Name Change' guidance screen of an embodiment of the invention.

FIG. 33 is a drawing showing the 'Dependent Registration' guidance screen of an embodiment of the invention.

FIG. 34 is a drawing showing the 'Family Registration' guidance screen of an embodiment of the invention.

FIG. 37 is a drawing showing the second guidance screen in a prior PPP system.

FIG. 38 is a drawing showing the second guidance screen in a prior PPP system.

DESCRIPTION OF THE PREFERRED EMBODIMENTS

The construction and operation of the PPP system of the preferred embodiment of the invention will be explained below with reference to the drawings.

Figure 1:
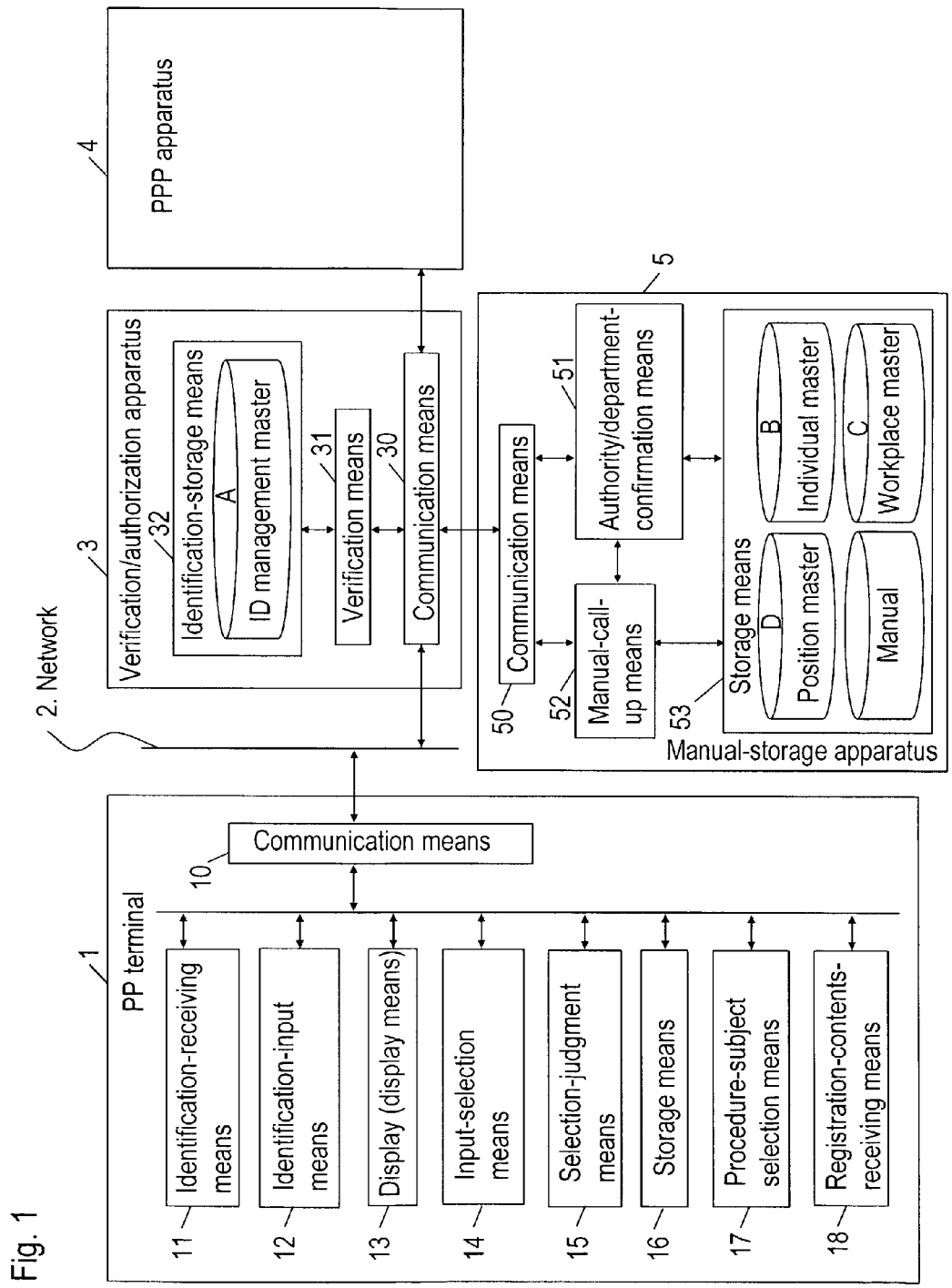
FIG. 1 is a schematic drawing of the PPP system of an embodiment of the invention.
Figure 2:
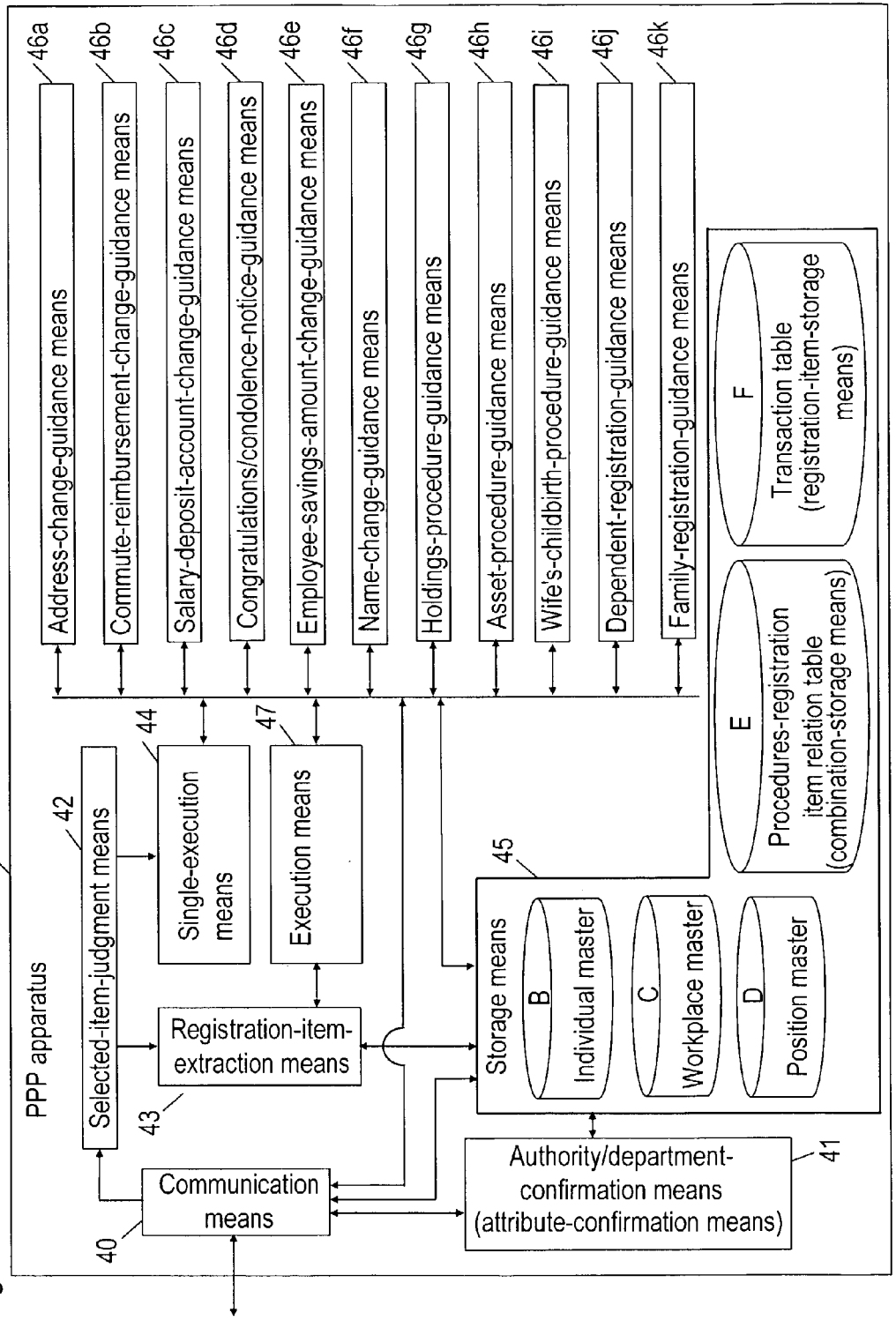
FIG. 2 is a detailed schematic drawing of the PPP apparatus of an embodiment of the invention.
Figure 3:
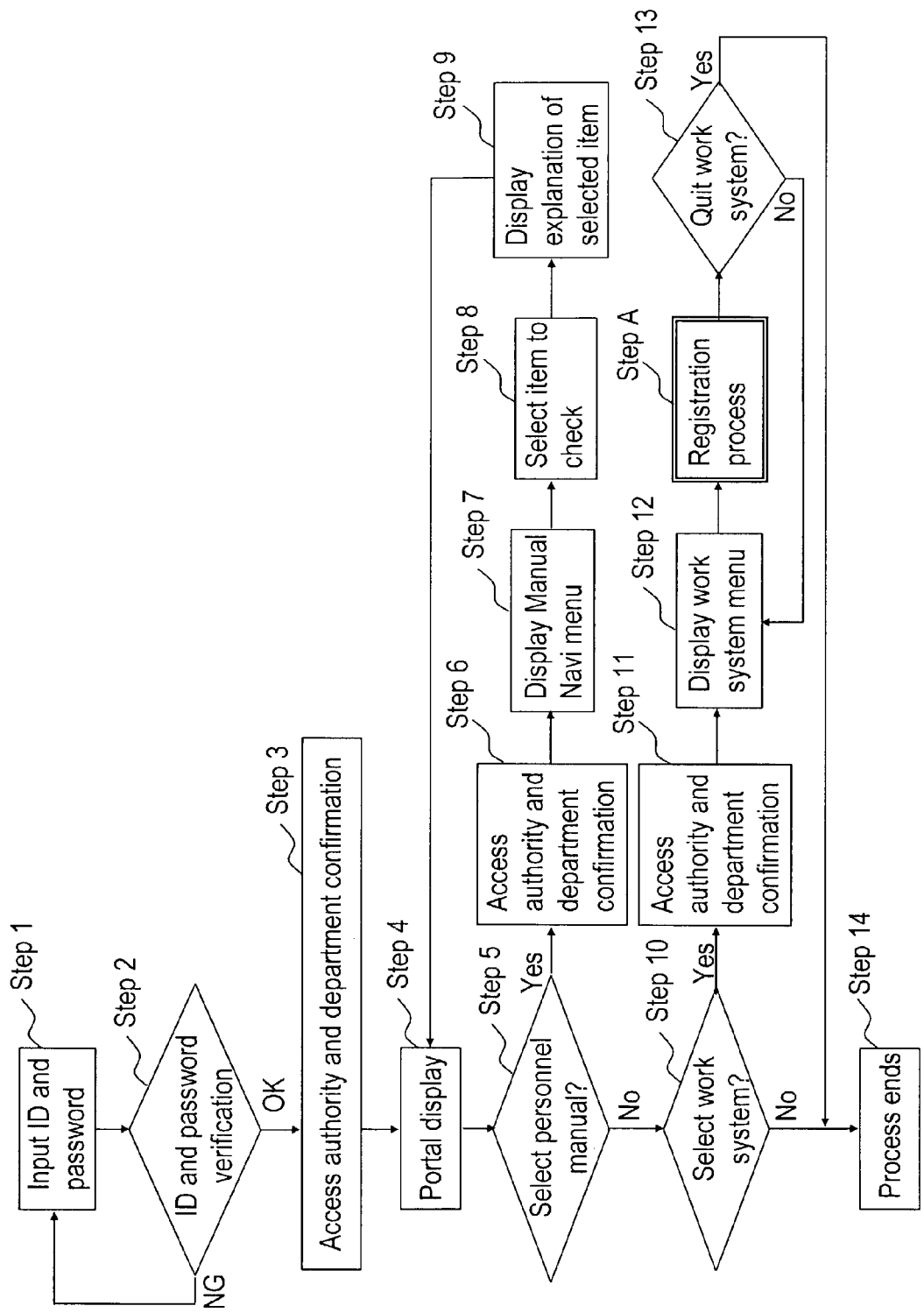
FIG. 3 is a first drawing showing the operating procedure of the PPP system of an embodiment of the invention.
Figure 4:
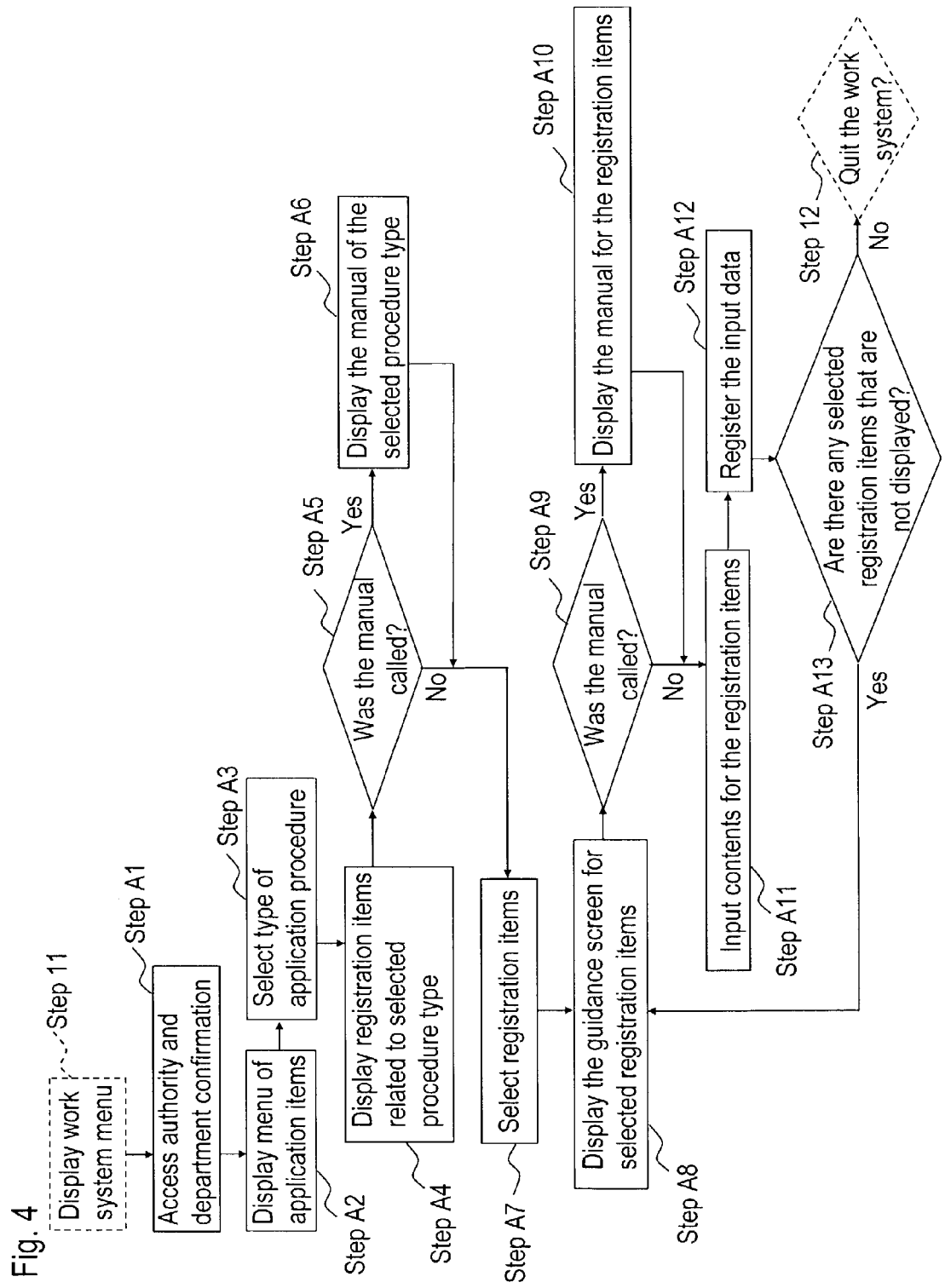
FIG. 4 is a second drawing showing the operating procedure of the PPP system of an embodiment of the invention.
Figure 5:
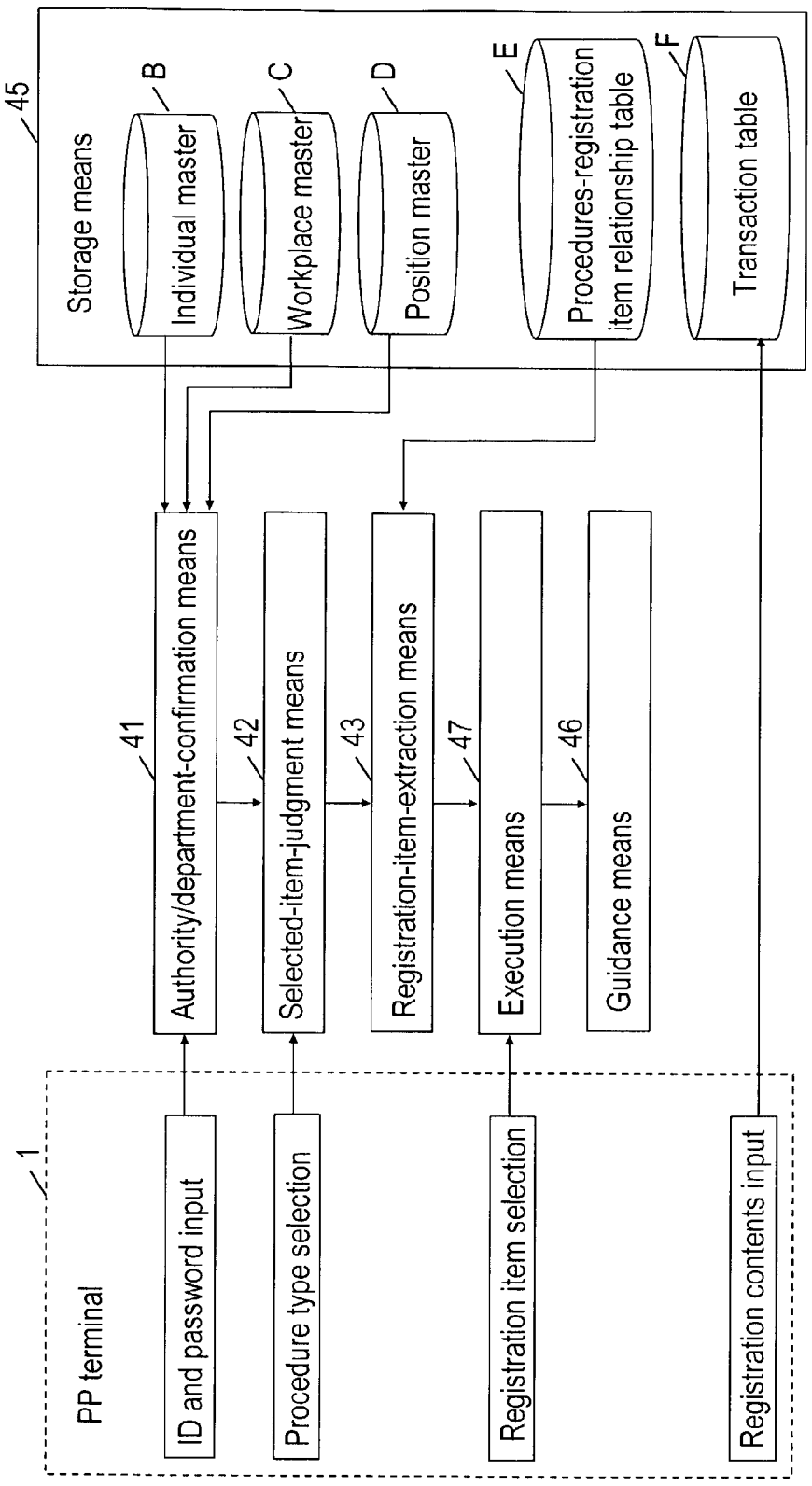
FIG. 5 is a drawing giving a summary of the major processes of the PPP apparatus of an embodiment of the invention.

FIG. 1 is a schematic drawing of the PPP system. As shown in FIG. 1, the PPP system of this embodiment of the invention comprises: a PP terminal 1, network 2, verification/authorization apparatus 3, PPP apparatus 4, and manual-storage apparatus 5. The PP terminal 1 can be a personal computer, or can also be an input terminal that can be connected to general-purpose computer. Also, the PPP apparatus 4 can be a workstation, or can also be a general-purpose computer. Here, the kind of guidance screens from the PPP apparatus 4 use ML (Markup Language) and are sent to the PP terminal. FIG. 2 is a drawing showing details of the PPP apparatus 4. Also, FIG. 3 and FIG. 4 show the operating procedure of the PPP system of this embodiment, and FIG. 5 shows a summary of the main processes of the PPP apparatus 4 of this embodiment.

In this embodiment, an example of when personal changes such as a marriage occurred, and an employee of a company performing personnel procedures before the year-end tax adjustment that corresponding to the personal change and the year-end tax adjustment is explained. The personnel procedures referred to here are procedures for collecting and managing information (personnel information) necessary for processes performed by the company for each employee such as paying salary or year-end tax adjustment. In these personnel procedures, a plurality of procedures is divided into procedure subjects, and those procedure subjects are further comprised of related registration items.

For example, when personnel procedures such as personal changes are performed in-house, the employee registers the contents of registration items related to procedure subject in the PPP apparatus 4, and that registration is performed using the PP terminal 1. In other words, procedures for personal changes or year-end tax adjustment are performed in-house, the employee uses the PPP system of this embodiment that comprises a PP terminal 1 and PPP apparatus 4.

When using the PPP system, the system first performs a verification process of determining whether or not the employee can used the PPP system. The contents of that verification process will be explained below.

<Verification Process>

Figure 6:
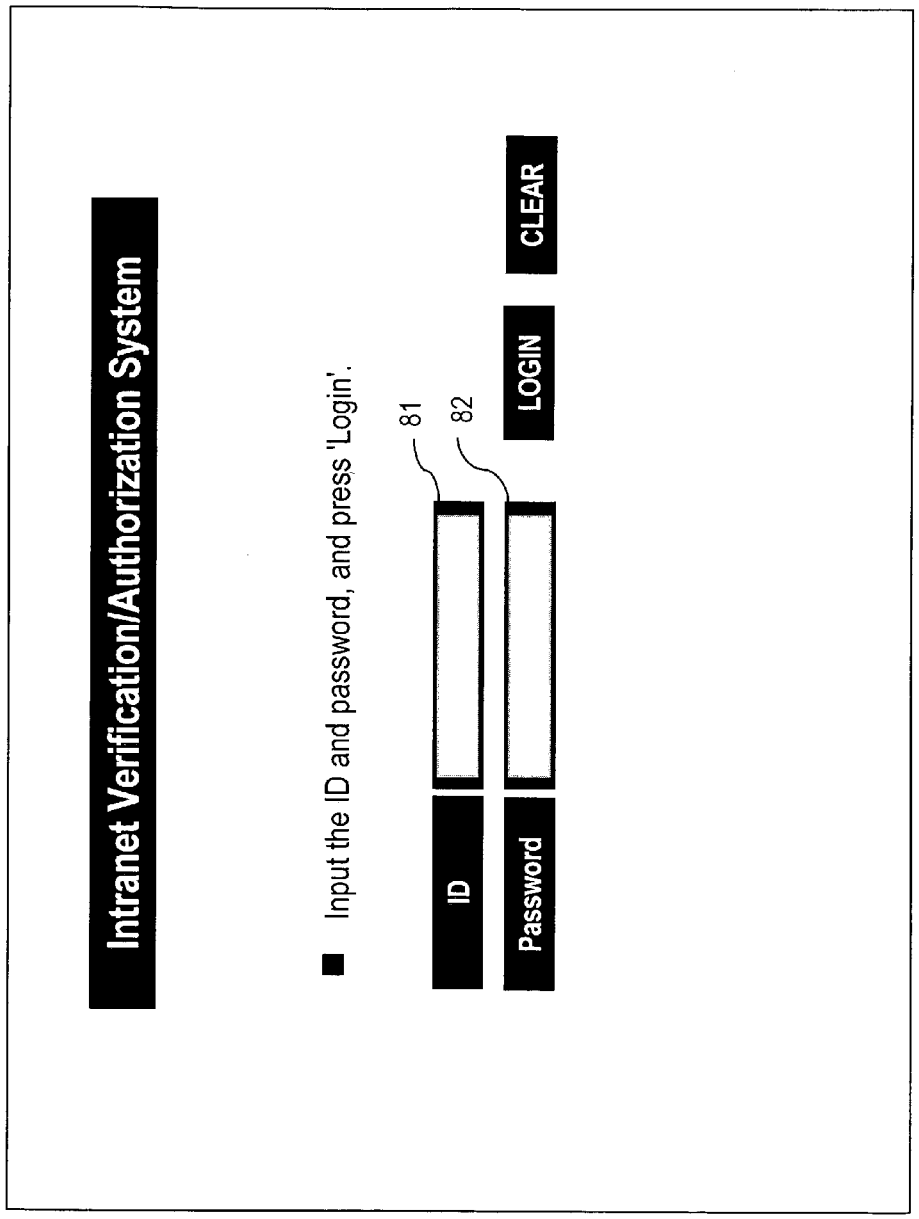
FIG. 6 is a drawing showing the ID number and password input screen of an embodiment of the invention.

The employee trying to use the PPP system first turns ON the PP terminal 1. After the PP terminal 1 has been turned ON, the identification-receiving means 11 displays a screen having a 'ID Number Input Field 81' and 'Password Input Field 82' as shown in FIG. 6 on the display (display means) 13 to prompt the employee to enter an ID number and password.

After the ID number input field 81 and password input field 82 are displayed on the display 13 in this way, the employee uses the identification-input means 12 and enters his/her own ID number and password in the 'ID Number Input Field 81' and 'Password Input Field 82' (step 1). For example, when the identification-input means 12 comprises a mouse and keyboard, the employee uses the mouse to move the cursor in turn over the ID number input field 81 and password input field 82, and uses the keyboard to enter his/her own ID number and password in the 'ID Number Input Field 81' and 'Password Input Field 82'. The input ID number and password are received by the identification-receiving means 11 and sent by the communication means 10 via the network 2 to the verification/authorization apparatus 3.

In the verification/authorization apparatus 3, the communication means 30 receives the ID number and password that were input by the employee, and the verification/authorization means 31 checks whether or not the combination of ID number and password received by the communication means 30 exists in the ID management master A that is stored in the identification-storage means 32 (step 2). Combinations of ID numbers and passwords of people who can use the PPP system are pre-registered and exist in the ID management master A.

When the combination of the ID number and password received by the communication means 30 exists in the ID management master A, the verification/authorization means 31 determines that the employee who input the ID number and password can use the PPP system. Also, the verification/authorization means 31 sends the ID number received by the communication means 30 to the PPP apparatus 4 and manual-storage apparatus 5 via the communication means 30.

After the verification/authorization means 31 determines in this way that the employee can use the PPP system, the employee can uses the PP terminal 1 and register the registration contents in the PPP apparatus 4 as will be described below. The ID number that was sent by the communication means 30 is stored temporarily in both the storage means 45 in the PPP apparatus and the storage means 53 in the manual-storage means 5.

On the other hand, when the combination of the ID number and password received by communication means 30 does not exist in the ID management master A, the verification/authorization means 31 determines that the employee that input the ID number and password cannot use the PPP system. Also, the verification/authorization means 31 sends authorization-denied data to the PP terminal 1 via the communication means 30 and network 2 indicating that the employee cannot use the PPP system. This authorization-denied data is received by communication means 10 and displayed on the display 13. When the authorization-denied data is displayed on the display 13 in this way, the employee can input his/her ID number and password again (step 1).

Next, the processes of this embodiment after the verification/authorization means 31 determines that the employee can use the PPP system will be explained.

After it has been determined that the employee can use the PPP system, a confirmation process is performed to check the employee's access authority and department (one example of attributes). The contents of that confirmation process will be explained below. The access authority referred to is a preset range that is based on the employee's position and indicates to what extent the employee can use and access the plurality of items and information contained in the PPP system, and the position refers to the employee's position in the company. How much each employee is able to use and access the PPP system differs depending on his/her access authority, so the confirmation process check the access authority of an employee who has been determined to be able to use the PPP system. How much each employee can use and access the items and information also differs according to the department in which they work even though the position may be the same, so the department in the company of an employ determined capable of using the PPP system is checked.

<Display of a Portal Site Corresponding to an Authorized User>

After it has been determined that the employee can use the PPP system as described above, the ID number of that employee is sent to the PPP apparatus 4. That ID number is received by the communication means 40 and an authority/department-confirmation means 41 (example of an attribute-confirmation means) confirms, as described below, the access authority and department of the employee whose ID was received by the communication means 41 (step 3).

In other words, the authority/department-confirmation means 41 first searches the individual master B (see FIG. 7) that is stored in the storage means 45 for the individual master card b in which the ID number received by the communication means 40 is recorded, and detects the workplace code indicating the department of the employee whose ID number was received by communication means 40, and the position code that specifies the access authority of that employee.

Figure 7:
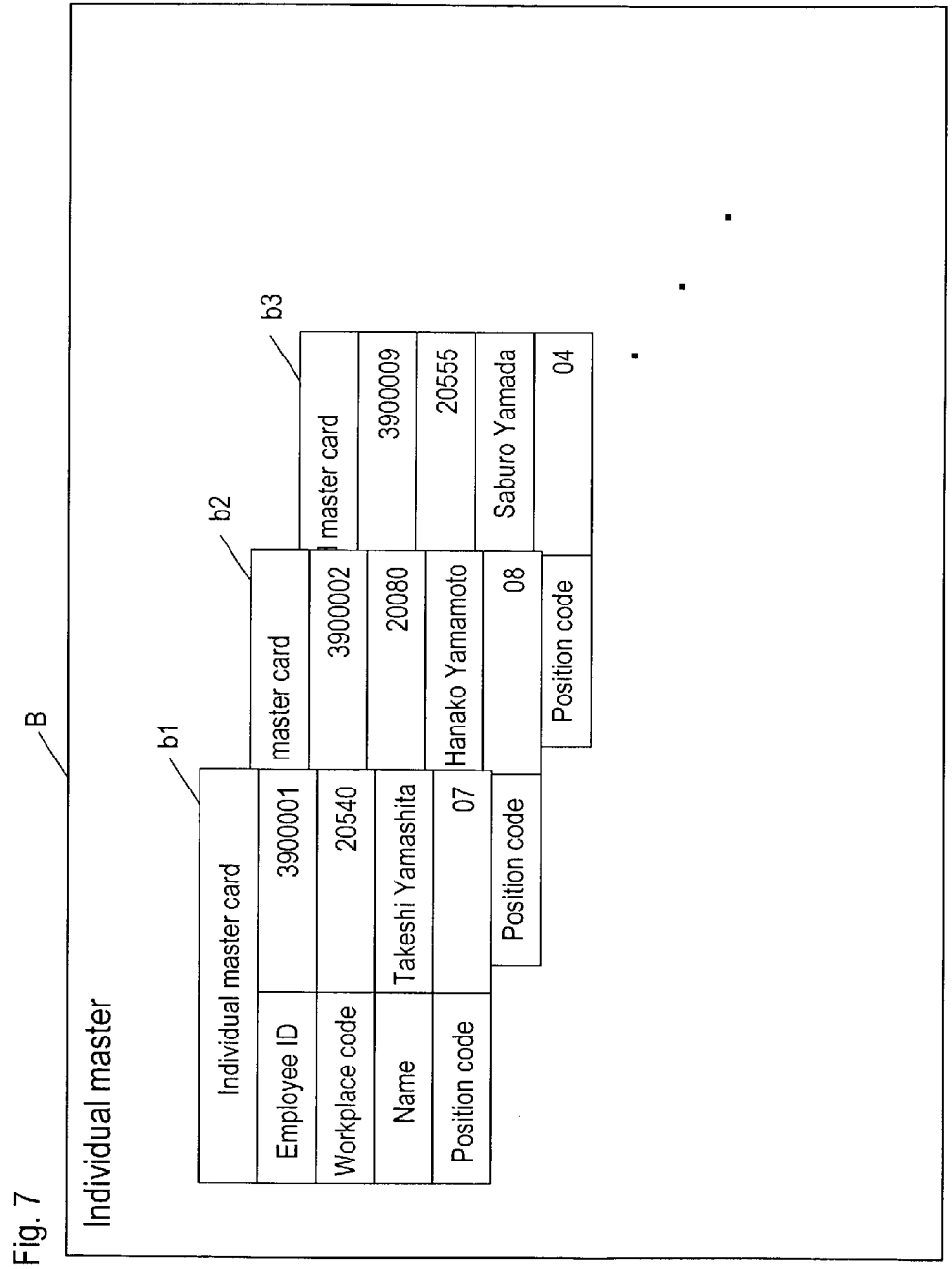
FIG. 7 is a diagram of a personal mask of an embodiment of the invention.

As shown in FIG. 7, in the individual master B there are individual master cards b containing the employee ID, workplace code, name and position code for each of the employees, and these individual master cards b for each of the employees are segregated and filed. For example, it is written in the individual master card b1 of an employee whose employee ID is '3900001' that the workplace code is '20540', the name is 'Takeshi Yamashita' and that the position code is '07'. Also, the individual master card b1 of the employee whose employee ID is '3900001' and the individual master card b2 of an employee whose employee ID is '3900002' are segregated and filed in the individual master B.

Therefore, if the ID number received by communication means 40 is '3900001', the authority/department-confirmation means 41 searches for the individual master card b1 in which the ID number '3900001' is written. Also, the authority/department-confirmation means 41 detects that the workplace code of the employee having ID number '3900001' is '20540' and that the position code is '07'. Each of the individual master cards b are digitized data.

Next, the authority/department-confirmation means 41 searches the workplace master C (see FIG. 8) stored in the storage means 45 for the workplace master card c on which the workplace code detected as described above is recorded, and detects the group-classification code in which the workplace with that workplace code belongs. When related departments are grouped into one group, and there are some departments belong to several groups, the group-classification code indicates which departments belong to which groups. For example, the 'Video Department' and the 'Television Department' are both departments related to audio equipment and have that in common, so they belong to the same group and are given the same group-classification code.

Figure 8:
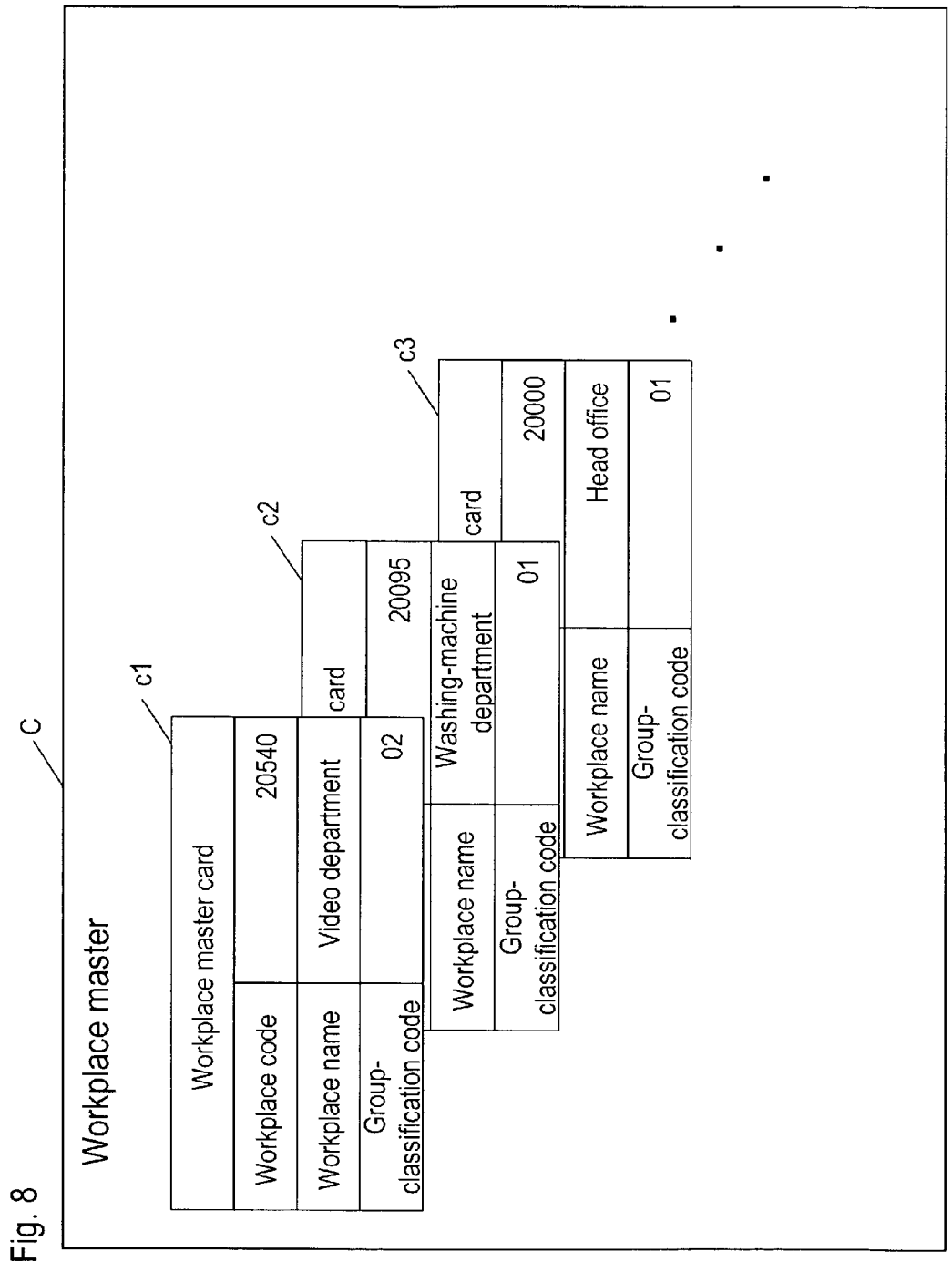
FIG. 8 is a diagram of a workplace master of an embodiment of the invention.

As shown in FIG. 8, there are workplace master cards c containing the workplace code, workplace name and group-classification code for several departments in the workplace master C, these workplace master cards c for each of the departments are segregated and filed. For example, it is written in workplace card c1 of a workplace whose workplace code is '20540' that the workplace name is 'Video Department' and the group-classification code is '02'. Also, workplace master card c1 of the video department, whose workplace code is '20540', and workplace master card c2 of the washing-machine department, whose workplace code is '20095', are segregated and filed in the workplace master C.

Therefore, after the authority/department-confirmation means 41 detects that the workplace code of the employee whose ID number is '3900001' is '20540', the authority/department-confirmation means 41 searches for workplace master card c1 on which the workplace code '20540' is written. Also, the authority/department-confirmation means 41 detects that the workplace name of the workplace whose workplace code is '20540' is 'Video Department' and that the group-classification code is '02'. The workplace master cards c are also digitized data.

Furthermore, the authority/department-confirmation means 41 searches the position master D (see FIG. 9) that is stored in the storage means 45 for the position master card d recorded with the position code detected as described above, and detects the position name of the position with that position code.

Figure 9:
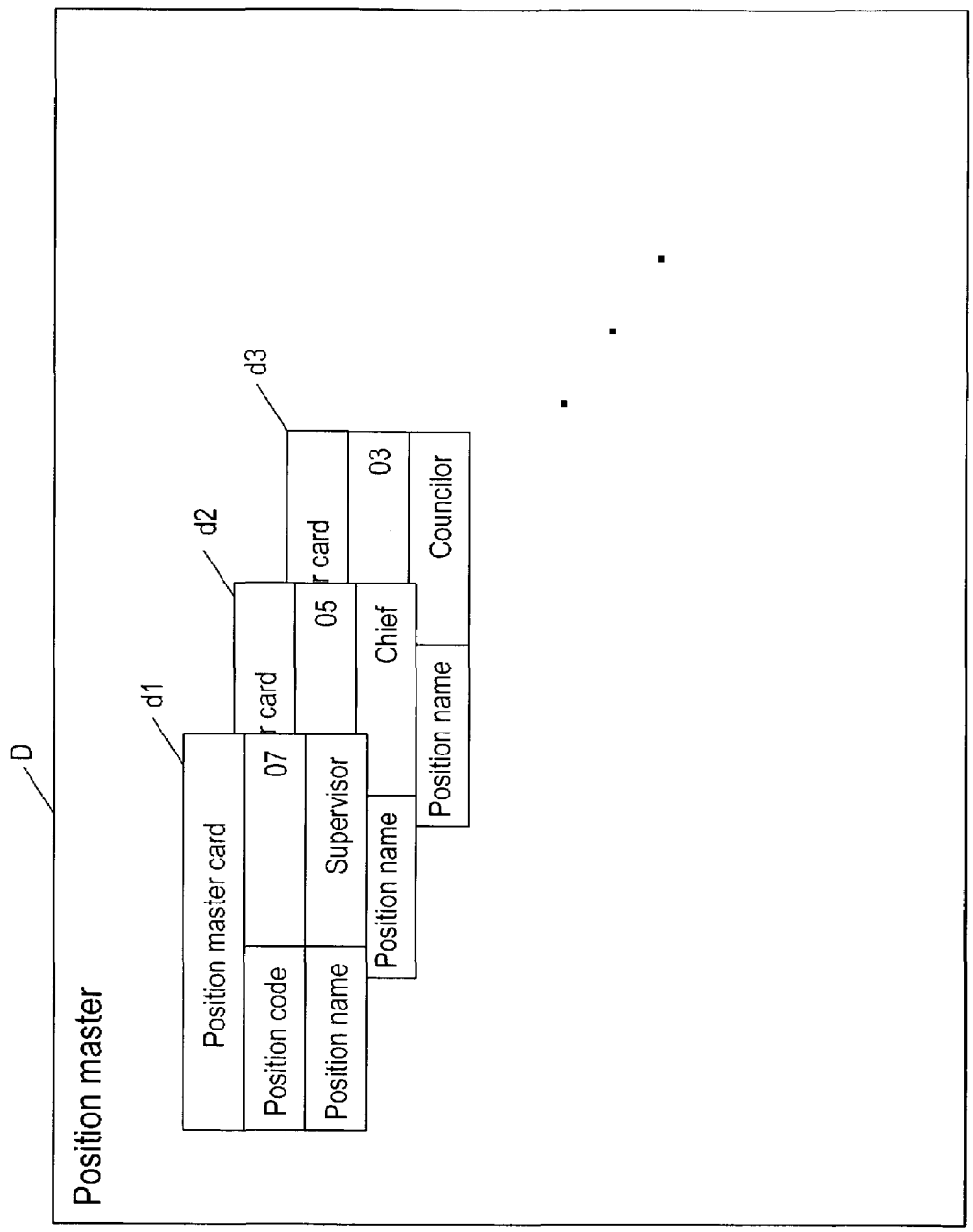
FIG. 9 is a diagram of a position master of an embodiment of the invention.

As shown in FIG. 9, in the position master card D there are position master cards d on which the position code and position name are written for a plurality of positions, and the position master cards d of each of these positions are segregated and filed. For example, it is written in the position master card d1 for the position whose position code is '07' that the position name is 'Supervisor'. Also, the position master card d1 for the position whose position code is '07' and the position master card for the position whose position code is '05' are segregated and filed in the position master D.

Therefore, after the authority/department-confirmation means 41 detects that the position code of the employee whose ID number is '3900001' is '07' as described above, the authority/department-confirmation means 41 searches for the position master card d1 on which the position code '07' is written, and detects that the position name of the position whose position code is '07' is 'Supervisor'. Each of the position master cards d are digitized data.

After the authority/department-confirmation means 41 detects the group-classification code and position code corresponding to the ID number received by communication means 40 in this way, next the data on the portal screen corresponding to the combination of detected group code and position code are sent to the PP terminal 1 via communication means 40, communication means 30 and network 2. The portal screen is the first guidance screen provided to an employee who was determined by the verification/authorization means 31 to be able to use the PPP system.

Figure 10:
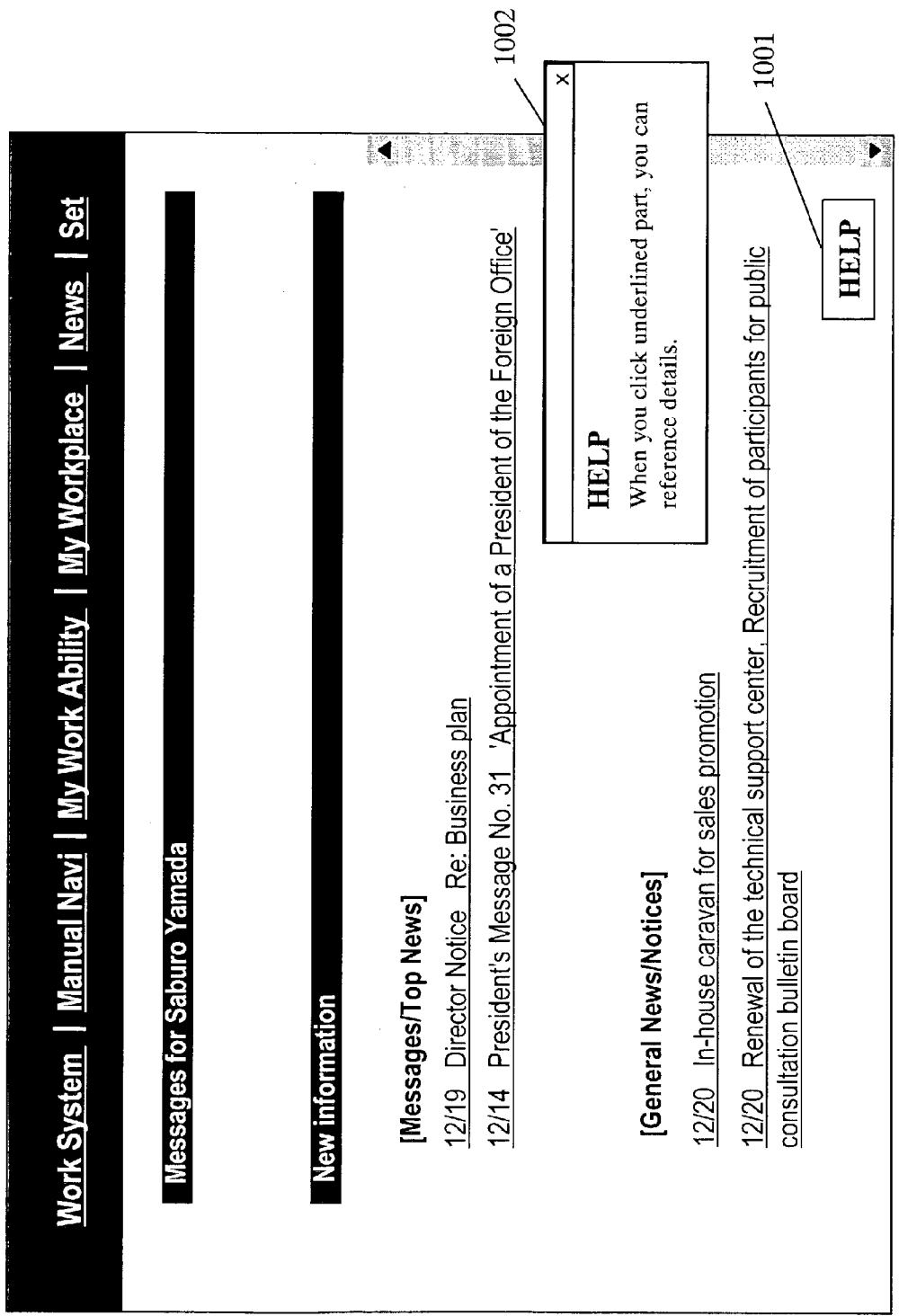
FIG. 10 is a first drawing of an example of a portal image of an embodiment of the invention.
Figure 11:
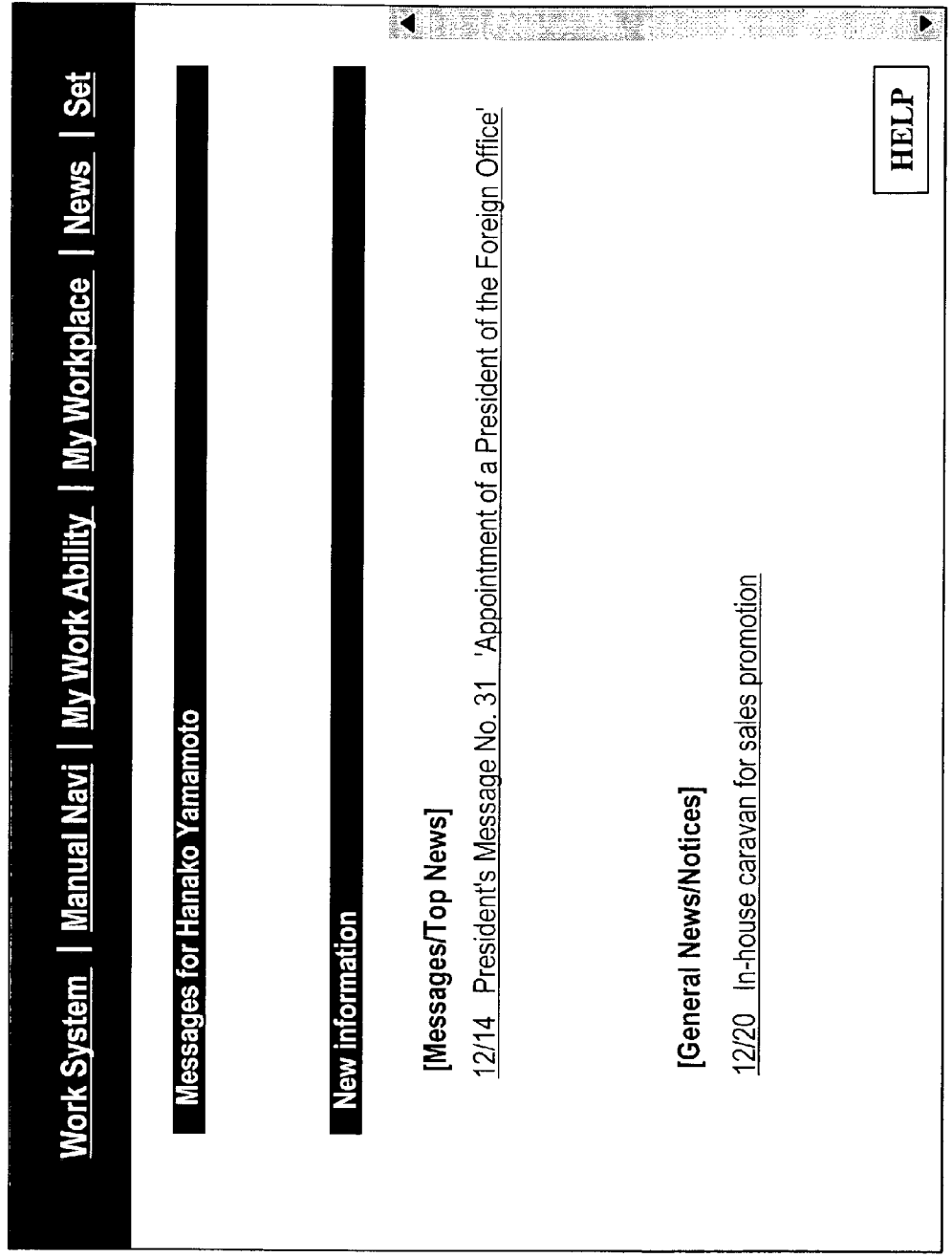
FIG. 11 is a second drawing of an example of a portal image of an embodiment of the invention.
Figure 12:
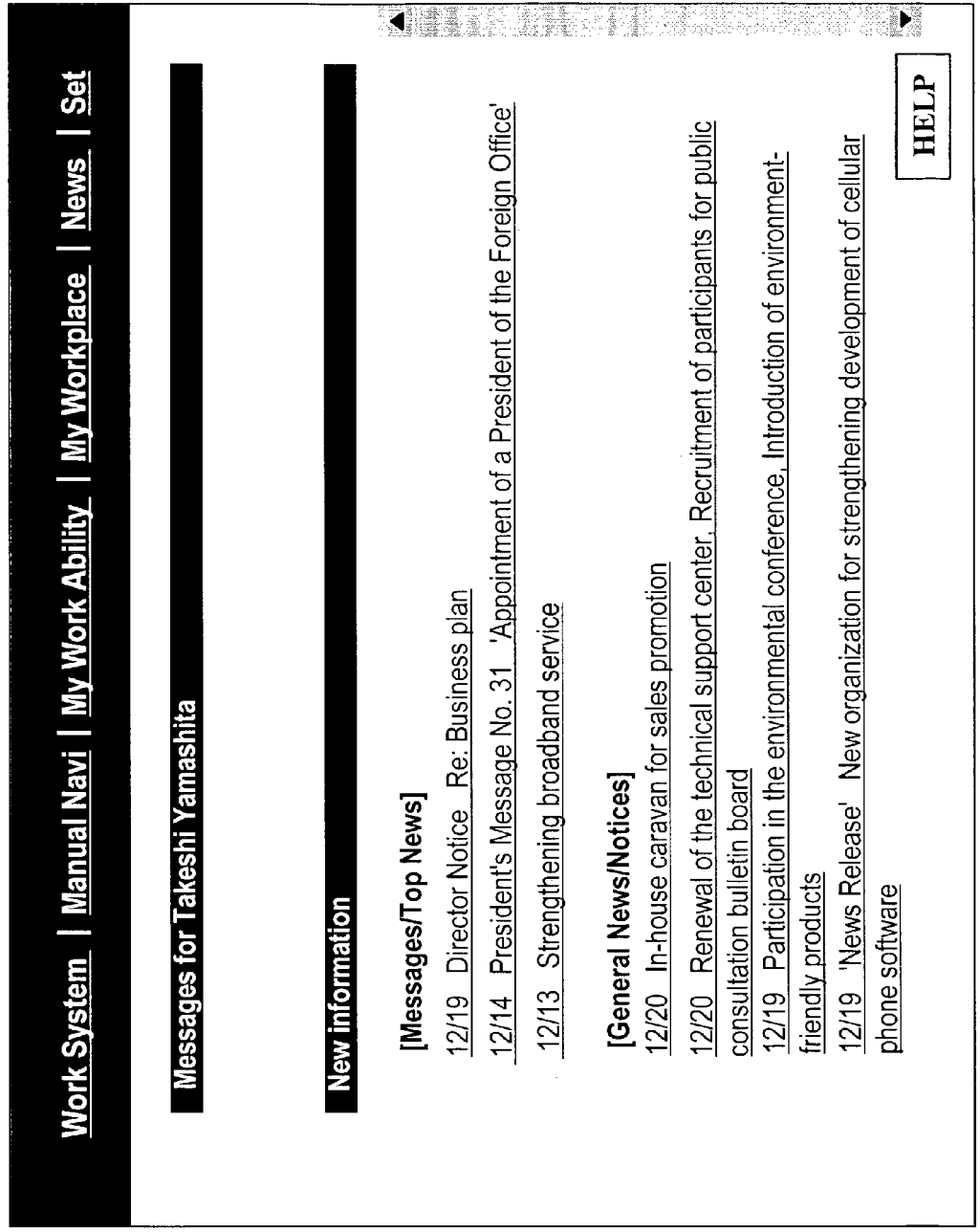
FIG. 12 is a third drawing of an example of a portal image of an embodiment of the invention.
Figure 13:
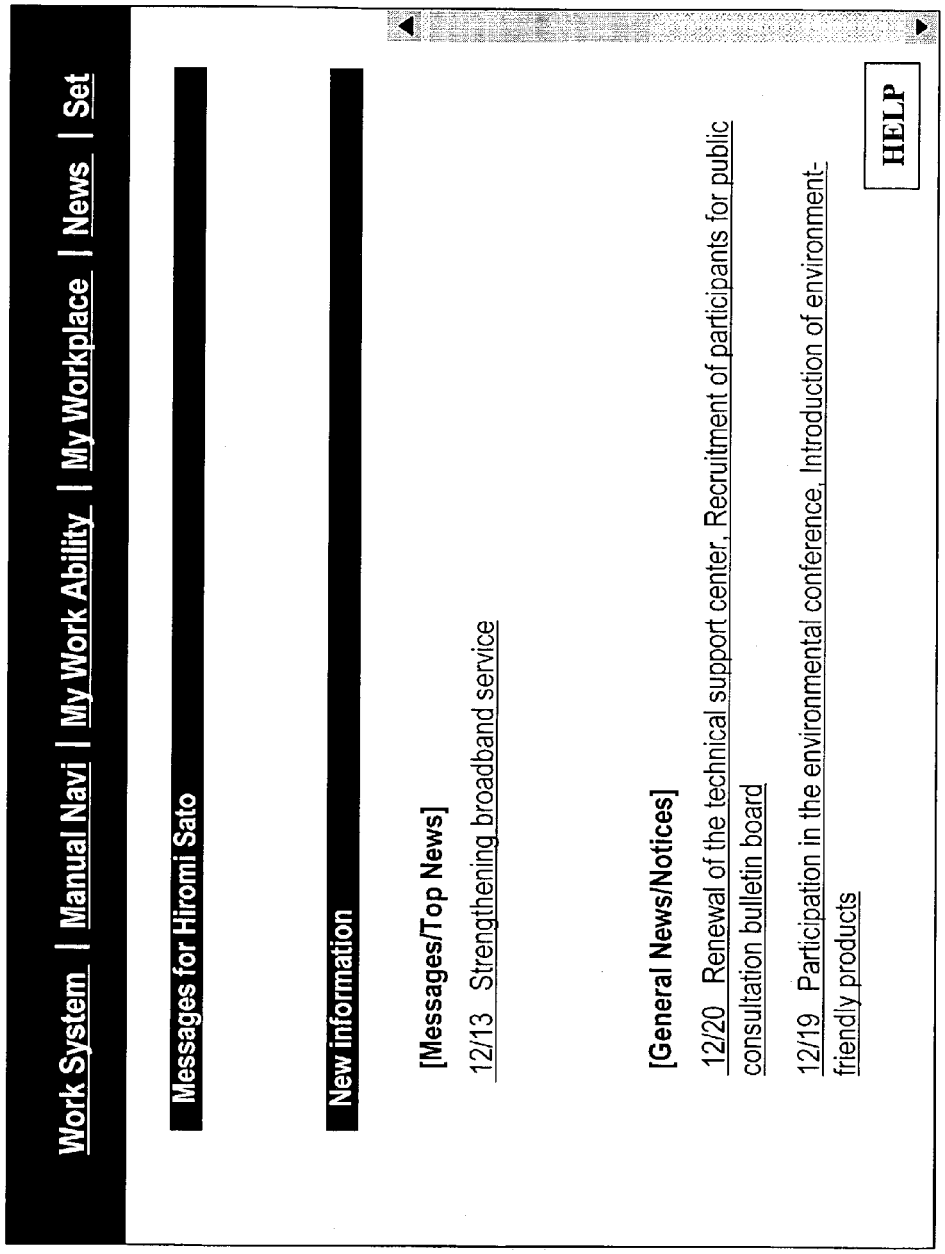
FIG. 13 is a fourth drawing of an example of a portal image of an embodiment of the invention.

Examples of that portal screen are shown in FIG. 10 to FIG. 13. FIG. 10 is an example of the portal screen provided to an employee whose group-classification code is '01' and whose position code is '01' to '04'; FIG. 11 is an example of the portal screen provided to an employee whose group-classification code is '01' and whose position code is '05' to '08'; FIG. 12 is an example of the portal screen provided to an employee whose group-classification code is '02' and whose position code is '01' to '04'; and FIG. 13 is an example of the portal screen provided to an employee whose group-classification code is '02' and whose position code is '05' to '08'.

In other words, in the example above, the group-classification code of an employee who is a councilor in the washing-machine department is '01', and the position code is '03', so the portal screen for an employee who is a councilor in the washing-machine department is the portal screen shown in FIG. 10. Also, the group-classification code of an employee who is a supervisor in the washing-machine department is '01' and the position code is '07', so the portal screen for an employee who is a supervisor in the washing-machine department is the portal screen shown in FIG. 11.

Moreover, the group-classification code of an employee who is a councilor in the video department is '02', and the position code is '03', so the portal screen for an employee who is a councilor in the video department is the portal screen shown in FIG. 12. Also, the group-classification code of an employee who is a supervisor in the video department is '02' and the position code is '07', so the portal screen for an employee who is a supervisor in the video department is the portal screen shown in FIG. 13.

In this way, the contents of the portal screen differ according to the access authority and department of the employee using the PPP system. In other words, as shown in FIG. 10 and FIG. 11, even though employees belong to the same washing-machine department, the contents of the portal screen provided to the employee who is a councilor is different from the portal screen provided to the employee who is a supervisor. Similarly, as shown in FIG. 12 and FIG. 13, even though employees belong to the same video department, the contents of the portal screen provided to the employee who is a councilor is different from the portal screen provided to the employee who is a supervisor.

Also, as can be seen from FIG. 10 and FIG. 12, even though employees are both secretaries, the contents of the portal screen provided the employee belonging to the washing-machine department is different from the portal screen provided to the employee belonging to the video department. Similarly, as can be seen from FIG. 11 and FIG. 13, even though employees are both supervisors, the contents of the portal screen provided the employee belonging to the washing-machine department is different from the portal screen provided to the employee belonging to the video department.

Therefore, after the authority/department-confirmation means 41 detects the group-classification code and the position code corresponding to the ID number received by communication means 40, it extracts the portal screen data corresponding to the combination of the detected group-classification code and position code and send it to the PP terminal 1.

For example, when the ID number received by communication means 40 is '3900001', the authority/department-confirmation means 41 sends the portal screen data corresponding to the group-classification code '02' and position code '07' shown in FIG. 13 to the PP terminal 1 via communication means 40.

The portal screen data sent to the PP terminal 1 are received by the communication means 10 in the PP terminal 1 and that portal screen is displayed on the display 13 (step 4).

<Manual Navi>

As shown in FIG. 10 to FIG. 13, the portal screen contains an item called 'Manual Navi' and an item called 'Work System'.

After the portal screen is displayed on the display 13 of the PP terminal 1 in this way, when the employee selects the item 'Work System', it is possible for the employee to register contents for the registration items related to the procedure subject in the PPP apparatus 4. The procedure subject is a subject indicating a procedure corresponding to the personal changes to the employee. The registration items are equal to registration events, and can be called elements making up the procedure subject, and the procedure subject may be made up of one or a plurality of registration items. For example, by selecting a procedure subject that corresponds to the personal change to the employee, it becomes possible to enter the contents for the one or plurality of registration items of that procedure subject. Detailed examples of the procedure subject and registration items will be given later.

There is a possibility that the employee does not fully understand the PPP system, for example the companies system and procedures related to the procedure subject. In that case, in order to be able to provide the user with an explanation of the company policies and procedures, the PPP system has a manual that explains such things as the company policies and procedures. This manual is stored in the manual-storage apparatus 5. The manual referred to here is not the manual (Help function) that explains how to use the OS (Operating System) installed in the PP terminal or PPP apparatus, but can be called a guidance manual explaining the steps of the company policies and procedures. The Help function is the function to show system operation method in sub-window 1002, in particular for example by holding down a "HELP" button 1001 shown in FIG. 10 with the mouse.

Next, the situation of where the employee does not know how to perform the company policies or procedures, and displays the manual that explains that company policies and procedures on the display 13, is explained.

When the employee does not fully understand the PPP system, for example the method of the company policies and procedures related to a procedure subject, the employee uses the input-selection means 14 and selects 'Manual Navi' on the portal screen displayed on the display 13 (step 5). For example, when the input-selection means 14 is a mouse, the employee uses the mouse to move the cursor over the portion displayed as 'Manual Navi' on the portal screen displayed on the display 13, then click the right button of the mouse and selects 'Manual Navi'. In so doing, the selection-judgment means 15 determines that 'Manual Navi' has been selected, and that judgment result is sent to the manual-storage apparatus 5 by communication means 10 via the network 2, and communication means 30 of the verification/authorization apparatus 3.

Similar to the portal screens described above, the manual contents in which the explanation of the company policies and procedures is written differ according to the access authority and department of the employee using the PPP system.

Therefore, after the judgment result indicating that 'Manual Navi' was selected is sent to the manual-storage apparatus 5 and received by the communication means 50, the authority/department-confirmation means 51 checks the access authority and department of the employee whose ID number is temporarily stored in the storage means 53 (step 6). This check of the access authority and department by the authority/department-confirmation means 51 is the same as the check of the access authority and department by the authority/department-confirmation means 41 that has already been explained using FIG. 7 to FIG. 9, so an explanation of it is omitted.

After the authority/department-confirmation means 51 detects the access authority and department of the employee whose ID number is temporarily stored in the storage means 53, or in other words the group-classification code and position code corresponding to ID number of the employee, the manual-call-up means 52 extracts the main menu of the manual corresponding to the detected group-classification code from the storage means 53. Also, the manual-call-up means 52 sends the main menu of the extracted manual to the PP terminal 1 via the communication means 50, communication means 30 and network 2.

Figure 14:
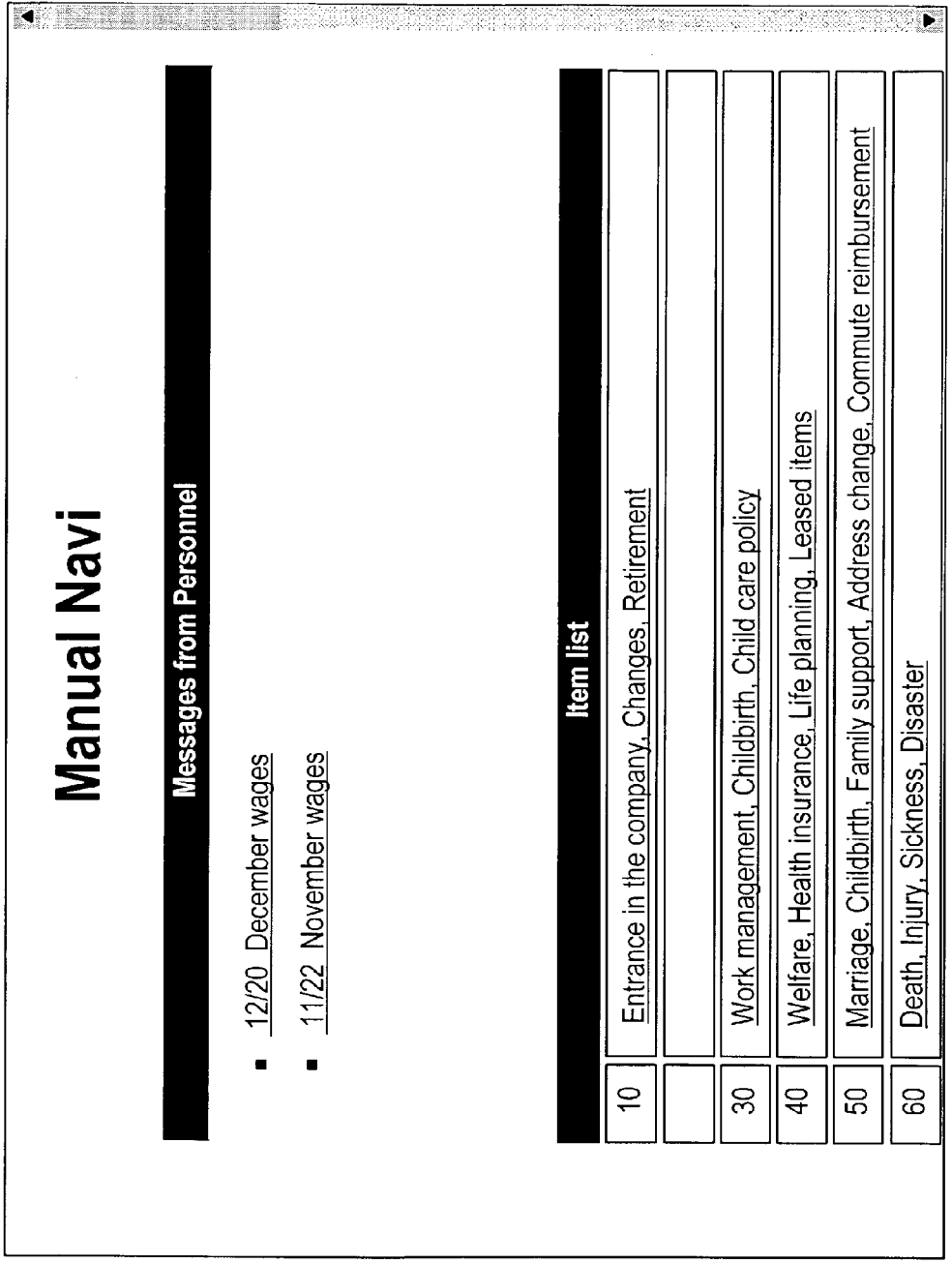
FIG. 14 is a first drawing of an example of the main menu the manual of an embodiment of the invention.
Figure 15:
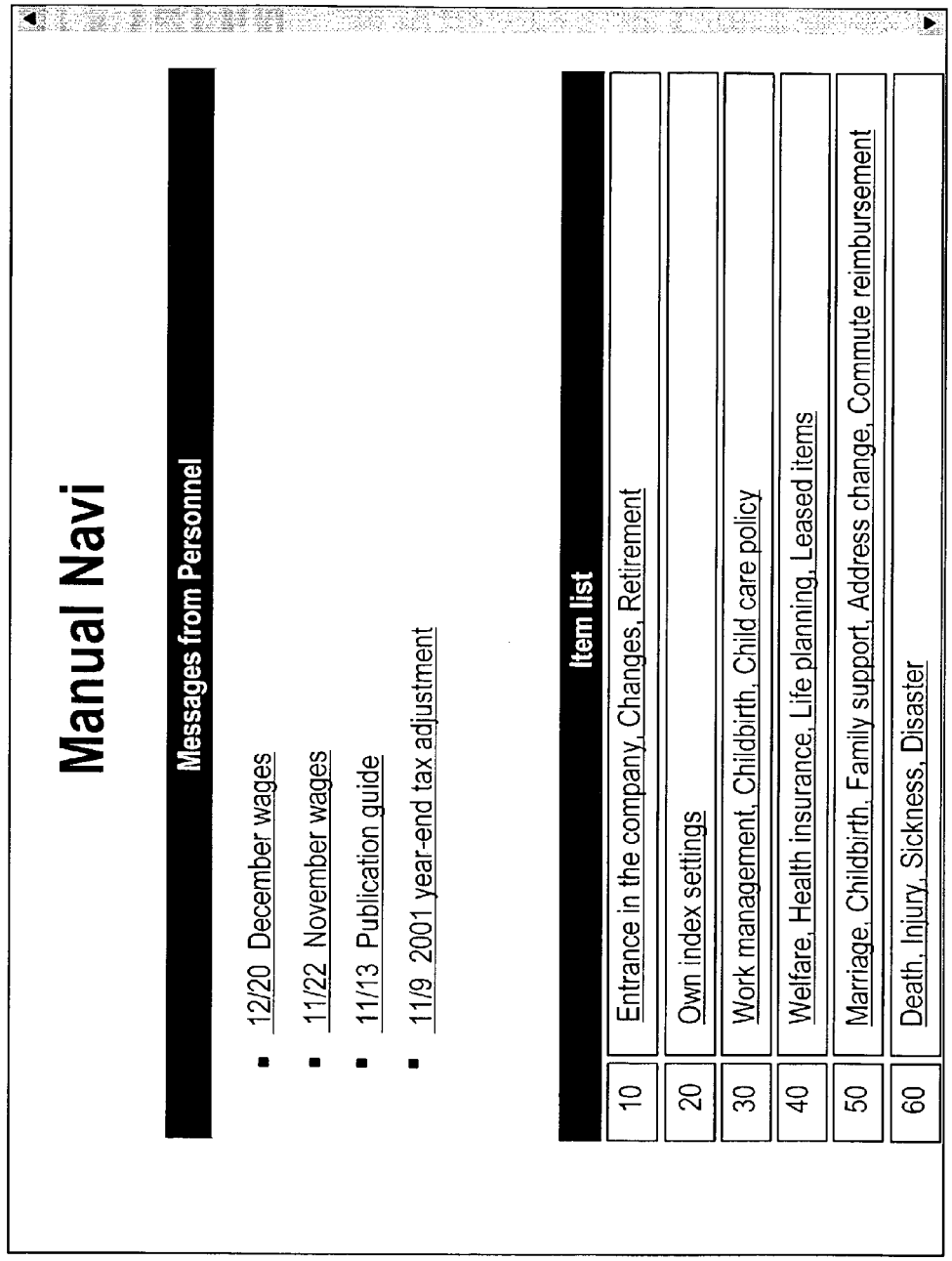
FIG. 15 is a second drawing of an example of the main menu the manual of an embodiment of the invention.

Here, examples of the main menu of the manual are shown in FIG. 14 and FIG. 15. FIG. 14 is an example of the main menu of a manual for an employee belonging to group-classification code '01', and FIG. 15 is an example of the main menu of a manual for an employee belonging to group-classification code '02'.

In this example, when the employee belongs to the washing-machine department, the group-classification code for that employee is '01' regardless of whether the employee is a councilor or a supervisor, so the main menu of the manual shown in FIG. 14 is provided to employees belonging to the washing-machine department. Also, when the employee belongs to the video department, the group-classification code for that employee is '02' regardless of whether the employee is a councilor or a supervisor, so the main menu of the manual shown in FIG. 15 is provided to employees belonging to the video department.

In this way, the contents of the main menu of the manual differ according to the department that the employee using the PPP system belongs to. Therefore, the manual-call-up means 52 extracts the main menu of the manual corresponding to the group-classification code detected by the authority/department-confirmation means 51 from the storage means 53 and sends it to the PP terminal 1.

For example, when the ID number that is stored temporarily in the storage means 53 is '3900001', the manual-call-up means 52 sends the main menu of the manual shown in FIG. 15, which corresponds to group-classification code '02' that corresponds to the ID number '3900001', to the PP terminal 1 via the communication means 50.

After the main menu of the manual is sent to the PP terminal 1 in this way, that main menu of the manual is received by the communication means 10 in the PP terminal 1 and is displayed on the display 13 (step 7).

Moreover, after the main menu of the manual is displayed on the display 13, the employee who selected 'Manual Navi' uses the input-selection means 14 and selects the actual item to check (item for which guidance is desired) from the main menu of the manual (step 8). After doing so, the selection-judgment means 15 determines which of the items was selected by the employee and sends that judgment result to the manual-storage apparatus 5 via the communication means 10, network 2 and communication means 30.

For example, when an employee gets married and does not know the company policies and procedures related to marriage, the employee selects the item '50 Marriage, Birth, Family Support, Address Change' from the main menu of the manual displayed on the display 13 (see FIG. 14 and FIG. 15). By doing so, the judgment result indicating that the item '50 Marriage, Birth, Family Support, Address Change' was selected is sent to the manual-storage apparatus 5.

In the manual-storage apparatus 5, the communication means 50 receives that judgment result and the manual-call-up means 52 extracts the item menu from the storage means 53 that corresponds to the group-classification code already detected by the authority/department-confirmation means 51 as well as to the judgment result received by the communication means 50. Also, the manual-call-up means 52 sends the extracted item menu to the PP terminal 1 via the communication means 50.

Figure 16:
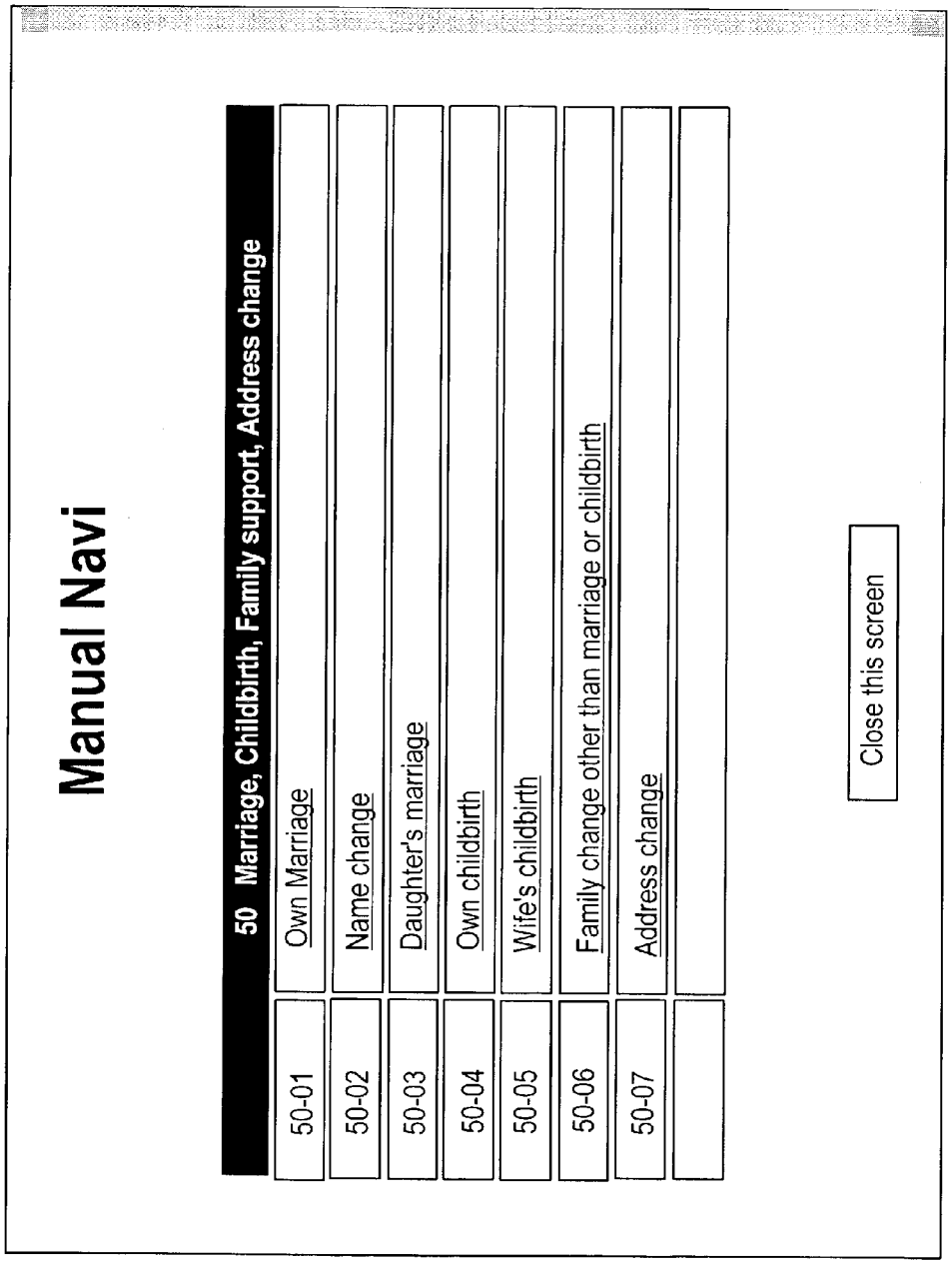
FIG. 16 is a first drawing of an example of the item menu of an embodiment of the invention.
Figure 17:
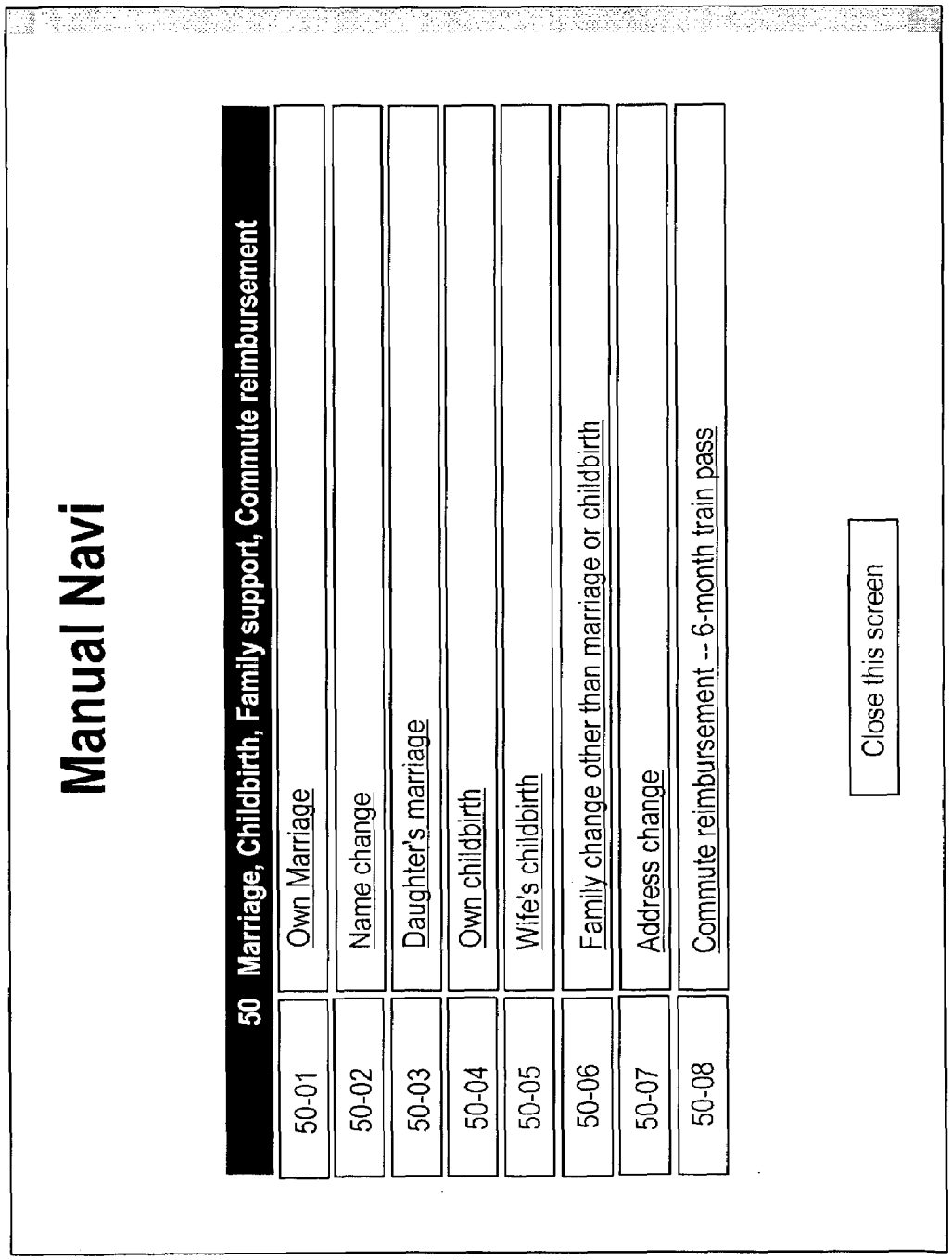
FIG. 17 is a second drawing of an example of the item menu of an embodiment of the invention.

Here, examples of the item menu are shown in FIG. 16 and FIG. 17. FIG. 16 is an example of an item menu that is extracted from the storage means 53 when an employee belonging to group-classification code '01' selects the item '50 Marriage, Birth, Family Support, Address Change, Commute Reimbursement' from the main menu of the manual shown in FIG. 14. On the other hand, FIG. 17 is an example of an item menu that is extracted from the storage means 53 when an employee belonging to group-classification code '02' selects the item '50 Marriage, Birth, Family Support, Address Change, Commute Reimbursement' from the main menu of the manual shown in FIG. 15.

For example, assume that an employee whose ID number '3900001' that is stored temporarily in the storage means 53 selects the item '50 Marriage, Birth, Family Support, Address Change, Commute Reimbursement' from the main menu of the manual shown in FIG. 15. In that case, the manual-call-up means 52 extracts the item menu shown in FIG. 17 from the storage means 53 that corresponds to group-classification code '02' that corresponds to the ID number '3900001' as well as to the item '50 Marriage, Birth, Family Support, Address Change, Commute Reimbursement'. Also, the manual-call-up means 52 sends the extracted item menu to the PP terminal by the communication means 50.

The item menu that is sent to the PP terminal 1 is received by the communication means 10 of the PP terminal 1 and displayed on the display.

After the item menu is displayed on the display 13 in this way, the employee uses the input-selection mean 14 and selects an item from the item menu to check. After doing so, the selection-judgment means 15 determines which item the employee selected, and sends that judgment result to the manual-storage apparatus 5 via the communication means 10, network 2 and communication means 30.

For example, when the employee himself/herself gets married, and wants to now the company policy in the case of marriage, the employee selects the item '50-01 Own Marriage' from the item menu displayed on the display 13. After doing so, the selection-judgment means 15 determines that the item '50-01 Own Marriage' was selected and sends that judgment result to the manual-storage apparatus 5.

In the manual-storage apparatus 5, the communication means 50 receives the judgment result, and the manual-call-up means 52 extracts from the storage means 53 the manual corresponding to the group-classification code and position code that has already been detected by the authority/department means 51 and the judgment result that was received by the communication means 50. Also, the manual-call-up means 52 sends the extracted manual to the PP terminal 1.

<Manual Navi Display Example>

Figure 19:
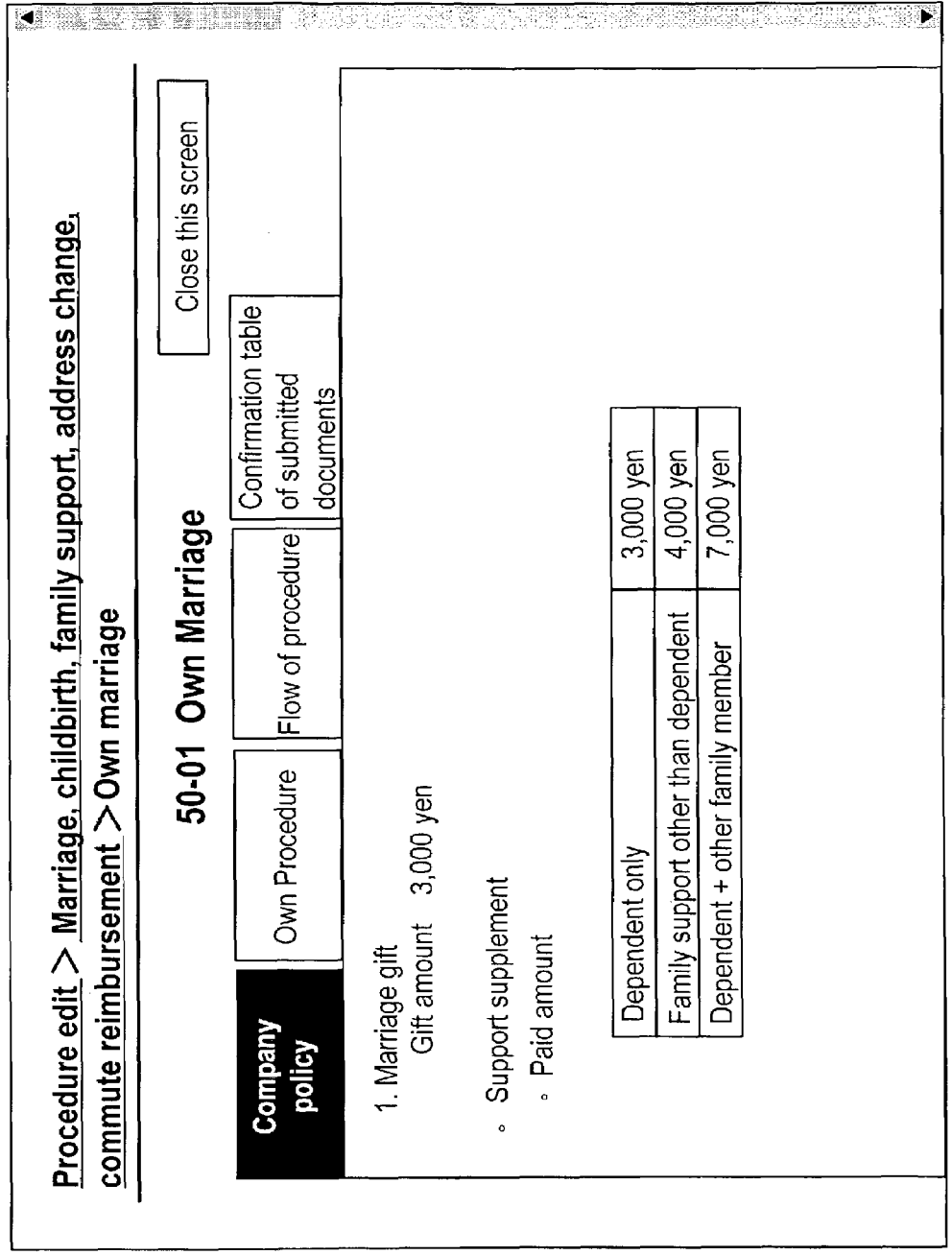
FIG. 19 is a second drawing of an example of the manual of an embodiment of the invention.

Here, FIG. 18 to FIG. 21 show examples of the manual. FIG. 18 is an example of the manual that is extracted from the storage means 53 when an employee belonging to group-classification code '01' and whose position code is '01' to '04' selected the item '50-01 Own Marriage' from the item menu shown in FIG. 16. Also, FIG. 19 is an example of the manual that is extracted from the storage means 53 when an employee belonging to group-classification code '01' and whose position code is '05' to '08' selected the item '50-01 Own Marriage' from the item menu shown in FIG. 16.

Figure 20:
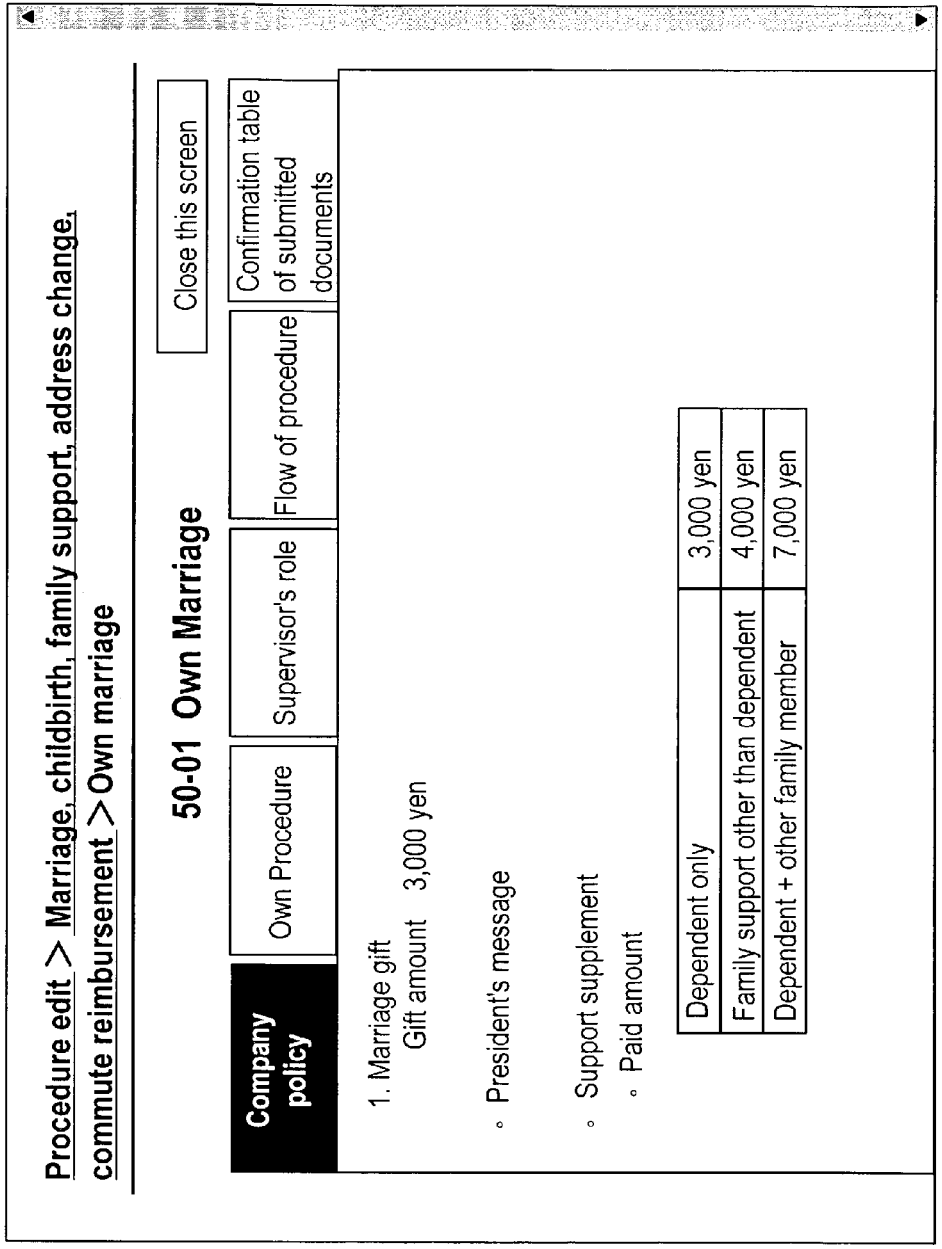
FIG. 20 is a third drawing of an example of the manual of an embodiment of the invention.
Figure 21:
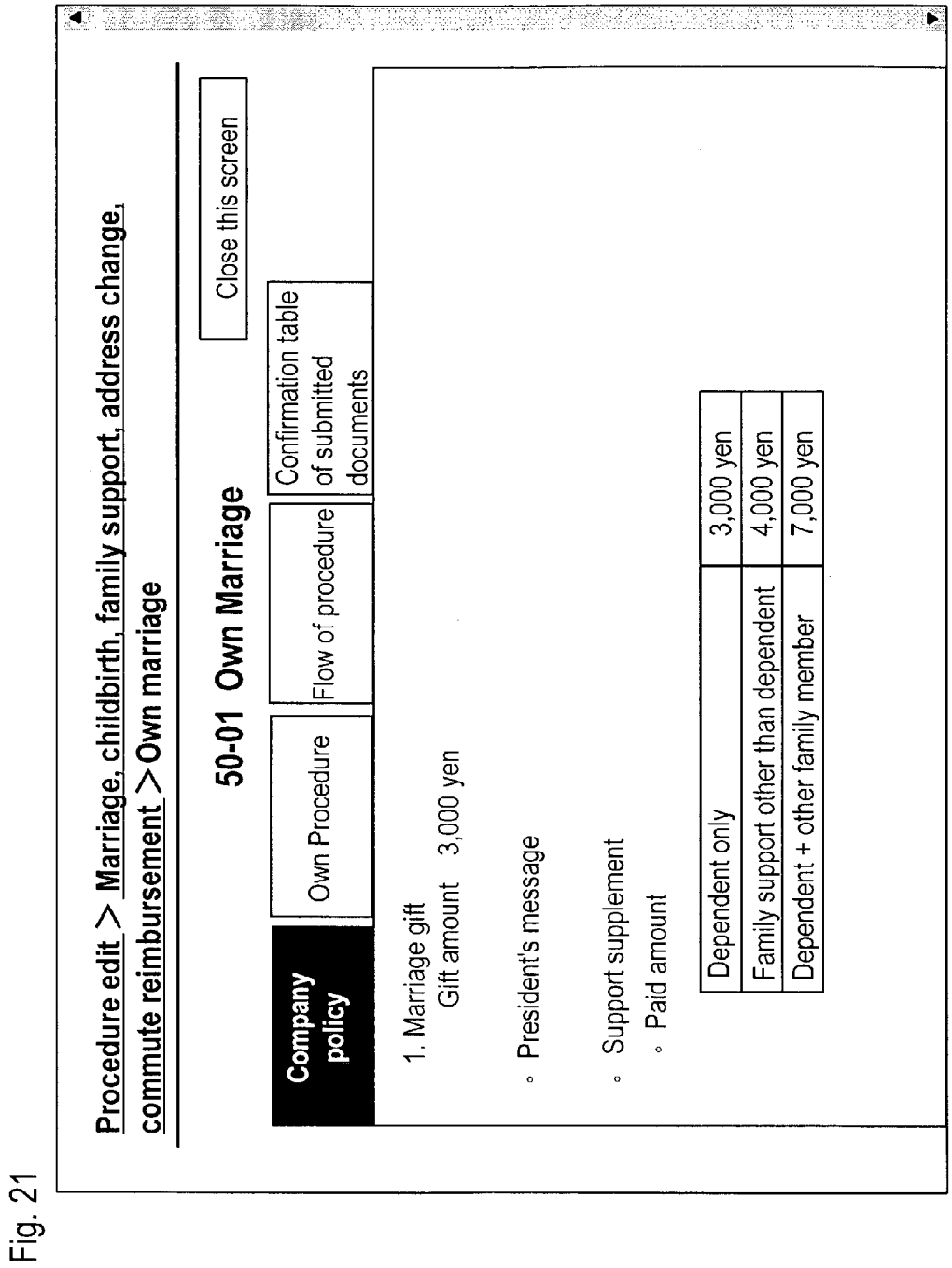
FIG. 21 is a fourth drawing of an example of the manual of an embodiment of the invention.

Moreover, FIG. 20 is an example of the manual that is extracted from the storage means 53 when an employee belonging to group-classification code '02' and whose position code is '01' to '04' selected the item '50-01 Own Marriage' from the item menu shown in FIG. 17. Also, FIG. 21 is an example of the manual that is extracted from the storage means 53 when an employee belonging to group-classification code '02' and whose position code is '05' to '08' selected the item '50-01 Own Marriage' from the item menu shown in FIG. 17.

For example, suppose the employee with the ID number '3900001' that is temporarily stored in the storage means 53 selected the item '50-01 Own Marriage' from the item menu shown in FIG. 17. In that case, the manual-call-up means 52 extracts from the storage means 53 the manual shown in FIG. 21 that corresponds to the group-classification code '02' and position code '07' that correspond to the ID number '3900001' as well as to the item '50-01 Own Marriage'. Also, the manual-call-up means 52 sends the extracted manual to the PP terminal 1.

Moreover, the manual that is sent to the PP terminal 1 is received in the PP terminal 1 by the communication means 10 and stored in the storage means 16 and part is displayed on the display 13 (step 9).

After the manual for the item desired by the employee is displayed on the display 13 in this way, the employee references that manual and actually checks the desired item. For example, supposing that the employee whose ID number is '3900001' selected the item '50-01 Own Wedding' from the item menu shown in FIG. 17, the manual shown in FIG. 21 is displayed on the display 13. Here, if the employee whose ID number is '3900001' desires to now the company policy about marriage, the employee selects 'Company Policy', if the employee desires to know how to perform the procedures related to marriage, the employee selects 'Employee Procedures'. After doing so, the manual related to the selected item is retrieved from the storage means 16 and displayed on the display 13.

From the processing described above, in the PPP system it is possible to display a unique manual for each user that take into consideration differences in departments within the company. In this way, it is possible to explain the processing of complex personnel procedures to the user in an easy-to-understand way, and thus it is possible to prevent in advance the failure to input all the contents for the registration items to be described later.

With the processing described above, it is possible to display a manual according to difference in department, or in other words, the same manual is displayed if the department is the same. That is, the employee must determine himself/herself which conditions of the manual apply. Making mistakes in this determination could as a result lead to making mistakes in the contents to be entered, or result in omitting some contents.

Therefore, in the PPP system, it is possible to display the manual further taking into consideration the employee's current state.

TABLE 1

| | Personal data | | | | | |
|---|---|---|---|---|---|---|
| Name | Marriage status | Family | Dependents | Participation in company insurance plan | Own a home | Live alone |
| A | Not married | Father, Mother | No | No | No | No |
| B | Not married | Father, Mother | No | Yes | No | Yes |
| C | Not married | None | No | Yes | Yes | No |
| D | Married | Son, daughter | Yes | Yes | Yes | No |

In this case, before displaying the main menu of the manual, the manual-call-up means 52 further references the personal data shown in Table 1. The personal data is not directly necessary for the company to manage the employee, however, it is data related to the employee that is collected for improving the operability of the system. The personal data can also be handled as attribute data in this invention. The personal data is stored in the storage means for example.

Here, suppose that the employee 'C' shown in Table 1 selected the item '50 Marriage, Birth, Family Support, Address Change, Commute Reimbursement'. In so doing, the manual-call-up means 52 searches for 'C' in the personal data, and is able to obtain the data; Marriage status: Not married, and Family: None. In accordance to this, it is possible to omit the items '50-03 Daughters Marriage', and (in the case employee C is a male) '50-05 Wife gives birth'.

Also, by further selecting the item '50-01 Own Marriage' shown in FIG. 16 for example, the manual-call-up means 52 searches for 'Marriage Status' in the personal data. Here, it is possible that when the marriage status is 'Not married', the manual for the procedures necessary for marriage is displayed, however, when the marriage status is 'Married', the manual for the procedures necessary for marriage is not displayed.

The use of personal data described above is one example, however, by using personal data, displaying the manual is not limited to the employee's department in the company, but it is possible to display a manual that corresponds to each individual employee. In this way, the user does not have to look at a manual about processes that do not apply, and thus it is possible to prevent mistakes in input of the registration items to be described later.

After the employee checks the desired item, the employee performs an operation to stop the display of the manual on the display 13. In detail, the employee uses the input-selection means 14 and selects 'Close this screen' in the manual that is displayed on the display 13. After doing so, the selection-judgment means 15 determines that the item 'Close this screen' has been selected and sends an instruction to the PPP apparatus 4 via the network 2 and communication means 30 to display the portal image on the display 13 again.

After the instruction to display the portal image on the display has been sent to the PPP apparatus 4 in this way the process returns to the process again (step 4) of displaying the portal image on the display 13 based on the access authority and department of the employee using the PPP system.

Also, after the portal image is displayed on the display 13 of the PP terminal 1, by the employee selecting the item 'Work System' on the portal image, the employee is able to use the PP terminal 1 to register in the PPP apparatus 4 the contents of the registration items related to the procedure subject corresponding to personal changes and year-end tax adjustment.

<Work System>

Next, the situation of the employee registering in the PPP apparatus 4 the contents of the registration items related to the procedure subject corresponding to personal changes and year-end tax adjustment will be explained.

When doing this, the employee uses the input-selection means 14 and selects 'Work System' from the portal image displayed on the display 13. By doing so, the selection-judgment means 15 determines that 'Work System' was selected and sends that judgment result to the PPP apparatus 4 via the network 2 and communication means 30.

In the PPP apparatus 4, the communication means 40 receives the judgment result indicating that 'Work System' was selected, and the work system menu stored in the storage means 45 is sent to the PP terminal 1 by the communication means 40.

Similar to the portal image, the contents of the work system menu differ according to the access authority and department of the employee using the PPP system. Therefore, when the judgment result indicating that 'Work System' was selected is received by the communication means 40, the authority/department-confirmation means 41 checks the access authority and department of the employee having the ID number that is temporarily stored in the storage means 45 (step 11). In other words, the authority/department-confirmation means 41 detects the group-classification code and position code corresponding to the ID number that is temporarily stored in the storage means 45 (step 11). Checking of the access authority and department by the authority/department-confirmation means 41 is the same as the checking of the department by the authority/department-confirmation means 41 already explained using FIG. 7 and FIG. 9, so and explanation of it is omitted.

After the authority/department-confirmation means 41 detects the group-classification code and position code corresponding to the ID number temporarily stored in the storage means 45 in this way, it extracts the work system menu that corresponds to the detected group-classification code and position code from the storage means 45. Also, the authority/department-confirmation means 41 sends the extracted work system menu to the PP terminal 1 via the communication means 30 and network 2.

Figure 22:
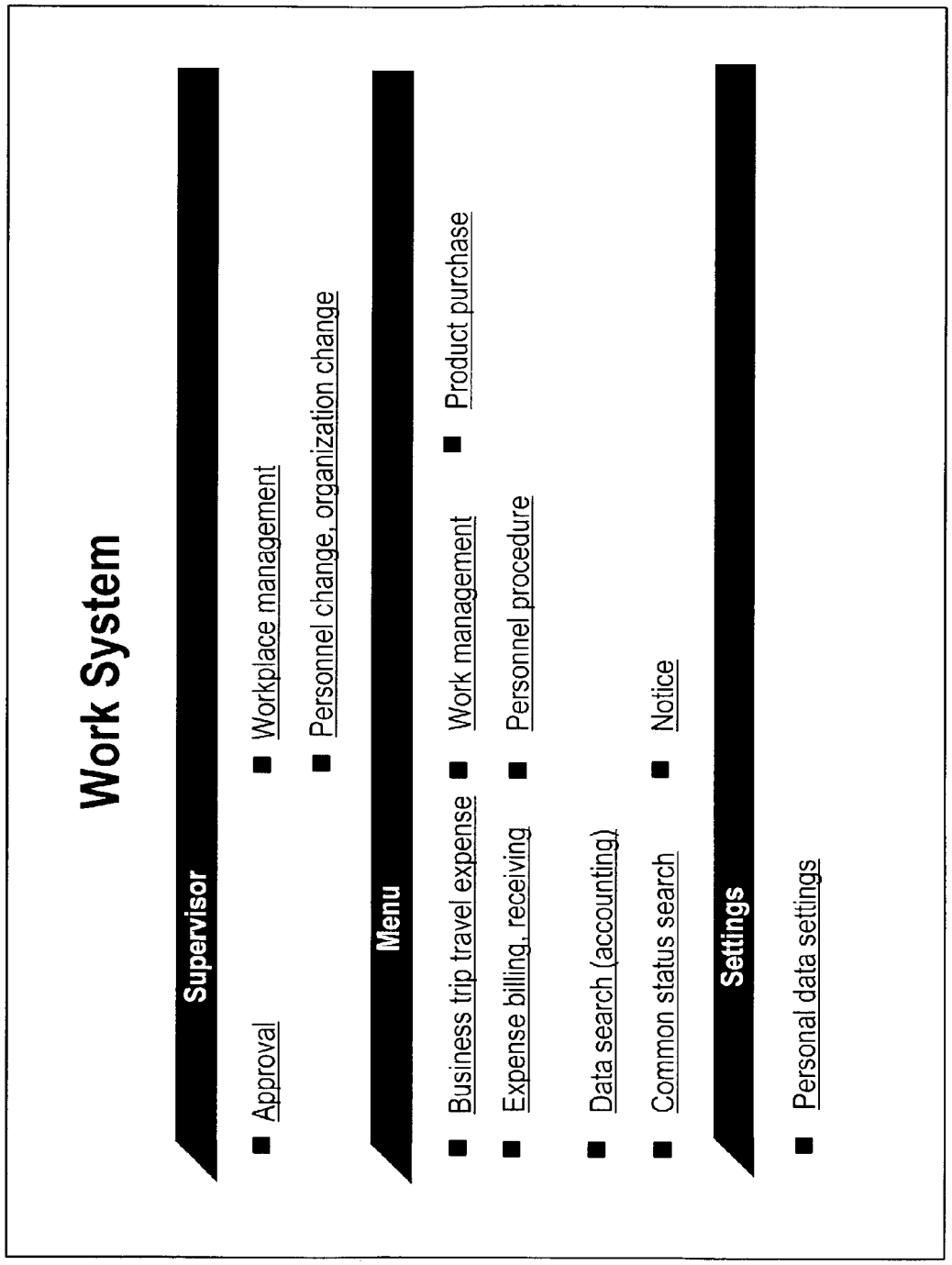
FIG. 22 is a first drawing of an example of the work system menu of an embodiment of the invention.
Figure 23:
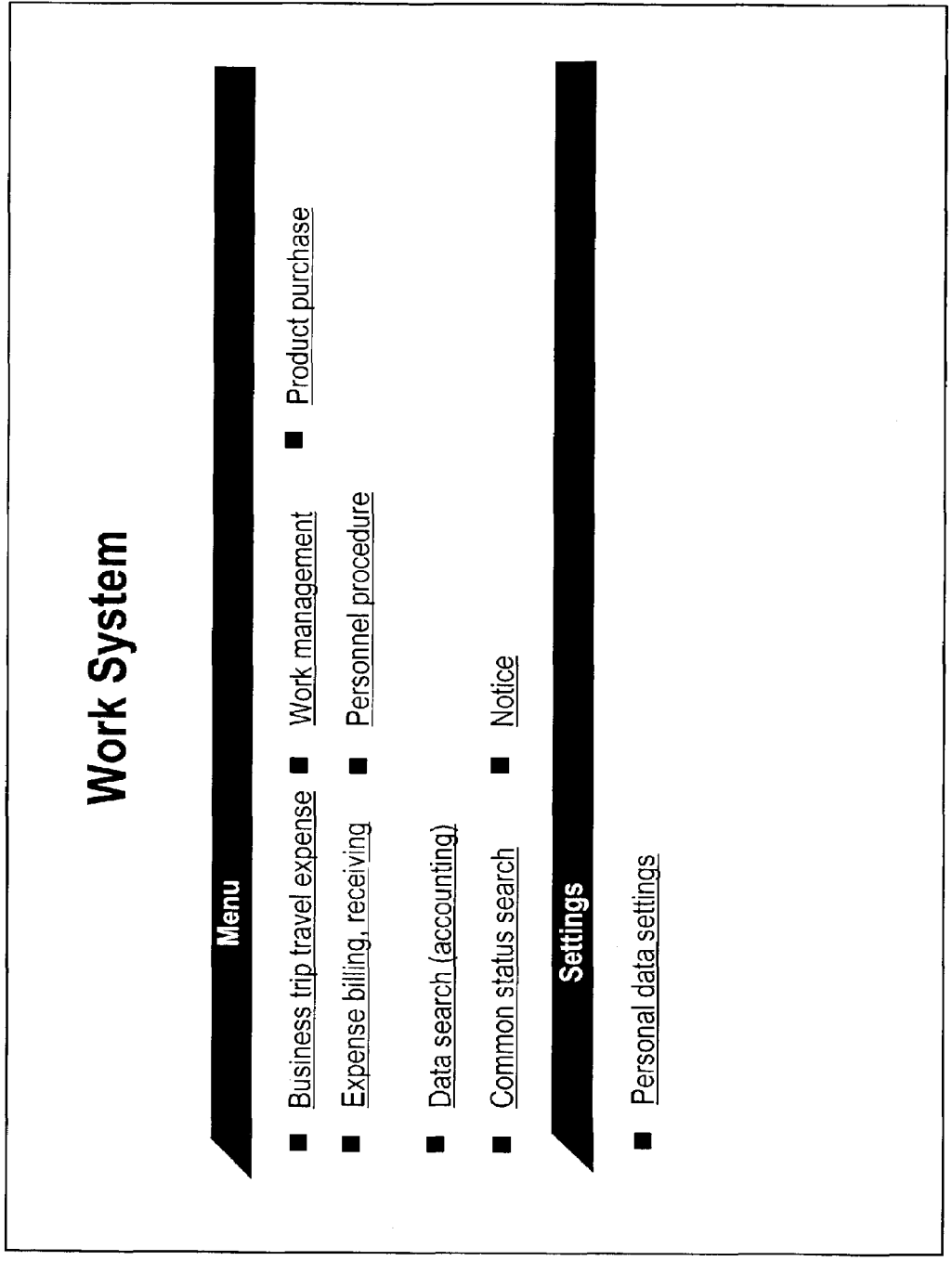
FIG. 23 is a second drawing of an example of the work system menu of an embodiment of the invention.
Figure 24:
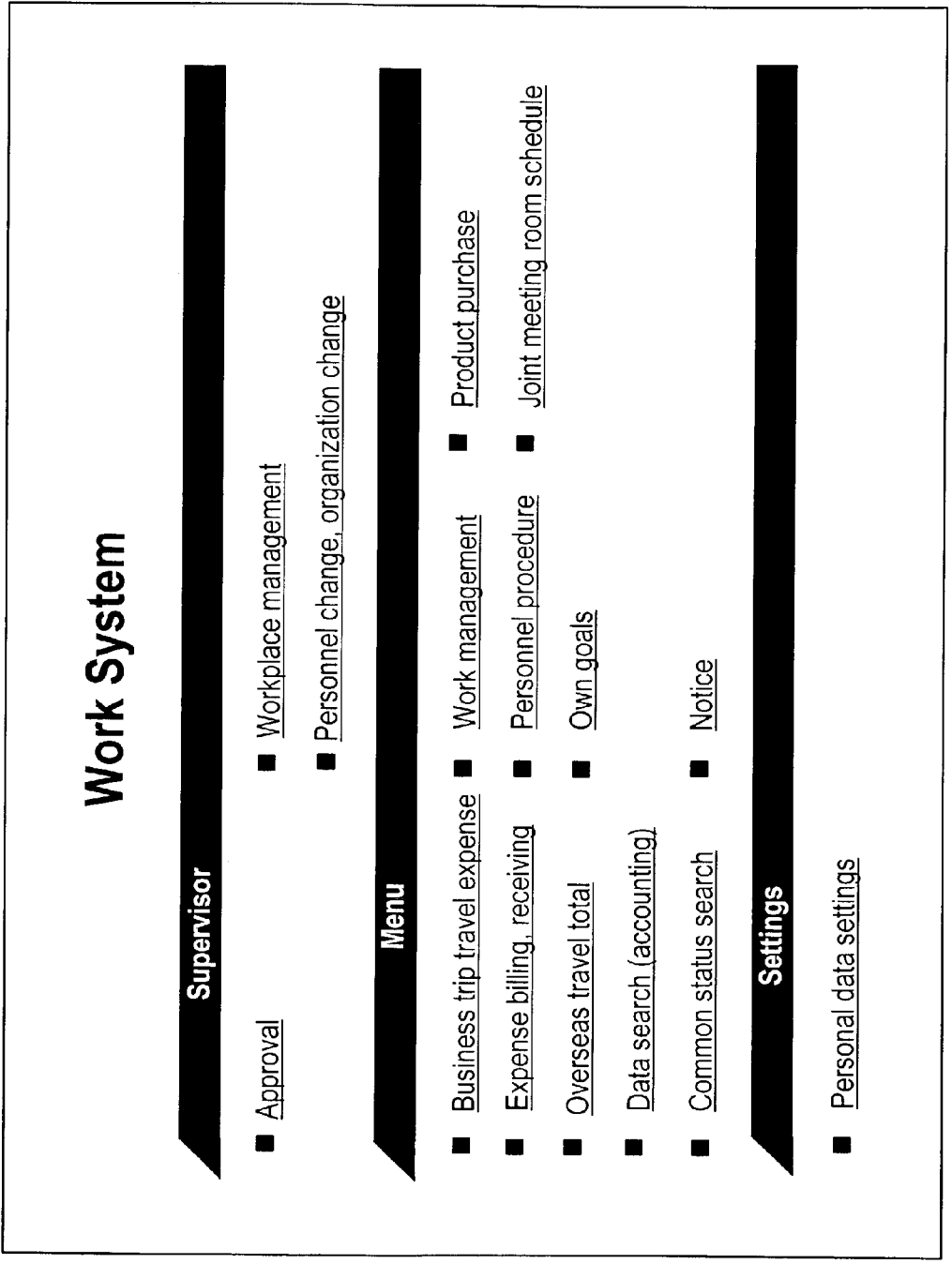
FIG. 24 is a third drawing of an example of the work system menu of an embodiment of the invention.
Figure 25:
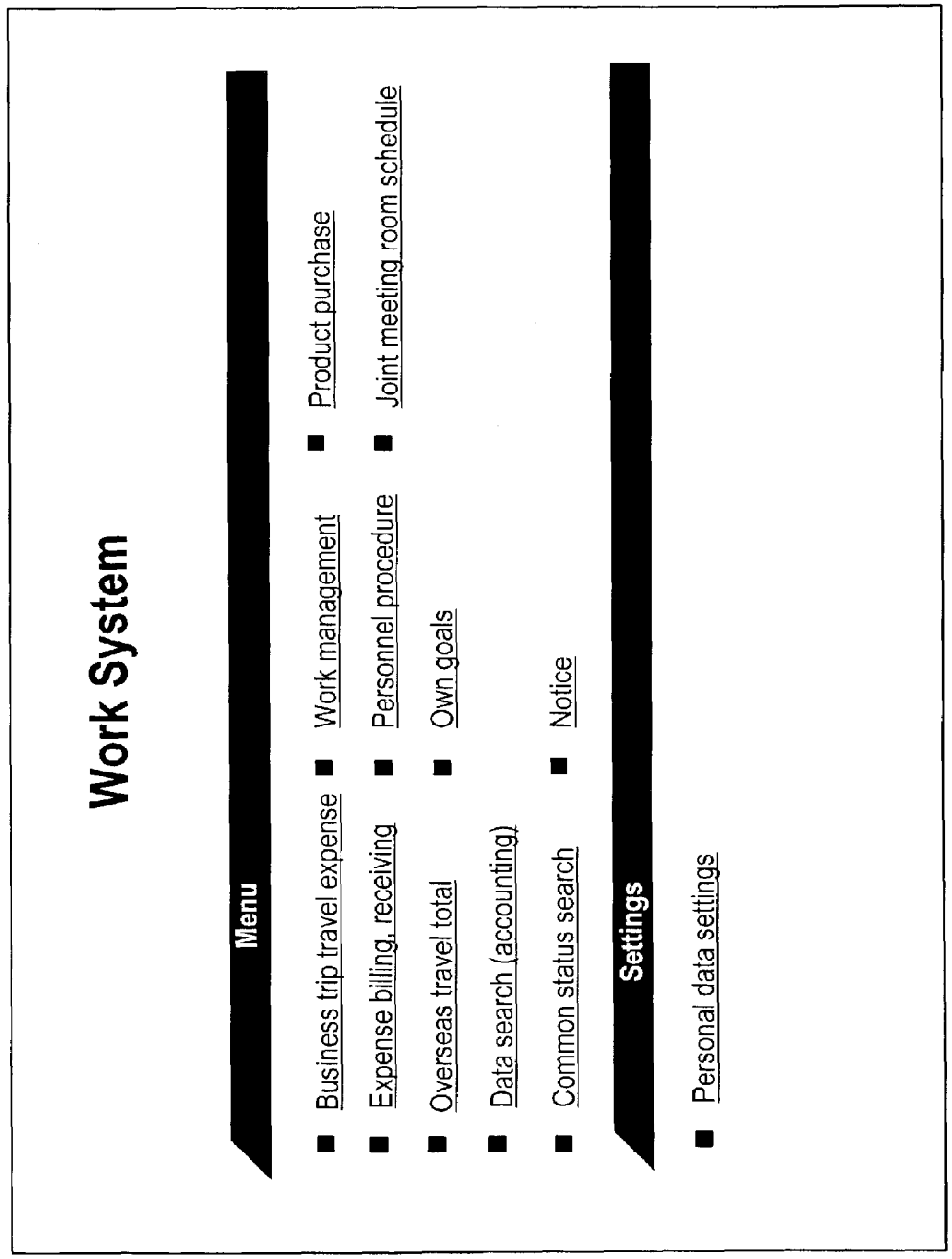
FIG. 25 is a fourth drawing of an example of the work system menu of an embodiment of the invention.

Here, examples of the work system menu are shown in FIG. 22 to FIG. 25. FIG. 22 is an example of the work system menu that is presented to an employee belonging to group-classification code '01' and having position code '01' to '04'; and FIG. 23 is an example of the work system menu that is presented to an employee belonging to group-classification code '01' and having position code '05' to '08'. Moreover, FIG. 24 is an example of the work system menu that is presented to an employee belonging to group-classification code '02' and having position code '01' to '04', and FIG. 25 is an example of the work system menu that is presented to an employee belonging to group-classification code '02' and having position code '05' to '08'

In this example, in the case where the employee using the PPP system is a councilor in the washing-machine department, the group-classification code for that employee is '01' and the position code is '03', so the work system menu shown in FIG. 22 is extracted. Also, in the case where the employee using the PPP system is a supervisor in the washing-machine department, the group-classification code for that employee is '01' and the position code is '07', so the work system menu shown in FIG. 23 is extracted.

Moreover, in the case where the employee using the PPP system is a councilor in the video department, the group-classification code for that employee is '02' and the position code is '03', so the work system menu shown in FIG. 24 is extracted. Also, in the case where the employee using the PPP system is a supervisor in the video department, the group-classification code for that employee is '02' and the position code is '07', so the work system menu shown in FIG. 25 is extracted.

For example, when the ID number temporarily stored in the storage means 45 is '3900001', the authority/department means 41 sends the work system menu shown in FIG. 25 that corresponds to the group-classification code '02' and position code '07' corresponding to that ID number '3900001' to the PP terminal 1 via the communication means 40.

After the work system menu is sent to the PP terminal 1 in this way, that work system menu is received in the PP terminal 1 by the communication means 10 and displayed on the display 13 (step 12).

Also, after the work system menu is displayed on the display 13, the employee, who is trying to register in the PPP apparatus 4 contents of registration items related to procedure subject corresponding to personal changes or year-end tax adjustment, selects the item 'Personnel Procedures' from the work system menu. After doing so, the selection-judgment means 15 determines that 'Personnel Procedures' was selected and sends that judgment result to the PPP apparatus 4 via the communication means 10, network 2 and communication means 30.

In the PPP apparatus 4, the communication means 40 receives the judgment result indicating that 'Personnel Procedures' was selected, and the main procedures menu stored in the storage means is sent to the PP terminal 1 by the communication means 40.

<Main Procedures Menu>

Similar to the portal image or the work system menu, the contents of the main procedures menu differ according to the department of the employee using the PPP system. Therefore, after the judgment result indicating that 'Personnel Procedures' was selected is received by the communication means 40, the authority/department-confirmation means 41 checks the access authority and department of the employee whose ID number is temporarily stored in the storage means 45 (step A1 (see FIG. 4)). In other words, the authority/department-confirmation means 41 detects the position code and group-classification code corresponding to the ID number that is temporarily stored in the storage means 45 (step A1). Checking of the access authority and department by the authority/department-confirmation means 41 is the same as the checking of the access authority and department by the authority/department-confirmation means 41 already explained using FIG. 7 to FIG. 9, so an explanation is omitted.

Next, after the authority/department-confirmation means 41 detects the group-classification code corresponding to the ID number that is temporarily stored in the storage means 45, it extracts the main procedures menu that corresponds to the detected group-classification code from the storage means 45. Also, the authority/department-confirmation means 41 sends the extracted main procedures menu to the PP terminal 1 via the communication means 40, communication means 30 and network 2.

Figure 26:
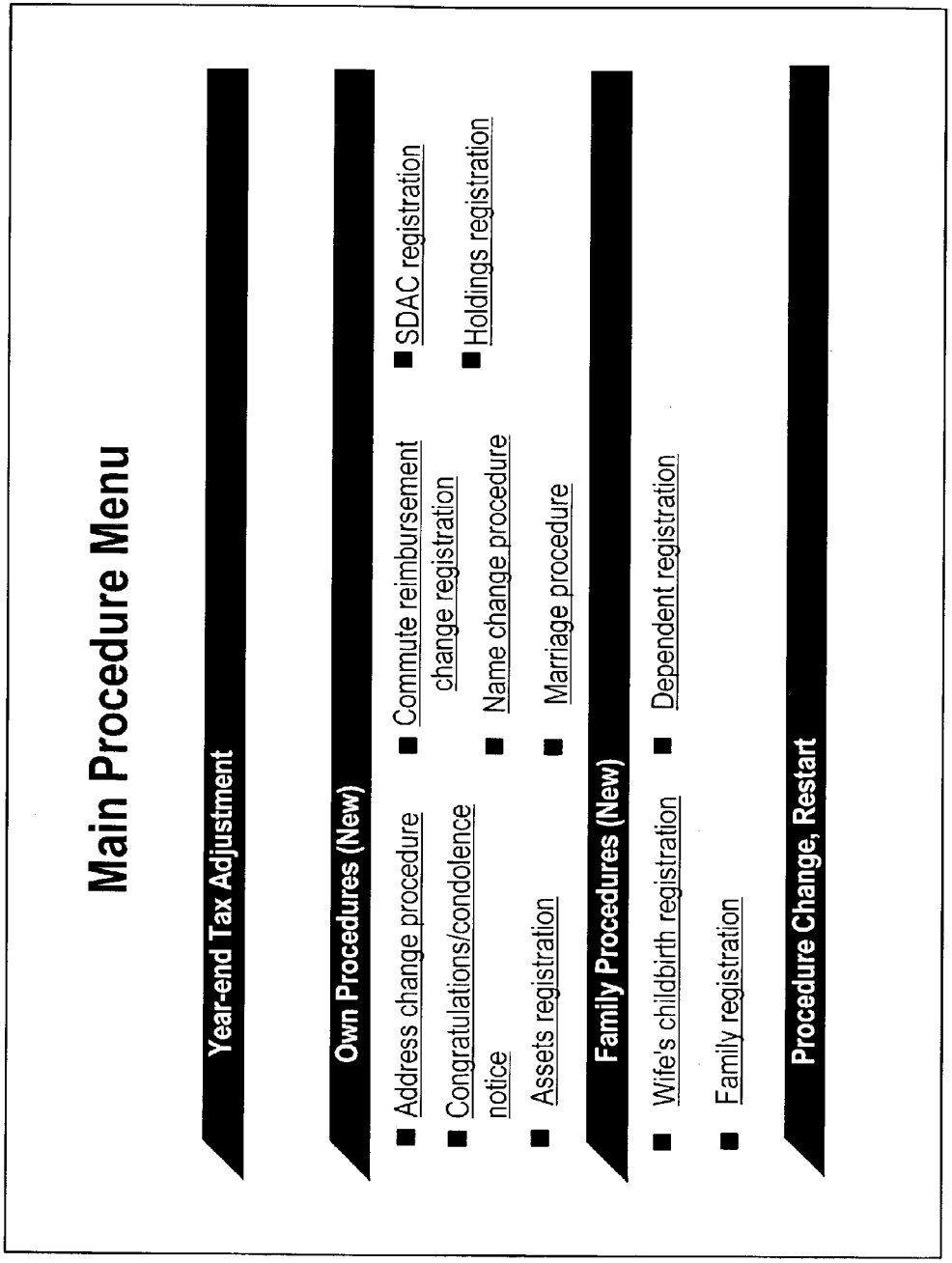
FIG. 26 is a first drawing of an example of the main procedure menu of an embodiment of the invention.
Figure 27:
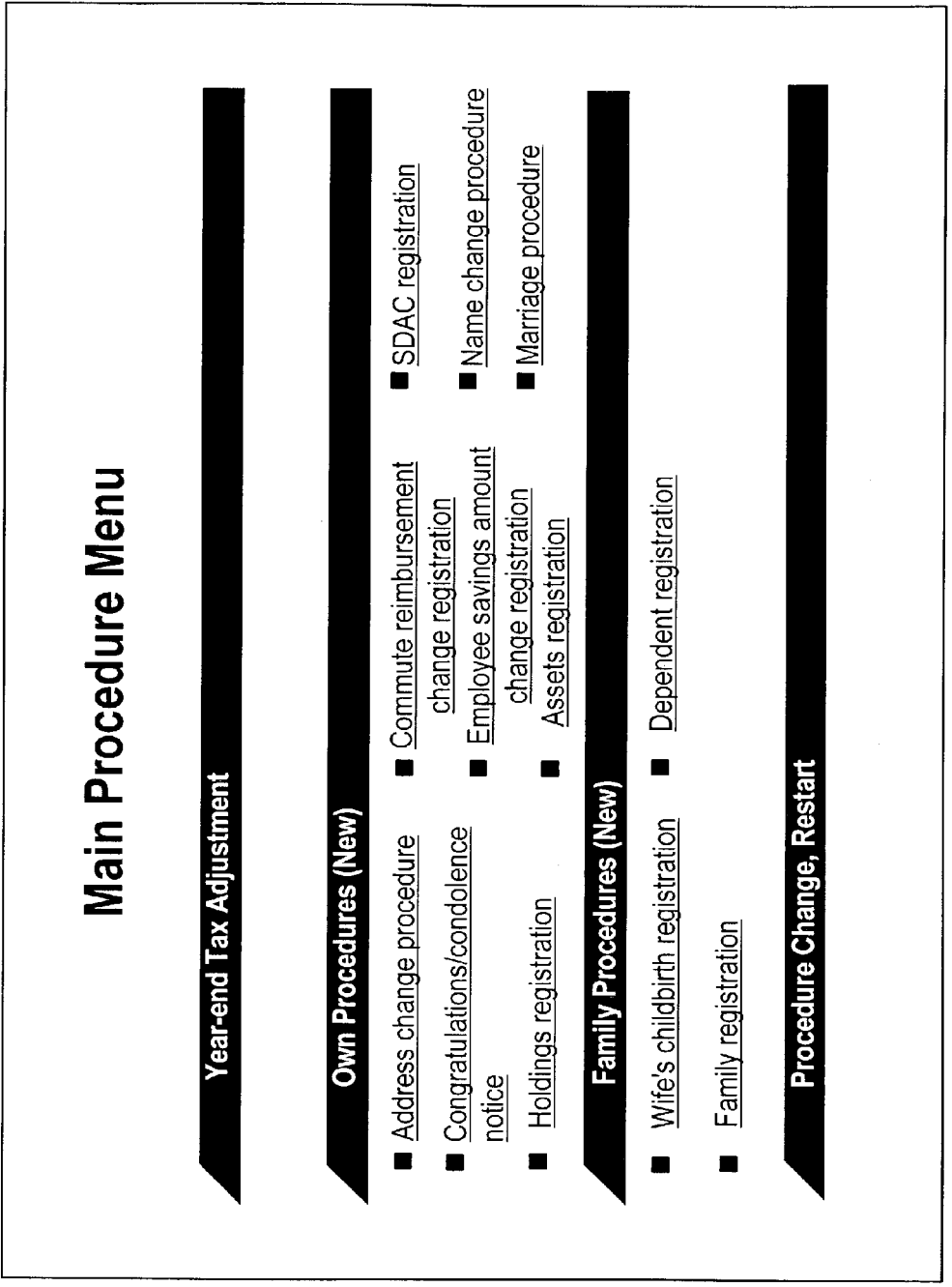
FIG. 27 is a second drawing of an example of the main procedure menu of an embodiment of the invention.

Here, examples of the main procedures menu are shown in FIG. 26 and FIG. 27. FIG. 26 is an example of the main procedures menu that is presented to an employee belonging to group-classification code '01', and FIG. 27 is an example of the main procedures menu that is presented to an employee belonging to group-classification code '02'.

In this example, in the case where the employee using the PPP system is in the washing-machine department, the group-classification code for that employee is '01', so the main procedures menu shown in FIG. 26 is extracted regardless of whether the employee is a councilor or a supervisor. On the other hand, in the case where the employee using the PPP system is in the video department, the group-classification code for that employee is '02', so the main procedures menu shown in FIG. 27 is extracted regardless of whether the employee is a councilor or a supervisor.

For example, when the employee having ID number '3900001' is using the PPP system, that ID number '3900001' is stored temporarily in the storage means 45, so the authority/department-confirmation means 41 sends the main procedures menu shown in FIG. 27 that corresponds to the group-classification code '02' corresponding to the ID number '3900001' to the PP terminal 1 via the communication means 40.

The main procedures menu is received in the PP terminal 1 by the communication means 10 and is displayed on the display 13 (step A2).

Next, the contents of the main procedures menu will be explained. The main procedures menu is a menu that presents to the user a plurality of registration items, plurality of procedure subjects, items used by the user when entering or correcting registered contents, and items related to year-end tax adjustment. These items will be explained below in the order: registration items, procedure subjects, items used by the user when entering or correcting registered items, and items related to year-end tax adjustment.

As examples of registration items there are: (A) registration items related to the user himself/herself, and (B) registration items related to the user's family.

Examples of procedure subjects and registration items related to the user himself/herself are shown in Table 2 and include: (1) 'Address Change Procedure', (2) 'Commute Reimbursement Change Registration', (3) 'Salary Deposit Account Change Registration', (4) 'Congratulations/Condolence Notice, (5) 'Employee Savings Amount Change Registration', (6) 'Name Change Procedure', (7) 'Holdings Registration', and (8) 'Assets Registration'. Items with the term 'Procedure' are procedure subjects, and items with the term 'Registration' are registration items. These are called input items.

The input items above are contained in the 'Own Procedures (New)' field of the main procedures menu shown in FIG. 26 and FIG. 27.

TABLE 2

| | Registration Items |
|---|---|
| (A) Registration items related to | (1) Address Change Registration |
| | (2) Commute Reimbursement Change Registration |

TABLE 2-continued

| | Registration Items |
|---|---|
| the user | (3) Salary Deposit Account Change Registration |
| | (4) Congratulations/Condolence Notice |
| | (5) Employee Savings Amount Change Registration |
| | (6) Name Change Registration |
| | (7) Special Registration |
| | (8) Assets Registration |
| (B) Registration items related to the user's family | (9) Wife's Childbirth |
| | (10) Dependent Registration |
| | (11) Family Registration |

Also, examples of input items related to the user's family (B) are shown in Table 2 and include the registration items: (9) 'Wife's Childbirth', (10) 'Dependent Registration', and (11) 'Family Registration', and these registration items are contained in the 'Family Procedures (New)' field of the main procedures menu shown in FIG. 26 and FIG. 27.

Examples of procedure subjects include: (b-1) 'Address Change Procedure', (b-2) 'Marriage Procedure', and (b-3) 'Name Change Procedure'. In the main procedure menu shown in FIG. 26 and FIG. 27, the procedure subjects (b-1) 'Address Change Procedure', (b-2) 'Marriage Procedure', and (b-3) 'Name Change Procedure' are contained in the 'Own Procedures (New)' field.

Each of the procedure subjects are related to the registration items that the employee can register in the PPP apparatus 4 according to the department in which the employee using the PPP system belongs.

To use the procedure subject (b-1) 'Address Change Procedure' as an example, as shown in Table 3 below, for an employee of group-classification code '01', of the 11 registration items shown in Table 2, the procedure subject (b-1) 'Address Change Procedure' is related to the two registration items (1) 'Address Change Registration' and (2) 'Commute Reimbursement Change Registration'. On the other hand, for an employee of group-classification code '02', of the 11 registration items shown in Table 2, the procedure subject (b-1) 'Address Change Procedure' is related to the four registration items (1) 'Address Change Registration', (2) 'Commute Reimbursement Change Registration', (7) 'Holdings Registration', and (8) 'Assets Registration'.

TABLE 3

| (b-1) Address Change Procedure | | |
|---|---|---|
| Registration Items | Group-classification code '01' | Group-classification code '02' |
| (1) Address Change Registration | ○ | ○ |
| (2) Commute Reimbursement Change Registration | ○ | ○ |
| (7) Special Registration | X | ○ |
| (8) Assets Registration | X | ○ |

Next, to use the procedure subject (b-2) 'Marriage Procedure' as an example, as shown in Table 4 below, for an employee of group-classification code '01', of the 11 registration items shown in Table 2, the procedure subject (b-2) 'Marriage Procedure' is related to the seven registration items (1) 'Address Change Registration', (2) 'Commute Reimbursement Change Registration', (3) 'Salary Deposit Account Change Registration', (4) 'Congratulations/Condolence Notice', (6) 'Name Change Registration', (10) 'Dependent Registration' and (11) 'Family Registration'. On the other hand, for an employee of group-classification code '02', of the 11 registration items shown in Table 2, the procedure subject (b-2) 'Marriage Procedure' is related to the nine registration items (1) 'Address Change Registration', (2) 'Commute Reimbursement Change Registration', (3) 'Salary Deposit Account Change Registration', (4) 'Congratulations/Condolence Notice', (6) 'Name Change Registration', (7) 'Holdings Registration', (8) 'Assets Registration', (10) 'Dependent Registration' and (11) 'Family Registration'.

TABLE 4

(b-2) Marriage Procedure

| Registration items | Group-classification code '01' | Group-classification code '02' |
|---|---|---|
| (1) Address Change Registration | ○ | ○ |
| (2) Commute Reimbursement Change Registration | ○ | ○ |
| (3) Salary Deposit Account Change Registration | ○ | ○ |
| (4) Congratulations/Condolence Notice | ○ | ○ |
| (6) Name Change Registration | ○ | ○ |
| (7) Special Registration | X | ○ |
| (8) Assets Registration | X | ○ |
| (10) Dependent Registration | ○ | ○ |
| (11) Family Registration | ○ | ○ |

Next, to use the procedure subject (b-3) 'Name Change Procedure' as an example, as shown in Table 5 below, for an employee of group-classification code '01', of the 11 registration items shown in Table 2, the procedure subject (b-3) 'Name Change Procedure' is related to the two registration items (3) 'Salary Deposit Account Change Registration' and (6) 'Name Change Registration'. On the other hand, for an employee of group-classification code '02', of the 11 registration items shown in Table 2, the procedure subject (b-3) 'Name Change Procedure' is related to the four registration items (3) 'Salary Deposit Account Change Registration' and (6) 'Name Change Registration', (7) 'Holdings Registration' and (8) 'Assets Registration'.

TABLE 5

(b-3) Name Change Procedure

| Registration items | Group-classification code '01' | Group-classification code '02' |
|---|---|---|
| (3) Salary Deposit Account Change Registration | ○ | ○ |
| (6) Name Change Registration | ○ | ○ |
| (7) Special Registration | X | ○ |
| (8) Assets Registration | X | ○ |

Each of the procedure subjects are related to the related registration items, however that relationship, as in the example of the procedure subject (b-2) 'Marriage Procedure' explained using Table 4, is not classified into (A) registration items for the user and (B) registration items of the user's family.

Moreover, combinations of a procedure subject and registration items related to that procedure subject, which are determined according to the department of the employee, are contained in a procedure-registration-event-relationship table E that is stored in the storage means 45 of the PPP apparatus 4.

Also, as will be described later, when the employee selects a procedure subject, it becomes possible to register contents in the PPP apparatus 4 for registration items according to the department of the employee.

When the user or employee enters or changes contents of registration items that were registered in the past, the use selects the item used when entering or changing registered items.

Next, items for the year-end tax adjustment will be explained. Items for the year-end tax adjustment are items used when registering contents in the PPP apparatus 4 of registration items for the year-end tax adjustment, and when the employee selects an item for that year-end tax adjustment, the registration items for that year-end tax adjustment are displayed on the display 13.

<Selecting Input Items>

As was described above, after the main procedure menu is displayed on the display 13, the employee, who is registering contents of some registration items in the PPP apparatus 4, selects a registration item or procedure subject that is displayed on the main procedure menu (step A3). In this embodiment, an employee who is trying to select a certain registration item uses the input-selection means 14 and selects that registration item, and an employee who is trying to select a certain procedure subject uses the procedure subject-selection means 17 and selects that procedure subject.

<Processing When a Registration Item is Selected>

First, the case of when the employee select a certain registration item contained in the main procedure menu will be explained. The employee who is trying to register contents for a certain registration item from the among the registration items contained in the main procedure menu uses the input-selection means 14 as described above and select the registration item for which registration is to be performed. After doing so, the selection-judgment means 15 determines that a certain registration item was selected by the employee and sends that judgment result to the PPP apparatus 4 via the communication means 10, network 2 and communication means 30.

In the PPP apparatus 4, the communication means 40 receives the judgment result indicating that a certain registration item was selected, and based on that judgment result, a selected-item-judgment means 42 outputs an instruction to the single-execution means 44 to activate the guidance means 46 from among a plurality of guidance means 46 related to that registration item. According to the instruction from the selected-item-judgment means 42, the single-execution means 44 activates the guidance means 46 related to the specified registration item. Also, the guidance means 46, which was activated from control of the single-execution means 44, sends guidance data for guiding the employee to register the contents of the specified registration item to the PP terminal 1 via the communication means 40, communication means 30 and network 2.

After the guidance data are sent to the PP terminal 1 in this way, the guidance data are received in the PP terminal 1 by the communication means 10, and the guidance screen based on that guidance data for guiding the employee to register the contents of the specified registration items is displayed on the display 13.

After the guidance screen is displayed on the display 13, the employee uses the input-selection means 14 and enters the contents for each input field, and then selects 'Register' to input the data. The input contents are received by the registered-contents-receiving means 18, and that registered-contents-receiving means 18 sends the received contents to the PPP apparatus 4 via the communication means 10, network 2 and communication means 30. After doing so, the contents that were received by the registered-contents-receiving means 18 are received by the communication means 40 in the PPP apparatus 4, and are stored in a transaction table F (registered-contents-storage means) in the storage means 45 that corresponds to the ID number that was stored beforehand in the storage means 45.

Below, an example of the employee changing the 'Salary Deposit Account Registration' (hereafter called SDAR) item stored in the storage means 45 of the PPP apparatus 4 will be explained. When doing this, the employee selects the registration item 'SDAR' that is displayed in the main procedure menu. Based on that selection, the selected-item-judgment means 42 outputs an instruction to the single-execution means 44 to activate the SDAR-guidance means 46c that is related to the registration item 'SDAR'. Also, the single-execution means 44 activates the SDAR-guidance means 46c based on that instruction. As shown in FIG. 28, the activated SDAR-guidance means 46c sends guidance data when the employee changes the 'Salary Deposit Account' (hereafter called SDA) to the PP terminal 1 via the communication means 40.

After doing so, the guidance screen as shown in FIG. 28 on which it is possible to change the 'SDA' is displayed on the display 13. After the guidance screen on which it is possible to change the 'SDA' is displayed in this way, the employee enters the contents in order in the input fields. The registered-contents-receiving means 18 receives the input contents, and sends the received contents to the PPP apparatus 4 via the communication means 10. After doing so, the contents received by the registered-contents-receiving means 18, or in other words, the contents of the changes to the 'SDAR' are recorded in the transaction table F in the storage means 45 of the PPP apparatus 4.

<Processing When a Procedure Subject is Selected>

Up until now, the case of the employee selecting a registration item from among the registration items and procedure subjects was explained, however, next, the case of the employee selected a procedure subject will be explained.

The employee trying to register contents of registration items related to a procedure subject uses the procedure subject-selection means 17 and selects a procedure subject from among the procedure subjects displayed on the main procedure menu (step A3). After doing so, the selection-judgment means 15 determines that a specified procedure subject was selected by the employee and sends the judgment result to the PPP apparatus 4 via the communication means 10, network 2 and communication means 30.

In the PPP apparatus 4, the communication means 40 receives the judgment result indicating that the specified procedure subject was selected, and based on that judgment result, the selected-item-judgment means 42 sends an extraction instruction to the registration-event-extraction means 43. The extraction instruction is an instruction to extract all of the registration items that are related to the specified procedure subject, and that correspond to the group-classification code corresponding to the ID number that is temporarily stored in the storage means 45.

According to that instruction and based on the combination in the procedure-registration-event-relationship table E that is stored in the storage means 45, the registration-event-extraction means 43 extracts all of the registration items that are related to the specified procedure subject and that correspond to the group-classification code corresponding to the ID number, and sends all of the extracted registration items to the PP terminal 1 via the communication means 40, communication means 30 and network 2.

When the registration-event-extraction means 43 performs extraction, it is possible to also reference the personal data shown in Table 1. Here, the personal data are stored in the storage means 45 for example. The processing steps of the registration-event-extraction means 43 are the same as that of the manual-call-up means 52 described above, so an explanation will be omitted, however, by referencing the personal data, it becomes possible to further restrict the registration items extracted by the registration-event-extraction means 43 to those related to the personal data. In this way, registration items that are not related to the user are not extracted, and thus it is possible to prevent the user from entering contents for unnecessary registration items.

After all of the registration items related to the procedure subject selected by the user have been sent to the PP terminal 1 according to the group-classification code of the employee, all of the registration items related to the specified procedure subject selected by the employee are received in the PP terminal 1 by the communication means 10 and displayed on the display 13 (step A4).

For example, when the employee whose ID number is '3900001' selects the procedure subject (b-2) 'Marriage Procedure' from the procedure subjects displayed in the main procedure menu (step A3), the selection-judgment means 15 determines that the procedure subject (b-2) 'Marriage Procedure' was selected by the employee, and sends that judgment result to the PPP apparatus 4 by the communication means 10.

Also, in the PPP apparatus 4, the communication means 40 receives the judgment result indicating that the procedure subject (b-2) 'Marriage Procedure' was selected, and based on the that judgment result, the selected-item-judgment means 42 instructs the registration-event-extraction means 43 to extract all of the registration items related to the procedure subject (b-2) 'Marriage Procedure' and that correspond to the department of the employee whose ID number is '3900001'.

Since the group-classification code indicating the department of the employee whose ID number is '3900001' is '02', the registration-event-extraction means 43, based on the procedure-registration-event-relationship table E stored in the storage means and shown in Table 4, extracts all of the registration items related to the procedure subject (b-2) 'Marriage Procedure' and that correspond to group-classification code '02'. In other words, the registration-event-extraction means 43 extracts nine registration items: (1) 'Address Change Registration', (2) 'Commute Reimbursement Change Registration', (3) 'Salary Deposit Account Change Registration', (4) 'Congratulations/Condolence Notice', (6) 'Name Change Registration', (7) 'Holdings Registration', (8) 'Assets Registration', (10) 'Dependent Registration', and (11) 'Family Registration'.

Also, the registration-event-extraction means 43 sends the nine extracted registration items to the PP terminal via the communication means 40. After doing so, the nine registration items are received in the PP terminal by the communication means 10 and displayed on the display 13 (step A4).

<Registration Items Selected by the User>

When several registration items sent to the PP terminal 1 are displayed on the display 13, they are displayed in a format asking the user which registration item the contents are to be actually registered for. For example, when the employee whose group-classification code is '02' selects the procedure subject (b-2) 'Marriage Procedure' from the procedure subjects displayed on the main procedure menu, as described above, the nine registration items: (1) 'Address Change Registration', (2) 'Commute Reimbursement Change Registration', (3) 'Salary Deposit Account Change Registration', (4) 'Congratulations/Condolence Notice', (6) 'Name Change Registration', (7) 'Holdings Registration', (8) 'Assets Registration', (10) 'Dependent Registration', and (11) 'Family Registration' are sent to the PP terminal 1. Moreover, when performing the procedure (b-2) 'Marriage Procedure', the items (4) 'Congratulation/Condolence Notice' and (10) 'Dependent Registration' have to be registered, so the all of the nine registration items except the two registration items (4) 'Congratulation/Condolence Notice' and (10) 'Dependent Registration' are displayed on the display 13 (step A4). When this happens, as shown in FIG. 29, these seven registration items are displayed in a format asking the user which of the seven registration items the contents are to be registered for.

For example, to take the registration item (6) 'Name Change Registration' as an example, that registration item (6) 'Name Change Registration' is displayed on the display 13 in the format, 'Change your name?'

Figure 29:
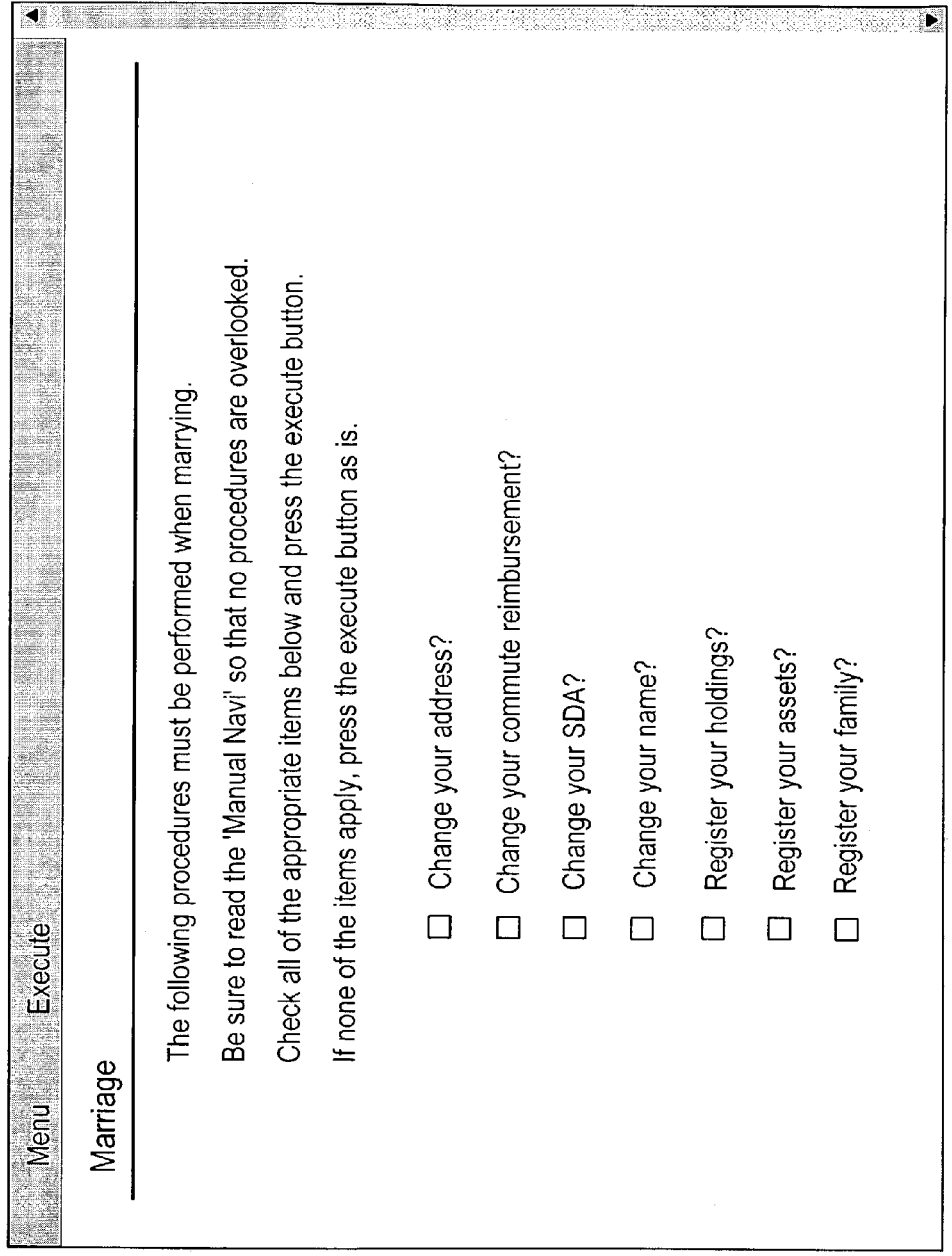
FIG. 29 is a first drawing of the registration items relating to certain procedure subject of an embodiment of the invention.
Figure 30:
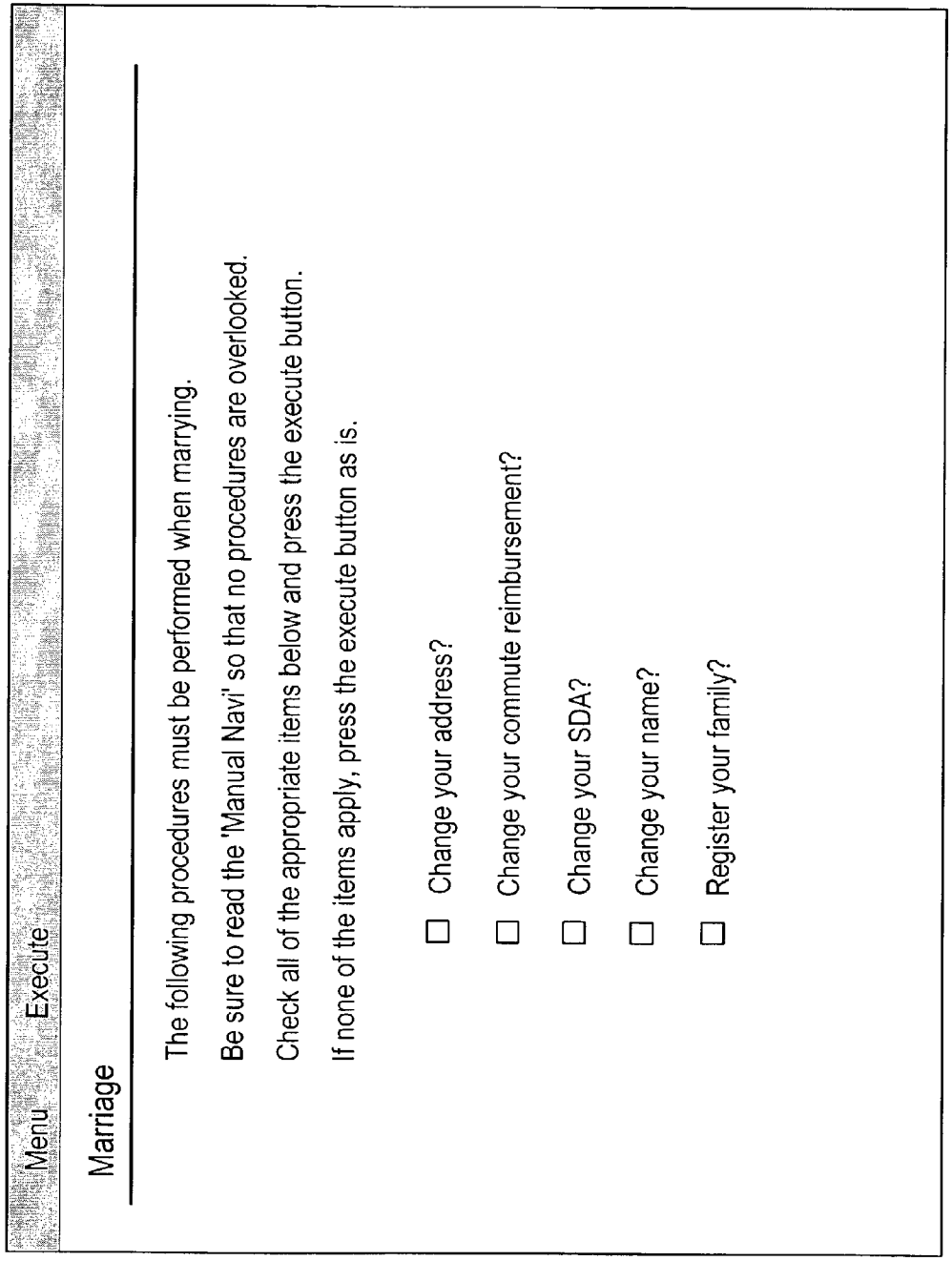
FIG. 30 is a second drawing of the registration items relating to certain procedure subject of an embodiment of the invention.
Figure 35:
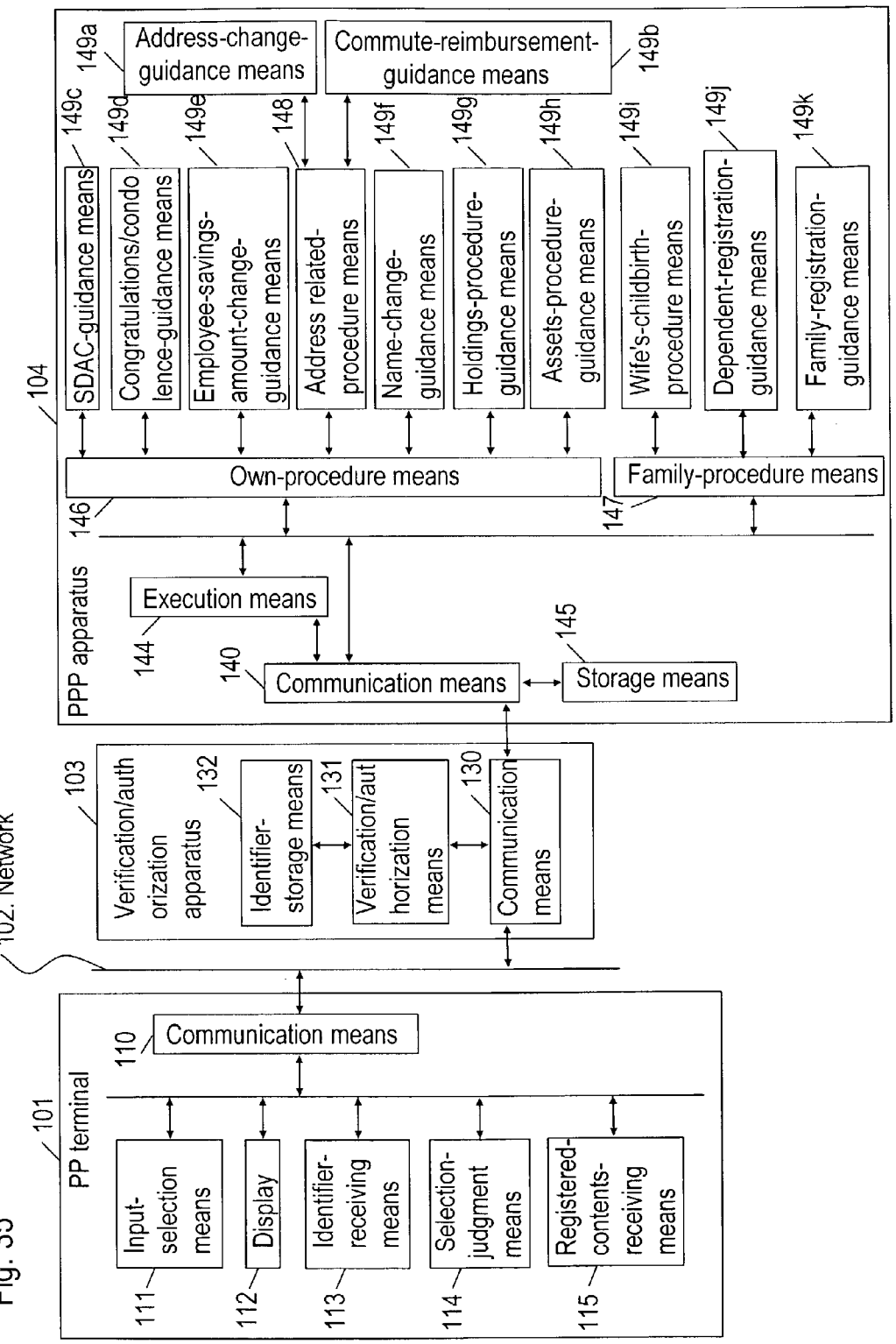
FIG. 35 is a schematic drawing of a prior PPP system.
Figure 36:
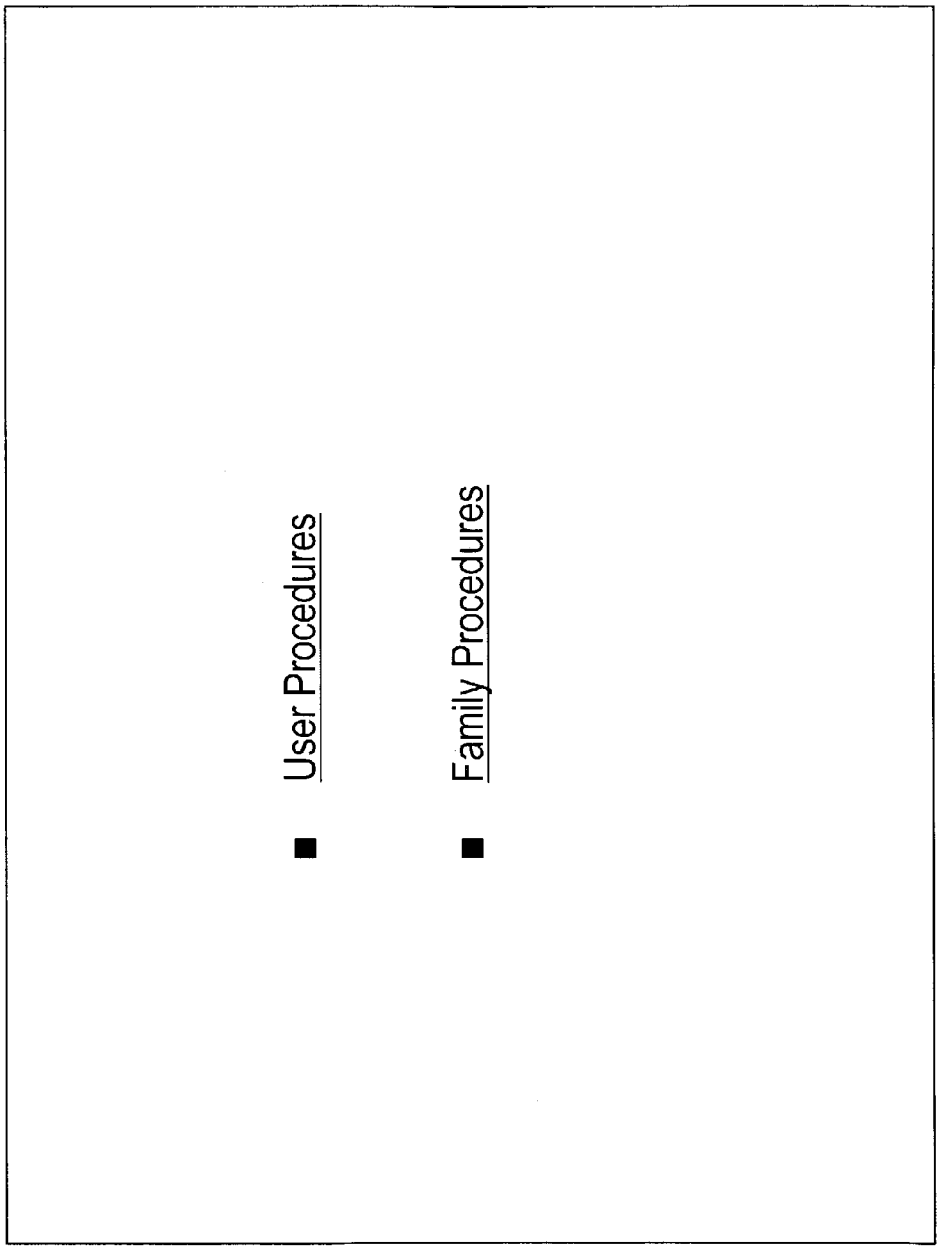
FIG. 36 is a drawing showing the first guidance screen in a prior PPP system.
Figure 39:
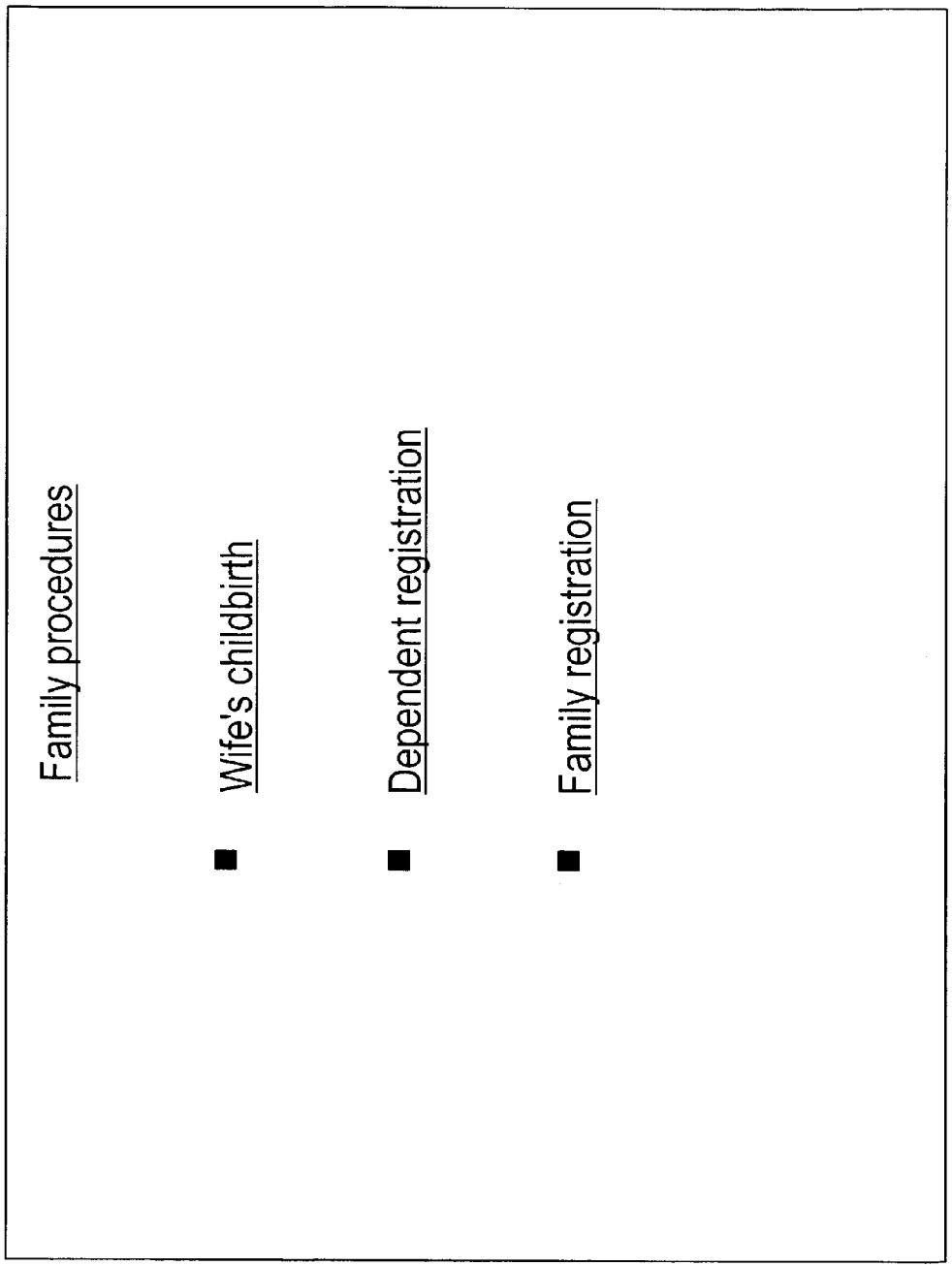
FIG. 39 is a drawing showing the second guidance screen in a prior PPP system.

FIG. 29 is an example of the registration items that are displayed on the display 13 when the employee, whose group-classification code is '02', selects the procedure subject (b-2) 'Marriage Procedure' from the procedure subjects displayed in the main procedure menu. On the other hand, as shown in FIG. 30, when the employee whose group-classification code is '01' selects the procedure subject (b-2) 'Marriage Procedure' from the procedure subjects displayed in the main procedure menu, of the registration items that are related to the procedure subject (b-2) 'Marriage Procedure' and that correspond to the employee whose group-classification code is '02', all of the registration items except the two registration items (4) 'Congratulation/Condolence Notice' and (10) 'Dependent Registration' (five registration items) are displayed on the display 13. In other words, based on Table 4, the five registration items (1) 'Address Change Registration', (2) 'Commute Reimbursement Change Registration', (3) 'Salary Deposit Account Change Registration', (6) 'Name Change Registration', and (11) 'Family Registration' are displayed on the display 13 in the format asking the user which of the five registration items the contents are to be registered for.

For example, as shown in FIG. 29 and FIG. 30, when all or part of the registration items that correspond to the group-classification code of the employee and that are related to the procedure subject selected by the employee are displayed on the display 13, the employee may not understand the PPP system completely, for example the company policies or procedures related to the procedure subject. In that case, the employee uses the input-selection means 14 and selects 'Manual Navi' from the screen on which the registration items are displayed (step A5). After doing so, the selection-judgment means 15 determines that 'Manual Navi' was selected, and sends that judgment result to the manual-storage means 5 by the communication means 10 via the network 2 and the communication means 30 of the verification/authorization apparatus 3.

Also, in the manual-storage apparatus 5, the judgment result indicating that 'Manual Navi' was selected is received by the communication means 50, and the manual-call-up means 52 extracts the manual related to the procedure subject selected by the employee from the storage means 53. That extracted manual is then sent to the PP terminal 1 by the communication means 50 via the communication means 30 of the verification/authorization apparatus 3 and the network 2, received in the PP terminal 1 by the communication means 10 and displayed on the display 13 (step A6).

After the manual for the procedure subject selected by the employee is displayed on the display 13 in this way, the employee searches the manual to find the desired item. Also, after finishing checking the desired item, the employee performs an operation to end the display of the manual on the display 13.

The procedure for displaying the manual related to the procedure subject selected by the employee on the display 13, and the procedure for ending the display of the manual on the display 13, is the same as the procedure when the employee selected the item '50-01 Own Marriage' from the item menu described above and displayed the manual for that item '50-01 Own Marriage' on the display 13 and ended the display of the manual on the display 13, so an explanation of the procedures is omitted. Also, after the display of the manual on the display 13 is ended, all or part of the registration items that correspond to the group-classification code of the employee and are related to the procedure subject selected by the employee are displayed on the display 13 as shown in FIG. 29 and FIG. 30, for example.

Next, the case of the employee selecting a registration item from the registration items displayed on the display 13 that will actually be registered will be explained.

When doing this, the employee uses the input-selection means 14 and selects the registration item from the registration items displayed on the display 13 that will actually be registered (step A7). After doing so, the selection-judgment means 15 determines that which registration item was selected and sends that judgment result to the PPP apparatus 4 via the communication means 10, network 2 and communication means 30.

For example, supposing that the employee whose group-classification code is '02' selects the procedure subject (b-2) 'Marriage Procedure' from the procedure subjects displayed in the main procedure menu, then as shown in FIG. 29, the seven registration items (1) 'Address Change Registration', (2) 'Commute Reimbursement Change Registration', (3) 'SDAC Registration', (6) 'Name Change Registration', (7) 'Holdings Registration', (8) 'Assets Registration' and (11) 'Family Registration' are displayed on the display 13. At this time, when the employee wants to register contents for all of the seven registration items in the PPP apparatus 4, the employee selects all of the seven registration items. After doing so, the judgment result indicating that all seven registration items were selected is send to the PPP apparatus 4. Considering that the two registration items (4) 'Congratulations/Condolence Notice' and (10) 'Dependent Registration' must always be registered when performing the procedure of (b-2) 'Marriage Procedure', the two registration items (4) 'Congratulations/Condolence Notice' and (10) 'Dependent Registration' will be handled as having been selected by the employee.

Also, if the address after the change or commute reimbursement after the change are not known, and it is desired to register contents for all of the registration items except (1) 'Address Change' and (2) 'Commute Reimbursement Change', then from among the seven registration items (1) 'Address Change Registration', (2) 'Commute Reimbursement Change Registration', (3) 'SDAC Registration', (6) 'Name Change Registration', (7) 'Holdings Registration', (8) 'Assets Registration' and (11) 'Family Registration', the employee selects the remaining five registration items after excluding (1) 'Address Change' and (2) 'Commute Reimbursement Change'. By so doing, the judgment result indicating that the five registration items (3) 'SDAC Registration', (6) 'Name Change Registration', (7) 'Holdings Registration', (8) 'Assets Registration' and (11) 'Family Registration' have been selected is sent to the PPP apparatus 4. Considering the uniqueness of the procedure subject (b-2) 'Marriage Procedure', the two registration items (4) 'Congratulations/Condolence Notice' and (10) 'Dependent Registration' are handled as being selected by the employee.

After the judgment result indicating the registration items selected by the employee is sent to the PPP apparatus 4 in this way, that judgment result is received by the communication means 40 in the PPP apparatus 4. Based on that judgment result, the selected-item-judgment means 42 sends an instruction to the execution means 47 to activate in order all of the guidance means 46 related to the registration items selected by the employee.

According to the instruction from the selected-item-judgment means 42, the execution means 47 activates the guidance means 46 that is related to one of the registration items from the registration items selected by the employee. The guidance data of the guidance means 46 that was activated by the control of the execution means 47 is sent to the PP terminal 1 via the communication means 40, communication means 30 and network 2 in order to guide the employee to register the contents of the registration item corresponding to that guidance means 46.

After the guidance data for guiding the employee to register the registration selected by the employee is sent to the PP terminal 1 in this way, that guidance data is received in the PP terminal 1 by the communication means 10 and a guidance screen based on that guidance data is displayed on the display 13 to guide the employee to register the contents of that registration item (step A8).

After the guidance screen is displayed on the display 13, the employee can register the contents of the registration item related to the guidance displayed on the display 13, however that employee may not completely understand the guidance displayed on the display 13, such as how to register the contents. In that case, the employee uses the input-selection means 14 and selects 'Manual Navi' from the screen that the guidance is displayed on (step A9). After doing so, the selection-judgment means 15 determines that 'Manual Navi' was selected, and send that judgment result to the manual-storage apparatus 5 via the communication means 10, network 2 and communication means 30.

In the manual-storage means 5, the judgment result indicating that 'Manual Navi' was selected is received by the communication means 50, and the manual-call-up means 52 extracts the manual related to the registration item displayed on the display 13 from the storage means 53. The extracted manual is then sent to the PP terminal 1 via the communication means 50, communication means 30 and network 2 and in the PP terminal 1 it is received by the communication means 10 and then displayed on the display 13 (step A10).

After the manual related to the guidance displayed on the display 13 is displayed on the display 13 in this way, the employee can better understand the guidance displayed on the display 13. Also, when the employee has finished referencing the manual, the employee performs an operation to end the display of the manual on the display 13.

The procedure for displaying the manual related to the registration item on the display 13 and the procedure for ending the display of the manual on the display 13 are the same as the procedure to display the manual for a procedure subject related to a plurality of registration items on the display 13 and the procedure for ending the display of the manual on the display 13 when a plurality of registration items are displayed on the display 13 as shown in FIG. 29 or FIG. 30, for example, so an explanation of them is omitted.

Also, after the display of the manual on the display has been ended, the guidance related to that manual is then displayed on the display 13 again.

After the guidance for guiding the employee to register the contents of a specified registration item is displayed on the display 13, the employee uses the input-selection means 14 and enters the contents in the respective input fields, and selects 'Register' to input the data (step A11). The input contents are received by the registered-contents-receiving means 18, and the contents that are received by that registered-contents-receiving means 18 are sent to the PPP apparatus 4 via the communication means 10, network 2 and communication means 30. In the PPP apparatus 4, the content received by the registered-contents-receiving means 18 are received by the communication means 40, attached to the ID number already stored in the storage means 45, and recorded in a transaction table F (registered-contents-storage means) in the that storage means 45. The contents entered by the employee are recorded in the PPP apparatus 4 in this way.

After the contents related to that registration item have been recorded in the PPP apparatus 4, the execution means 47 checks whether there are any registration items among the registration items selected by the employee in step A7 for which the guidance data has not yet been sent to the PP terminal 1 (step A13). In other words, the execution means 47 checks whether or not there is any guidance for the registration items selected by the employee that has not yet been displayed on the display 13 (step A13).

When it is determined as a result of that check that there is guidance for a registration item of the registration items selected by the employee that has not yet been displayed on the display 13, the execution means 47 activates the guidance means 56 related to the registration item corresponding to the guidance that has not yet been displayed on the display 13.

Also, the process from the step of displaying guidance for guiding the employee to register the contents of the registration item corresponding to that guidance means 46 (step A8) to the step of registering the contents related to that guidance in the PPP apparatus 4 (step A12) is repeated.

Next, an example of where the employee whose group-classification code is '02' selects the procedure subject (b-2) 'Marriage Procedure' from the procedure subjects displayed in the main procedure menu, and selects seven of the nine registration items (1) 'Address Change Registration', (2) 'Commute Reimbursement Change Registration', (3) 'SDAC Registration', (4) 'Congratulations/Condolence Notice, (6) 'Name Change Registration', (7) 'Holdings Registration', (8) 'Assets Registration', (10) 'Dependent Registration' and (11) 'Family Registration', omitting items (1) 'Address Change Registration', (2) 'Commute Reimbursement Change Registration', will be explained. In this case, as shown in FIG. 29, only the seven registration items (1) 'Address Change Registration', (2) 'Commute Reimbursement Change Registration', (3) 'SDAC Registration', (6) 'Name Change Registration', (7) 'Holdings Registration', (8) 'Assets Registration', and (11) 'Family Registration' are displayed on the display 13, and of these seven registration items, items (1) 'Address Change Registration' and (2) 'Commute Reimbursement Change Registration' are omitted, and only five registration items are actually selected by the employee. The two registration items (4) 'Congratulations/Condolence Notice, and (10) 'Dependent Registration' are not actually selected by are handled as if being selected.

So, in this case, the judgment result, indicating that the seven registration items (3) 'SDAC Registration', (4) 'Congratulations/Condolence Notice, (6) 'Name Change Registration', (7) 'Holdings Registration', (8) 'Assets Registration', (10) 'Dependent Registration' and (11) 'Family Registration' were selected, is sent to the PPP apparatus 4. Based on that judgment result, the selected-item-judgment means 42 sends an instruction to the execution means 47 to activate in order all of the guidance means 46 related to the seven registration items.

First, the execution means 47 activates the SDAC-guidance means 46*c* related to the registration item (3) 'SDAC Registration'. Also, the SDAC-guidance mans 46*c* sends guidance data to the PP terminal 1 via the communication means 40 for guiding the employee to register the contents for registration item (3) 'SDAC Registration'. The guidance data for guiding the employee to register the contents for registration item (3) 'SDAC Registration' is sent to the PP terminal 1, and a guidance screen as shown in FIG. 28 is displayed on the display 13 for guiding the employee to register the contents for registration item (3) 'SDAC Registration' (step A8). The employee enters the contents for registration item (3) 'SDAC Registration' in the specified fields, and inputs the contents (step A11). After the input contents are received by the registered-contents-receiving means 18, they are sent to the PPP apparatus 4 and recorded in the transaction table F in the storage means 45 (step A12).

After the contents for registration item (3) 'SDAC Registration' have been recorded in the transaction table F, the execution means 47 checks whether or not there is guidance for any of the seven registration items (3) 'SDAC Registration', (4) 'Congratulations/Condolence Notice, (6) 'Name Change Registration', (7) 'Holdings Registration', (8) 'Assets Registration', (10) 'Dependent Registration' and (11) 'Family Registration', that has not been displayed on the display 13 (step A13). In this case, only the guidance for registration item (3) 'SDAC Registration' has been displayed on the display 13, so the execution means 47 checks for which of the six registration items (4) 'Congratulations/Condolence Notice, (6) 'Name Change Registration', (7) 'Holdings Registration', (8) 'Assets Registration', (10) 'Dependent Registration' and (11) 'Family Registration' guidance has not been displayed on the display 13 (step A13).

The execution means 47 activates the congratulation/condolence-notice-guidance means 46*d* related to registration item (4) 'Congratulation/Condolence Notice'. The congratulations/condolence-notice-guidance means 46*d* sends guidance data to the PP terminal 1 via the communication means 4 for guiding the employee to register the contents for registration item (4) 'Congratulation/Condolence Notice'. The guidance data for guiding the employee to register the contents for registration item (4) 'Congratulation/Condolence Notice' is sent to the PP terminal 1, and a guidance screen as shown in FIG. 31 is displayed on the display 13 for guiding the employee to register the contents for registration item (4) 'Congratulation/Condolence Notice' (step A8). The employee enters the contents for registration item (4) 'Congratulation/Condolence Notice' in the specified fields, and inputs the contents (step A11). After the input contents are received by the registered-contents-receiving means 18, they are sent to the PPP apparatus 4 and recorded in the transaction table F in the storage means 45 (step A12).

After the contents for registration item (4) 'Congratulation/Condolence Notice' have been recorded in the transaction table F, the execution means 47 checks whether or not there is guidance for any of the five registration items (6) 'Name Change Registration', (7) 'Holdings Registration', (8) 'Assets Registration', (10) 'Dependent Registration' and (11) 'Family Registration', that has not been displayed on the display 13 (step A13).

The execution means 47 activates in order the name-change-guidance means 46*f*, holdings-procedure-guidance means 46, assets-procedure-guidance means 46*h*, dependent-registration-guidance means 46*j* and family-registration-guidance means 46*k* that are related to the five registration items (6) 'Name Change Registration', (7) 'Holdings Registration', (8) 'Assets Registration', (10) 'Dependent Registration' and (11) 'Family Registration'. Also, of the guidance means name-change-guidance means 46*f*, holdings-procedure-guidance means 46*g*, assets-procedure-guidance means 46*h*, dependent-registration-guidance means 46*j* and family-registration-guidance means 46*k* that were activated in order, three of the guidance means 46 (the guidance means holdings-procedure-guidance means 46 and assets-procedure-guidance means 46*h* are omitted) send guidance data to the PP terminal 1 via the communication means 40 for guiding the employee to register the contents for the three registration items (6) 'Name Change Registration', (10) 'Dependent Registration' and (11) 'Family Registration'. The holdings-procedure-guidance means 46*g* and assets-procedure-guidance means 46*h* do not send guidance data to the PP terminal 1, however that fact that registration items (7) 'Holdings Registration' and (8) 'Assets Registration' were selected is stored in the transaction table F in the storage means 45.

The guidance data guiding the employee to register the contents for the three registration items (6) 'Name Change Registration', (10) 'Dependent Registration' and (11) 'Family Registration' is sent to the PP terminal 1 and guidance for guiding the employee to register the contents of these three registration items is displayed on the display 13 as shown in FIG. 32 to FIG. 34 (step A8).

The employee enters the contents for the three registration items in the specified fields and inputs the contents (step A11). After the registered-contents-receiving means 18 receives the input contents, they are sent to the PPP apparatus 4, and the contents input by the employee for the seven registration items (3) 'SDAC Registration', (4) 'Congratulations/Condolence Notice, (6) 'Name Change Registration', (7) 'Holdings Registration', (8) 'Assets Registration', (10) 'Dependent Registration'and (11) 'Family Registration' and the fact that they have been selected is registered in the transaction table F in the storage means 45 (step A12).

In this way, after a specified procedure subject is selected by the employee, the PPP system automatically extracts all of the registration items corresponding to that procedure subject, and guidance means 46 corresponding to the registration items selected by the employee from among all these registration items are activated in order. Therefore, when the employee experiences a personal change, by using the PPP system, the employee selects the procedure subject corresponding to the personal change and can register the contents for all of the registration items related to that procedure subject without having to check and select by himself/herself all of the registration items related to that procedure subject. Also, it is possible for the employee to select just part of the all the registration items related to the selected procedure subject and register the contents for just those selected registration items.

In the procedure where the execution means 47 checks whether or not guidance for all of the registration items selected by the employee has been displayed on the display 13 (step A13), when it is determined that guidance for all of the registration items selected by the employee has been displayed on the display 13, the execution means 47 performs the following operation. In other words, the execution means 47 sends image data to the PP terminal 1 via the communication means 40, communication means 30 and network 2 asking the user whether or not there are contents for other registration items to be registered in the PPP apparatus 4.

That image data is received in the PP terminal 1 by the communication means 40 and the image is displayed on the display 13.

When the employee determines that there are still items to be registered in the PPP apparatus 4, the employee uses the input-selection means 14 to input an instruction to the PP terminal 1 indicating such. After doing so, that information is sent to the PPP apparatus 4 via the communication means 10, network 2 and communication means 30, and in the PPP apparatus 4, it is received by the communication means 40. Also, the authority/department-confirmation means 41 returns to the procedure of extracting from the storage means 45 the work system menu corresponding to the group-classification code and position code that were already detected for the employee using the PPP system, sending it to the PP terminal 1 via the communication means 40, and displaying it on the display 13 of the PP terminal 1 (step 12).

On the other hand, when the employee determines that there are no more items to be registered in the PPP apparatus 4, the employee uses the input-selection means 14 and input an instruction into the PP terminal 1 indicating such. After doing so, processing using the PPP system ends (step 14).

In the embodiment described above, a procedure-registration-event-relationship table E in the storage means 45 was used as an example of the combination-storage means for the PPP apparatus of this invention and the PPP apparatus for the PPP system of this invention. Also, in this embodiment described above, a transaction table F was used as an example of the registered-contents-storage means for the PPP apparatus of this invention and the PPP apparatus for the PPP system of this invention.

Moreover, in the embodiment described above, an authority/department-confirmation means 41 was used as an example of the attribute-confirmation means for the PPP apparatus of this invention. Also, in the embodiment described above, the ID number of the employee was used by the authority/department-confirmation means 41 as an example of an identifier of a specified user. Similarly, the access authority and department of the employee were used as examples of attributes. However, the identifier is not limited to the employees ID number, and the attributes are not limited to the access authority and department of the employee.

Also, in the embodiment described above, a mouse and keyboard were used as an example of the procedure subject-selection means 17 of the PP terminal of the PPP system of this invention. However, the procedure subject-selection means 17 is not limited to being constructed of a mouse and keyboard. Furthermore, a display 13 was used as an example of the display means in the PP terminal of the PPP system of this invention.

<Postponement Process>

Moreover, in the embodiment described above, the case of where after the guidance screen for guiding the employee to register the contents of a specified registration item has been displayed on the display 13, the employee enters the contents in the specified input fields and registers the contents in the PPP apparatus was explained. However, when the guidance is displayed on the display 13, the employee may not know the information to be entered in a specified input field on that guidance screen. For example, when the guidance is displayed on the display 13 for guiding the employee to register the contents of registration item (3) 'SDAC Registration', the employee may not have the information related to the new salary deposit account after the change.

In that kind of case, the employee uses the input-selection means 14 and selects 'Postpone' without entering anything in the input fields on the guidance screen. In other words, the employee enters an intention to postpone input of the contents of the registration item related to the guidance screen to a later time. This postponement intention is received by the registered-contents-receiving means 18, and sent to the PPP apparatus 4 by the communication means 10 via the network 2 and communication means 30 of the verification/authorization apparatus 3. Then, the postponement intention is received in the PPP apparatus 4 by the communication means 40 and recorded in the transaction table F in the storage means 45.

After that, when the employee is able to register the contents of the registration item for which a postponement intention was input indicating an intention to input the contents of the registration item related to that guidance at a later time, the employee displays the main procedure menu on the display 13 as shown in FIG. 26 an FIG. 27. The employee then uses the input-selection means 14 and selects the item 'Procedure Change, Restart' from the main procedure menu, to input an intention to restart registration.

After doing so, the selection-judgment means 14 determines that the item 'Procedure Change, Restart' was selected, or in other words, determines that an intention to restart registration was input, and sends that judgment result to the PPP apparatus 4 via the communication means 10, network 2 and communication means 30.

In the PPP apparatus, based on the judgment result indicating that the item 'Procedure Change, Restart' was selected Judgment result indicating an intention to restart registration), the selected-item-judgment means 42, sends an instruction to the execution means 47 to activate the guidance means 46 related to the registration item for which 'Postpone was selected. According to that instruction, the execution means 47 activates the guidance means 46 related to the registration item for which 'Postpone' was selected and that is recorded in the transaction table F in the storage means 45. The guidance means 46 that is activated by control from the execution means 47 sends guidance data to the PP terminal 1 via the communication means as described above for guiding the employee to register the contents of the registration item for which 'Postpone' was selected.

Then, the guidance for guiding the employee to register the contents of the registration item for which 'Postpone' was selected is displayed on the display 13, and as described above, the employee is able to enter the contents in the specified input fields on the guidance screen and record those contents in the PPP apparatus 4.

Also, each of the component elements of the PPP system of the embodiment described above can be constructed using hardware, or can be constructed using software.

Furthermore, a program for making a computer function as all or part of the component elements of the PPP system of the embodiment described above can be used for a specified computer, and it is possible to realize the functions of all or part of the component element of the PPP system of the embodiment described above with that computer. Examples of embodiments of the using the program described above include recording that program on a recording medium such as a CD-ROM and transferring the program that is recorded on that recording medium or transferring that program by a communication means such as the Internet. Also, the program could be installed in the computer.

As mentioned above, the personnel-procedure-processing system is an example of clerical-procedures-processing system. And the invention is not to be considered limited to the personnel procedure processing. The invention can be applied to general clerical procedures processes that have complex procedures like personnel procedures or accounting procedures.

[Effect of the Invention]

As can be clearly seen from the explanation above, this invention is able to provide a clerical-procedures-processing apparatus, clerical-procedures-processing system and clerical-procedures-processing method that reduces overlooking of registering contents for registration items without taking up too much of the user's time by presenting all the necessary registration items according to personal changes to the user and having the user select the registration items.

What is claimed is:

1. A personnel-procedures-processing apparatus for enabling an employee to register and change his/her personal data collected by a company when the employee notifies the company of his/her personal data changes, comprising:

a combination-storage means for storing combinations of a personnel procedure subject relating to personnel procedures in the company, one or more registration items contained in the personnel procedure subject that are elements to be registered, and group-classification codes indicating groups of workplaces in the company and associated with the registration items;

a first storage means for storing an employee ID specifying the employee being associated with a workplace code indicating the workplace that the employee belongs to;

a second storage means for storing the employee ID being associated with a code indicating a status of the employee and his/her family registered as the personal data;

a third storage means for storing the group-classification code being associated with the workplace code;

a fourth storage means for storing the workplace code being associated with a display of a main procedure menu for the employee to select the personnel procedure subjects and the registration items;

an authority/department-confirmation means, upon receipt of the employee's instruction to display the menu, for detecting from the first storage means the workplace code of the employee according to the employee ID of the employee, extracting from the fourth storage means the menu associated with the workplace code according to the detected workplace code, and then transmitting the menu to a terminal that the employee is using;

a selection-item-judgment means for judging contents that are selected when the employee selects any of the registration items or the personnel procedure subjects from the display of the menu;

when it is judged that a specific registration item is selected by the employee, a single-execution means for executing guidance means for performing single guidance for the employee to input the contents of the selected specific registration item;

a registered-contents-storage means for storing the contents of the personal data inputted according to the single guidance of the guidance means executed by the single-execution means;

when it is judged a specific personnel procedure subject is selected by the employee, a first extracting means for extracting from the combination-storage means one or more registration items according to the selected personnel procedure subject and the referred group-classification code, the group-classification code being obtained from the third storage means based on the workplace code of the employee obtained from the first storage means according to the employee ID of the employee;

a second extracting means for detecting the personal data about the employee and his/her family based on the employee ID and the contents on the second storage means and the registration-content storage means according to the results extracted by the first extracting means, and extracting one or more registration items relating only to the detected personal data of the employee and his/her family;

a means for creating the selection display for displaying only the registration items excluding the registration items necessary for registering the personnel procedure subject from the registration items extracted by the second extracting means by referring to the personnel procedure subject, and transmitting a selection display to the terminal that the employee is using;

an execution means for executing sequentially the one or more guidance means corresponding to the extracted registration items selected from the selection display and the registration items necessary for registering the personnel procedure subject; and the registered-contents-storage means for storing the contents of the registration items inputted in response to the guidance of the guidance means executed by the execution means.

2. A personnel-procedures-processing apparatus according to claim 1, wherein the registration item is any of address change registration, commute reimbursement change registration, salary deposit account change registration, congratulation/condolence notice, employee savings account change registration, name change registration, dependent, and family.

3. A personnel-procedures-processing apparatus according to claim 1, wherein the guidance means is any of address-change-guidance means for displaying a guide on the terminal that the employee is using to allow the employee to input the contents of the address change;

commute-reimbursement-change-guidance means for displaying a guide on the terminal that the employee is using to allow the employee to input the contents of commute reimbursement change;

salary-deposit-account-change-guidance means for displaying a guide on the terminal that the employee is using to allow the employee to input the contents of the salary deposit account change;

congratulations/condolence-notice-guidance means for displaying a guide on the terminal that the employee is using to allow the employee to input the contents of the congratulations or condolence;

employee-savings-amount-change-guidance means for displaying a guide on the terminal that the employee is using to allow the employee to input the contents of the employee saving amount change;

name-change-guidance means for displaying a guide on the terminal that the employee is using to allow the employee to input the contents of the name change;

dependent-registration-guidance means for displaying a guide on the terminal that the employee is using to allow the employee to input the contents of the dependent registration; and family-registration-guidance means for displaying a guide on the terminal that the employee is using to allow the employee to input the contents of the family registration.

4. A personnel-procedures-processing system comprising:

a personnel procedures terminal comprising a procedural subject-selection means for letting a employee select a procedure subject relating to personnel procedures, a display means for displaying guidance for guiding said employee to input data about registration items associated with said procedure subject, and a registered-contents-receiving means for receiving contents of said registration items form said employee, and a personnel-procedures-processing apparatus comprising a combination-storage means for storing combinations of a personnel procedure subject relating to personnel procedures in the company, one or more registration items contained in the personnel procedure subject that are elements to be registered, and group-classification codes indicating groups of workplaces in the company and associated with the registration items, a first storage means for storing an employee ID specifying the employee being associated with a workplace code indicating the workplace that the employee belongs to, a second storage means for storing the employee ID being associated with a code indicating a status of the employee and his/her family registered as the personal data, a third storage means for storing the group-classification code being associated with the workplace code, a fourth storage means for storing the workplace code being associated with a display of a main procedure menu for the employee to select the personnel procedure subjects and the registration items, an authority/department-confirmation means, upon receipt of the employee's instruction to display the menu, for detecting from the first storage means the workplace code of the employee according to the employee ID of the employee, extracting from the fourth storage means the menu associated with the workplace code according to the detected workplace code, and then transmitting the menu to a terminal that the employee is using, a selection-item-judgment means for judging contents that are selected when the employee selects any of the registration items or the personnel procedure subjects from the display of the menu, when it is judged that a specific registration item is selected by the employee, a single-execution means for executing guidance means for performing single guidance for the employee to input the contents of the selected specific registration item;

a registered-contents-storage means for storing the contents of the personal data inputted according to the single guidance of the guidance means executed by the single-execution means;

when it is judged a specific personnel procedure subject is selected by the employee, a first extracting means for extracting from the combination-storage means one or more registration items according to the selected personnel procedure subject and the referred group-classification code, the group-classification code being obtained from the third storage means based on the workplace code of the employee obtained from the first storage means according to the ID of the employee, a second extracting means for detecting the personal data about the employee and his/her family based on the employee ID and the contents on the second storage means and the registration-content storage means according to the results extracted by the first extracting means, and extracting one or more registration items relating only to the detected personal data of the employee and his/her family, a means for creating the selection display for displaying only the registration items excluding the registration items necessary for registering the personnel procedure subject from the registration items extracted by the second extracting means by referring to the personnel procedure subject, and transmitting a selection display to the terminal that the employee is using, an execution means for executing sequentially the one or more guidance means corresponding to the extracted registration items selected from the selection display and the registration items necessary for registering the personnel procedure subject, and the registered-contents-storage means for storing the contents of the registration items inputted in response to the guidance of the guidance means executed by the execution means.

5. A personnel-procedures-processing method using a personnel procedures processing apparatus for enabling an employee to register and change his/her personal data, the apparatus having first to fourth storage means and combination-storage storage means;

the combination-storage means stores combinations of a personnel procedure subject relating to, one or more registration items contained in the personnel procedure subject that are elements to be registered, and group-classification codes indicating groups of workplaces in the company and associated with the registration items;

the first storage means stores a employee ID specifying the employee being associated with a workplace code indicating the workplace that the employee belongs to;

the second storage means stores the employee ID being associated with a code indicating a status of the employee and his/her family registered as the personal data;

the third storage means stores the group-classification code being associated with the workplace code;

the fourth storage means stores the workplace code being associated with a display of main procedure menu for the employee to select the personnel procedure subjects and the registration items, the method comprising steps of;

displaying upon receipt of the employee's instruction to display the menu, for detecting from the first storage means the workplace code of the employee according to the employee ID of the employee, extracting from the fourth storage means the menu associated with the workplace code according to the detected workplace code, and then transmitting the menu to a terminal that the employee is using;

judging contents that are selected when the employee selects any of the registration items or the personnel procedure subjects from the display of the menu;

when it is judged that a specific registration item is selected by the employee, executing a single guidance means for the employee to input the contents of the selected specific registration item;

storing in a registered-contents-storage means the contents of the personal data inputted according to the single guidance means executed;

when it is judged that a specific personnel procedure is selected by the employee, first-extracting from the combination-storage means one or more registration items according to the selected personnel procedure subject and the referred group-classification code, the group-classification code being obtained from the third storage means based on the workplace code of the employee obtained from the first storage means according to the employee ID of the employee;

second-extracting the personal data about the employee and his/her family based on the employee ID and the contents on the second storage means and the registration-content storage means according to the results extracted by the first-extracting, and extracting one or more registration items relating only to the detected personal data of the employee and his/her family;

creating the selection display for displaying only the registration items excluding the registration items necessary for registering the personnel procedure subject from the registration items extracted by the second extracting means by referring to the personnel procedure subject, and transmitting a selection display to the terminal that the employee is using:

executing sequentially the one or more guidance means corresponding to the extracted registration items selected from the selection display and the registration items necessary for registering the personnel procedure subject; and storing in the registered-contents-storage means the contents of the registration items inputted in response to the guidance.

6. A computer readable storage medium storing a program for executing a personnel-procedures-processing method using a personnel procedures processing apparatus for enabling an employee to register and change his/her personal data, the apparatus having first to fourth storage means and combination-storage storage means;

the combination-storage means stores combinations of a personnel procedure subject relating to, one or more registration items contained in the personnel procedure subject that are elements to be registered, and group-classification codes indicating groups of workplaces in the company and associated with the registration items;

the first storage means stores a employee ID specifying the employee being associated with a workplace code indicating the workplace that the employee belongs to;

the second storage means stores the employee ID being associated with a code indicating a status of the employee and his/her family registered as the personal data;

the third storage means stores the group-classification code being associated with the workplace code;

the fourth storage means stores the workplace code being associated with a display of main procedure menu for the employee to select the personnel procedure subjects and the registration items;

the program, when executed, causing a computer to perform the steps of;

displaying upon receipt of the employee's instruction to display the menu, for detecting from the first storage means the workplace code of the employee according to the employee ID of the employee, extracting from the fourth storage means the menu associated with the workplace code according to the detected workplace code, and then transmitting the menu to a terminal that the employee is using;

judging contents that are selected when the employee selects any of the registration items or the personnel procedure subjects from the display of the menu;

when it is judged that a specific registration item is selected by the employee, executing a single guidance means for the employee to input the contents of the selected specific registration item;

storing in a registered-contents-storage means the contents of the personal data inputted according to the single guidance means executed;

when it is judged that a specific personnel procedure is selected by the employee, first-extracting from the combination-storage means one or more registration items according to the selected personnel procedure subject and the referred group-classification code, the group-classification code being obtained from the third storage means based on the workplace code of the employee obtained from the first storage means according to the employee ID of the employee;

second-extracting the personal data about the employee and his/her family based on the employee ID and the contents on the second storage means and the registration-content storage means according to the results extracted by the first-extracting, and extracting one or more registration items relating only to the detected personal data of the employee and his/her family;

creating the selection display for displaying only the registration items excluding the registration items necessary for registering the personnel procedure subject from the registration items extracted by the second extracting means by referring to the personnel procedure subject, and transmitting a selection display to the terminal that the employee is using;

executing sequentially the one or more guidance means corresponding to the extracted registration items selected from the selection display and the registration items necessary for registering the personnel procedure subject; and storing in the registered-contents-storage means the contents of the registration items inputted in response to the guidance.

* * * * *